United States Patent [19]
Yamashita et al.

[11] Patent Number: 6,103,860
[45] Date of Patent: Aug. 15, 2000

[54] FLUORINE-CONTAINING POLYAMIDE

[75] Inventors: Wataru Yamashita, Fukuoka; Tomomi Yoshimura, Kanagawa; Atsushi Shibuya, Kanagawa; Yoshihiro Sakata, Kanagawa; Hideaki Oikawa, Kanagawa; Masahiro Ohta, Kanagawa, all of Japan

[73] Assignee: Mitsui Chemicals, Inc., Japan

[21] Appl. No.: 09/332,534

[22] Filed: Jun. 14, 1999

Related U.S. Application Data

[62] Division of application No. 08/917,387, Aug. 26, 1997, Pat. No. 5,990,261.

[30] Foreign Application Priority Data

Aug. 29, 1996 [JP] Japan ................................ 8-228551

[51] Int. Cl.$^7$ ........................... C08G 73/10; C08G 69/02; C08G 69/42
[52] U.S. Cl. ........................... 528/310; 528/170; 528/174; 528/188; 528/335; 528/313; 528/320; 528/337; 528/347
[58] Field of Search ..................... 528/170, 310, 528/313, 320, 332, 335, 331, 347, 337, 174, 188

[56] References Cited

U.S. PATENT DOCUMENTS 5,354,839  10/1994  Yamashita et al. .................... 528/188

*Primary Examiner*—P. Hampton-Hightower
*Attorney, Agent, or Firm*—Burns, Doane, Swecker & Mathis, L.L.P.

[57] ABSTRACT

There is disclosed an organic optical component prepared from a resin essentially comprising one or more repetitive structural units selected from the group consisting of structures represented by general formula (1);

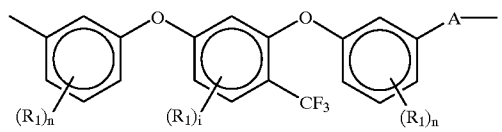

wherein A is either of the groups below.

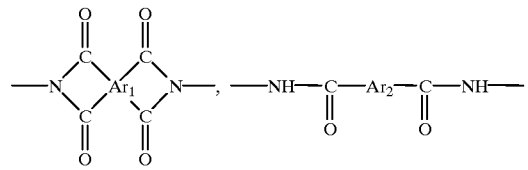

This invention provides an organic optical component with excellent transparency, heat resistance and mechanical strength as well as a low birefringence. This invention also provides a novel aromatic polyamide with a low permitivity and excellent transparency, processability and thermal stability, besides excellent heat resistance inherent in an aromatic polyamide.

2 Claims, No Drawings

FLUORINE-CONTAINING POLYAMIDE

This application is a divisional, of Application Ser. No. 08/917,387, filed Aug. 26, 1997 now U.S. Pat. No. 5,990,261.

BACKGROUND OF THE INVENTION

1. Field of the Invention

This invention relates to an organic optical component made from a polyamide, its copolymer, or a polyimide. The organic optical component of this invention has excellent transparency, mechanical strength and heat resistance as well as a low birefringence, which is useful as, for example, a substrate for an optical disk, a pick-up lens, a plastic substrate for a liquid cell and a prism. This invention also relates to a novel fluorine-containing polyamide with a low dielectric constant, excellent transparency, low hygroscopicity and excellent processability.

2. Description of the Related Art

Inorganic glasses have a number of excellent physical properties such as excellent transparency and a reduced optical anisotropy, and thus has been used in various fields. The glasses, however, have problems such as fragility due to their heavy weight and a poor productivity, leading to recent intensive attempts for developing a transparent polymer as a substitute for an inorganic glass.

A transparent polymer such as poly(methyl methacrylate) and polycarbonate has excellent transparency, mechanical properties such as shock resistance, processability and moldability, which has been, therefore, used in various applications such as transparent components of a car and a lens, as an alternative to an inorganic glass. These transparent polymers, however, have inadequate heat resistance; for example, even a polycarbonate belonging to an engineering plastic has a glass-transition temperature of about 150° C., leading to limiting its use at an elevated temperature.

Meanwhile, an optical disk on which information such as sounds, images and texts is recorded and reproduced using a laser beam, has been being rapidly extended in its use. In an optical disk used as an information recording medium, a laser beam passes through the disk body. Thus, the disk is required to be, of course, transparent, and is strongly required to be optically homogeneous for reducing reading errors of an information. For example, when using a conventional polymer such as polycarbonate and poly(methyl methacrylate), there occurs a problem that a residual stress generated by some factors such as thermal stress, molecular orientation and volume variation near a glass-transition temperature generated by cooling and fluidizing processes of a resin during casting a disk substrate, may cause a birefringence when a laser beam passes through the disk substrate. Large optical heterogeneity due to the birefringence may become a fatal defect for an optical component such as an optical disk substrate because it may cause significant problems such as reading errors of a recorded information.

Hence, it has been desired to provide an optical component, typically an optical disk substrate, made from a material with more advanced optical characteristics, e.g., a low birefringence and excellent transparency and heat resistance.

For solving the above problems, JP-A 63-314235 has disclosed a low-birefringent polycarbonate from a spiro compound such as a homopolymeric polycarbonate of spirobiindanol or a copolymeric polycarbonate of spirobiindanol and bisphenol-A. Although having a low birefringence, the former polycarbonate is practically problematic due to its poor transparency and mechanical strength, while in the latter polycarbonate, increase of bisphenol-A improves heat resistance, i.e., reduction of the glass-transition temperature, transparency and mechanical strength, but increases the birefringence, leading to limiting its applications as an optical component. Thus, it has been strongly desired to solve these conflicting problems.

Furthermore, polyimides are well known as an engineering plastic with high heat resistance. Although having good heat resistance, polyimides have a high birefringence. For example, the polyimide disclosed in JP-A 8-504967 may be used as an optical material, but has a birefringence of at least 0.01 level which is not adequately low. Furthermore, according to "PHOTOSENSITIVE POLYIMIDE—Fundamentals and Applications", edited by KAZUYUKI HORIE and TAKASHI YAMASHITA TECHNOMIC PUBLISHING COMP., p. 300 (1995), commercially available polyimides have a birefringence of at least 0.1; even a special fluorinated polyimide indicates a birefringence of 0.01 level. Thus, these may significantly improve heat resistance, but as described above, considerably limit their use as an optical component.

In addition, aromatic polyamides are also known as heat resistant resins like polyimides. However, optical properties, particularly a refractive index and a birefringence, have not been described very much for aromatic polyamides, and thus, substantially no data on the properties are available.

Aromatic polyamides have been expected to be extensively used in different fields, because they have a variety of excellent physical properties, especially heat resistance. Although the polyamides developed to date have excellent properties, they have some drawbacks such as poor processability and high water absorptivity. Thus, for solving the problems, JP-A 5-310919 has suggested a polyamide prepared by condensation polymerization of the diamine represented by formula (A) with an aromatic dicarboxylic acid in an organic solvent, and a process for preparing it.

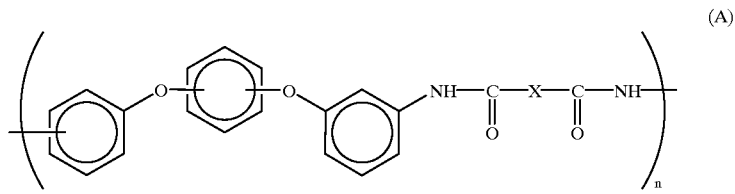

(A)

This polyamide has excellent processability represented by a glass-transition temperature of 177 to 195° C. and a 5% weight-loss temperature of 484 to 505° C., as well as a low water absorption of 0.70 to 0.75%, without losing the good properties inherent in a polyamide. However, polyamides including the above-mentioned generally have a relatively higher dielectric constant, which inhibits their application to an electronic material.

SUMMARY OF THE INVENTION

This invention is for solving the above problems and its objective is to provide an organic optical component with good transparency, mechanical strength and heat resistance as well as a low birefringence, from a polyamide or its copolymer or a polyimide.

Another objective of this invention is to provide a polyamide having excellent processability, a low water absorption and a reduced dielectric constant, as well as moldable by a melt process, without losing the good properties inherent in a polyamide.

We have intensively attempted to solve the above problems, and have finally found that a polyamide or its copolymer, or a polyimide having a particular structure has excellent transparency, mechanical strength and heat resistance as well as a low birefringence, and also that these resins are suitable for an organic component, to achieve this invention.

We have also found that a polyamide prepared by condensation polymerization of a fluorine-containing aromatic diamine having a particular structure with an aromatic dicarboxylic acid in an organic solvent has excellent processability, a low water absorption and a reduced dielectric constant, without losing the good properties inherent in a polyamide, to achieve this invention.

In particular, this invention relates to;

(i) an organic optical component prepared from a resin essentially comprising one or more repetitive structural units selected from the group consisting of structures represented by general formula (1);

(ii) the organic optical component described in (i), in which the resin is a polyamide or its copolymer; and (iii) the organic optical component described in (i), in which the resin is a polyimide;

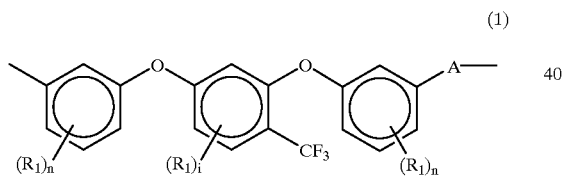
(1)

wherein $R_1$, which may be the same or different each other, is fluorine atom, an alkyl or fluorinated alkyl having 1 to 3 carbons, an alkoxy having 1 to 3 carbons, phenyl, phenoxy, benzyl, naphthyl, or a monovalent group represented by general formula (a) or (b);

wherein $R_2$ is a monovalent group selected from the group consisting of a halogen atom, an alkyl having 1 to 3 carbons, an alkoxy, and a halogenated alkyl or alkoxy whose hydrogen atoms are partially or completely substituted by halogen atoms, and $R_2$ may be the same or different each other, and p is an integer of 1 to 5;

n is an integer of 0 to 4;
i is an integer of 0 to 3; and
A is a group represented by formula (c) or (d);

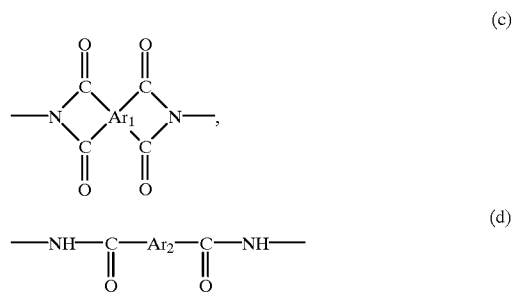

wherein $Ar_1$ is a tetravalent group represented by general formula (e), (f) or (g)

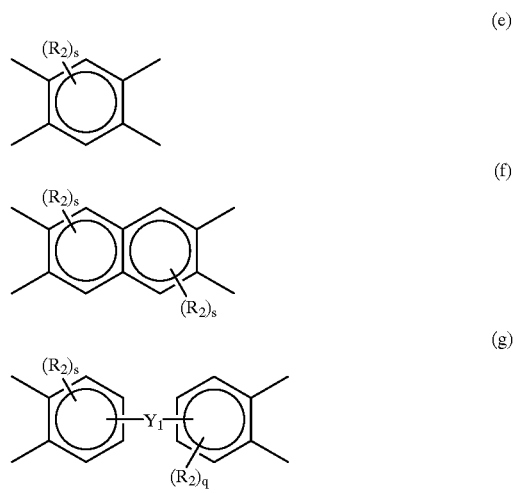

wherein $R_2$ is as defined above, s is an integer of 0 to 2, q is an integer of 0 to 3, and $Y_1$ is a direct bond or a bivalent group selected from the group consisting of —CO—, —S—, —O—, —SO$_2$—, —CH$_2$—, —C(CH$_3$)$_2$—, —C(CF$_3$)$_2$— and a moiety represented by general formula (h) or (i);

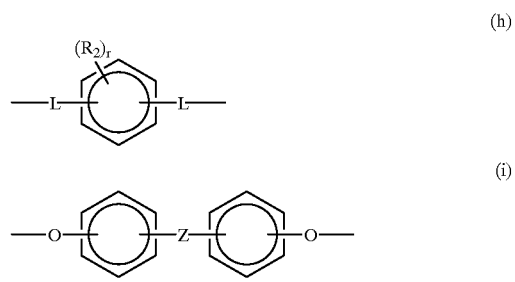

wherein $R_2$ is as defined above, r is an integer of 0 to 4, L is a direct bond or a bivalent group selected from the group consisting of —CO—, —S— and —O—, Z is a direct bond or a bivalent group selected from the group consisting of —CO—, —S—, —O—, —SO$_2$—, —CH$_2$—, —C(CH$_3$)$_2$— and —C(CF$_3$)$_2$— and;

Ar$_2$ is a bivalent group represented by general formula (j), (k) or (l);

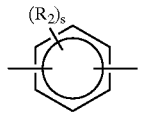
(j)

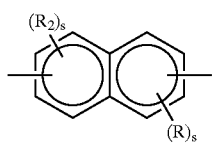
(k)

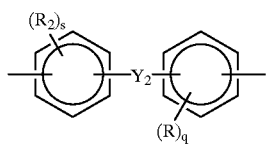
(l)

wherein R$_2$, s and q are as defined above, Y$_2$ is a direct bond or a bivalent group selected from the group consisting of —CO—, —S—, —O—, —SO$_2$—, —CH$_2$—, —C(CH$_3$)$_2$—, —C(CF$_3$)$_2$— and a moiety represented by general formula (h), (i), (m) or (n);

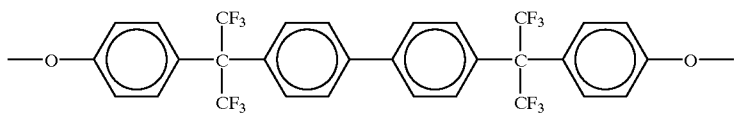
(m)

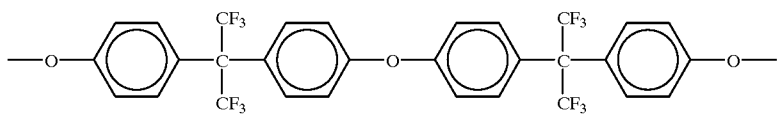
(n)

although R$_1$ is not fluorine atom or a fluorinated alkyl when A is a group represented by formula (d).

This invention also relates to (iv) a fluorine-containing polyamide with a logarithmic viscosity of 0.01 to 3.00 dL/g both including, comprising a repetitive unit represented by general formula (4) formed by condensation polymerization of at least one of diamines represented by general formula (2) with at least one of dicarboxylic derivatives represented by general formula (3);

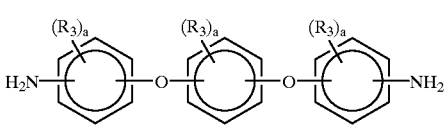
(2)

wherein a is, the same or different each other, an integer of 0 to 4, whose total number is at least one; R$_3$ is, the same or different each other, a monovalent group represented by C$_k$F$_{2k+1}$; and k is an integer of 0 to 6;

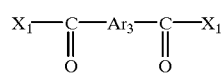
(3)

wherein X$_1$ is a halogen atom, hydroxy, methoxy or ethoxy, and Ar$_3$ is at least one group selected from the group consisting of a fused polycyclic aromatic group and a bivalent group represented by formula (o);

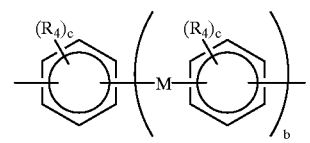
(o)

wherein M is a direct bond or a bivalent group selected from the group consisting of —O—, —S—, —SO$_2$—, —CO—, —CH$_2$—, —C(CH$_3$)$_2$— and —C(CF$_3$)$_2$— and when appearing two or more times in the structural formula, M may be the same or different each other; R$_4$ is a monovalent group selected from the group consisting of an alkyl, a perfluoroalkyl and an alkoxy having 1 to 6 carbons, a halogen atom and phenyl, and when appearing two or more times in the structural formula, R$_4$ may be the same or different each other; b is an integer of 0 to 2; and c is an integer of 1 to 4 and when appearing two or more times in the structural formula, c may be the same or different each other;

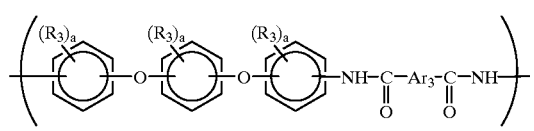
(4)

wherein R$_3$, a and Ar$_3$ are as defined above.

This invention also relates to (v) the above fluorine-containing polyamide (iv) whose polymer end is protected by. conducting the above polymerization in the presence of an aromatic monocarboxylic acid derivative represented by general formula (5) and/or an aromatic monoamine represented by general formula (6) in a ratio of 0.001 to 1.00 mol both including per 1 mol of the diamine and/or the dicarboxylic acid, respectively;

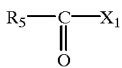

(5)

wherein $R_5$ is a monovalent group selected from the group consisting of a monocyclic aromatic group, a fused polycyclic aromatic group and a non-fused polycyclic aromatic group having 6 to 15 carbons in which aromatic groups are linked directly or via a crosslinking group; and $X_1$ is as defined above;

(6)

wherein $R_5$ is as defined above.

DETAILED DESCRIPTION OF THE PREFERRED EMBODIMENTS

A polyamide or its copolymer for the organic optical component of this invention may be prepared by condensation polymerization of one or more diamines represented by general formula (7) with one or more dicarboxylic acids represented by general formula (8) in a solvent. The polyamide copolymer may be, but is not limited to, a graft, a random, a block or an alternating copolymer, or a combination thereof.

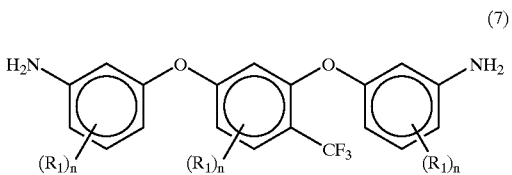

(7)

(In this formula, $R_1$, i and n are as defined above.)

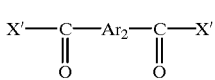

(8)

(In this formula, $Ar_2$ is as defined above, and X' is a halogen atom or hydroxy group.)

A polyimide for the organic optical component of this invention may be prepared by, for example, condensation of a diamine represented by general formula (7) with a tetracarboxylic dianhydride represented by general formula (9) in a solvent;

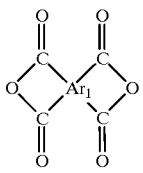

(9)

wherein $Ar_1$ is as defined above.

A diamine represented by general formula (7) for this invention includes 13

1,3-bis(3-aminophenoxy)-4-trifluoromethylbenzene,
1,3-bis(3-amino-z'-ethylphenoxy)-4-trifluoromethylbenzenes,
1,3-bis(3-amino-z'-propylphenoxy)-4-trifluoromethylbenzenes,
1,3-bis(3-amino-z'-isopropylphenoxy)-4-trifluoromethylbenzenes,
1,3-bis(3-amino-z'-methoxyphenoxy)-4-trifluoromethylbenzenes,
1,3-bis(3-amino-z'-ethoxyphenoxy)-4-trifluoromethylbenzenes,
1,3-bis(3-amino-z'-propoxyphenoxy)-4-trifluoromethylbenzenes,
1,3-bis(3-amino-z'-isopropoxyphenoxy)-4-trifluoromethylbenzenes,
1,3-bis(3-amino-z'-phenylphenoxy)-4-trifluoromethylbenzenes,
1,3-bis(3-amino-z'-benzylphenoxy)-4-trifluoromethylbenzenes,
1,3-bis[3-amino-z'-(1-naphthyl)phenoxy]-4-trifluoromethylbenzenes,
1,3-bis[3-amino-z'-(2-naphthyl)phenoxy]-4-trifluoromethylbenzenes,
1,3-bis[3-amino-z'-(2,3,4,5,6-pentafluorophenyl)phenoxy]-4-trifluoromethylbenzenes,
1,3-bis[3-amino-z'-(z-tolyl)phenoxy]-4-trifluoromethylbenzenes,
1,3-bis[3-amino-z'-(x,y-xylyl)phenoxy]-4-trifluoromethylbenzenes,
1,3-bis(3-amino-z'-mesitylphenoxy)-4-trifluoromethylbenzenes,
1,3-bis[3-amino-z'-(z-propylphenyl)phenoxy]-4-trifluoromethylbenzenes,
1,3-bis[3-amino-z'-(z-cumenyl)phenoxy]-4-trifluoromethylbenzenes,
1,3-bis[3-amino-z'-(2,3,4,5,6-pentafluorophenoxy)phenoxy]-4-trifluoromethylbenzenes,
1,3-bis[3-amino-z'-(z-methylphenoxy)phenoxy]-4-trifluoromethylbenzenes,
1,3-bis[3-amino-z'-(z-ethylphenoxy)phenoxy]-4-trifluoromethylbenzenes,
1,3-bis[3-amino-z'-(z-isopropylphenoxy)phenoxy]-4-trifluoromethylbenzenes,
1,3-bis[3-amino-z'-(x,y-dimethylphenoxy)phenoxy]-4-trifluoromethylbenzenes,
1,3-bis[3-amino-z'-(z-methoxyphenyl)phenoxy]-4-trifluoromethylbenzenes,
1,3-bis[3-amino-z'-(z-methoxyphenoxy)phenoxy]-4-trifluoromethylbenzenes,
1,3-bis[3-amino-z'-(z-trifluoromethylphenyl)phenoxy]-4-trifluoromethylbenzenes,
1,3-bis[3-amino-z'-(z-trifluoromethylphenoxy)phenoxy]-4-trifluoromethylbenzenes,
1,3-bis[3-amino-z'-(z-trifluoromethoxyphenyl)phenoxy]-4-trifluoromethylbenzenes,
1,3-bis[3-amino-z'-(z-trifluoromethoxyphenoxy)phenoxy]-4-trifluoromethylbenzenes;
1,3-bis(3-amino-5-trifluoromethylphenoxy)-4-trifluoromethylbenzene,
1,3-bis(3-amino-4-trifluoromethylphenoxy)-4-trifluoromethylbenzene,
1,3-bis(3-amino-2-trifluoromethylphenoxy)-4-trifluoromethylbenzene,
1,3-bis(3-amino-6-trifluoromethylphenoxy)-4-trifluoromethylbenzene, 1,3-bis(3-amino-5-trifluoromethylphenoxy)-2-fluoro-4-trifluoromethylbenzene,
1,3-bis(3-amino-5-trifluoromethylphenoxy)-5-fluoro-4-trifluoromethylbenzene,
1,3-bis(3-amino-5-trifluoromethylphenoxy)-6-fluoro-4-trifluoromethylbenzene,
1,3-bis(3-amino-4-trifluoromethylphenoxy)-2-fluoro-4-trifluoromethylbenzene,
1,3-bis(3-amino-4-trifluoromethylphenoxy)-5-fluoro-4-trifluoromethylbenzene,
1,3-bis(3-amino-4-trifluoromethylphenoxy)-6-fluoro-4-trifluoromethylbenzene,
1,3-bis(3-amino-2-trifluoromethylphenoxy)-2-fluoro-4-trifluoromethylbenzene,
1,3-bis(3-amino-2-trifluoromethylphenoxy)-5-fluoro-4-trifluoromethylbenzene,
1,3-bis(3-amino-2-trifluoromethylphenoxy)-6-fluoro-4-trifluoromethylbenzene,
1,3-bis(3-amino-6-trifluoromethylphenoxy)-2-fluoro-4-trifluoromethylbenzene,
1,3-bis(3-amino-6-trifluoromethylphenoxy)-5-fluoro-4-trifluoromethylbenzene,
1,3-bis(3-amino-6-trifluoromethylphenoxy)-6-fluoro-4-trifluoromethylbenzene,
1,3-bis(3-amino-2,4-bis(trifluoromethyl)phenoxy)-2,4-ditrifluoromethylbenzene,
1,3-bis(3-amino-2,5-bis(trifluoromethyl)phenoxy)-2,4-ditrifluoromethylbenzene,
1,3-bis(3-amino-2,6-bis(trifluoromethyl)phenoxy)-2,4-ditrifluoromethylbenzene,
1,3-bis(3-amino-4,5-bis(trifluoromethyl)phenoxy)-2,4-ditrifluoromethylbenzene,
1,3-bis(3-amino-4,6-bis(trifluoromethyl)phenoxy)-2,4-ditrifluoromethylbenzene,
1,3-bis(3-amino-5,6-bis(trifluoromethyl)phenoxy)-2,4-ditrifluoromethylbenzene,
1,3-bis(3-amino-2,4-bis(trifluoromethyl)phenoxy)-4,5-ditrifluoromethylbenzene,
1,3-bis(3-amino-2,5-bis(trifluoromethyl)phenoxy)-4,5-ditrifluoromethylbenzene,
1,3-bis(3-amino-2,6-bis(trifluoromethyl)phenoxy)-4,5-ditrifluoromethylbenzene,
1,3-bis(3-amino-4,5-bis(trifluoromethyl)phenoxy)-4,5-ditrifluoromethylbenzene,
1,3-bis(3-amino-4,6-bis(trifluoromethyl)phenoxy)-4,5-ditrifluoromethylbenzene,
1,3-bis(3-amino-5,6-bis(trifluoromethyl)phenoxy)-4,5-ditrifluoromethylbenzene,
1,3-bis(3-amino-2,4-bis(trifluoromethyl)phenoxy)-4,6-ditrifluoromethylbenzene,
1,3-bis(3-amino-2,5-bis(trifluoromethyl)phenoxy)-4,6-ditrifluoromethylbenzene,
1,3-bis(3-amino-2,6-bis(trifluoromethyl)phenoxy)-4,6-ditrifluoromethylbenzene,
1,3-bis(3-amino-4,5-bis(trifluoromethyl)phenoxy)-4,6-ditrifluoromethylbenzene,
1,3-bis(3-amino-4,6-bis(trifluoromethyl)phenoxy)-4,6-ditrifluoromethylbenzene,
1,3-bis(3-amino-5,6-bis(trifluoromethyl)phenoxy)-4,6-ditrifluoromethylbenzene,
1,3-bis(3-amino-2-fluoro-5-trifluoromethylphenoxy)-4-trifluoromethylbenzene,
1,3-bis(3-amino-4-fluoro-5-trifluoromethylphenoxy)-4-trifluoromethylbenzene,
1,3-bis(3-amino-6-fluoro-5-trifluoromethylphenoxy)-4-trifluoromethylbenzene,
1,3-bis(3-amino-2-fluoro-4-trifluoromethylphenoxy)-4-trifluoromethylbenzene,
1,3-bis(3-amino-5-fluoro-4-trifluoromethylphenoxy)-4-trifluoromethylbenzene,
1,3-bis(3-amino-6-fluoro-4-trifluoromethylphenoxy)-4-trifluoromethylbenzene,
1,3-bis(3-amino-4-fluoro-2-trifluoromethylphenoxy)-4-trifluoromethylbenzene,
1,3-bis(3-amino-5-fluoro-2-trifluoromethylphenoxy)-4-trifluoromethylbenzene,
1,3-bis(3-amino-6-fluoro-2-trifluoromethylphenoxy)-4-trifluoromethylbenzene,
1,3-bis(3-amino-2-fluoro-6-trifluoromethylphenoxy)-4-trifluoromethylbenzene,
1,3-bis(3-amino-4-fluoro-6-trifluoromethylphenoxy)-4-trifluoromethylbenzene,
1,3-bis(3-amino-5-fluoro-6-trifluoromethylphenoxy)-4-trifluoromethylbenzene,
1,3-bis(3-amino-5-fluorophenoxy)-4-trifluoromethylbenzene,
1,3-bis(3-amino-4-fluorophenoxy)-4-trifluoromethylbenzene,
1,3-bis(3-amino-2-fluorophenoxy)-4-trifluoromethylbenzene,
1,3-bis(3-amino-6-fluorophenoxy)-4-trifluoromethylbenzene,
1,3-bis(3-amino-2,6-difluorophenoxy)-4-trifluoromethylbenzene,
1,3-bis(3-amino-2,5-difluorophenoxy)-4-trifluoromethylbenzene,
1,3-bis(3-amino-2,4-difluorophenoxy)-4-trifluoromethylbenzene,
1,3-bis(3-amino-4,6-difluorophenoxy)-4-trifluoromethylbenzene,
1,3-bis(3-amino-4,5-difluorophenoxy)-4-trifluoromethylbenzene,
1,3-bis(3-amino-5,6-difluorophenoxy)-4-trifluoromethylbenzene,
1,3-bis(3-amino-2,4,5-trifluorophenoxy)-4-trifluoromethylbenzene,
1,3-bis(3-amino-2,4,6-trifluorophenoxy)-4-trifluoromethylbenzene,
1,3-bis(3-amino-2,5,6-trifluorophenoxy)-4-trifluoromethylbenzene,
1,3-bis(3-amino-4,5,6-trifluorophenoxy)-4-trifluoromethylbenzene,
1,3-bis(3-amino-2,4,5,6-tetrafluorophenoxy)-4-trifluoromethylbenzene,
1,3-bis(3-amino-5-fluorophenoxy)-2,4-bis(trifluoromethyl)benzene,
1,3-bis(3-amino-5-fluorophenoxy)-4,6-bis(trifluoromethyl)benzene,
1,3-bis(3-amino-5-fluorophenoxy)-4,5-bis(trifluoromethyl)benzene,
1,3-bis(3-amino-4-fluorophenoxy)-2,4-bis(trifluoromethyl)benzene,
1,3-bis(3-amino-4-fluorophenoxy)-4,6-bis(trifluoromethyl)benzene, 1,3-bis(3-amino-4-fluorophenoxy)-4,5-bis(trifluoromethyl)benzene,
1,3-bis(3-amino-2-fluorophenoxy)-2,4-bis(trifluoromethyl)benzene,
1,3-bis(3-amino-2-fluorophenoxy)-4,6-bis(trifluoromethyl)benzene,
1,3-bis(3-amino-2-fluorophenoxy)-4,5-bis(trifluoromethyl)benzene,
1,3-bis(3-amino-6-fluorophenoxy)-2,4-bis(trifluoromethyl)benzene,
1,3-bis(3-amino-6-fluorophenoxy)-4,6-bis(trifluoromethyl)benzene,
1,3-bis(3-amino-6-fluorophenoxy)-4,5-bis(trifluoromethyl)benzene,
1,3-bis(3-amino-2,4-difluorophenoxy)-4,6-bis(trifluoromethyl)benzene,
1,3-bis(3-amino-2,4-difluorophenoxy)-2,4-bis(trifluoromethyl)benzene,
1,3-bis(3-amino-2,4-difluorophenoxy)-4,5-bis(trifluoromethyl)benzene,
1,3-bis(3-amino-2,5-difluorophenoxy)-2,4-bis(trifluoromethyl)benzene,
1,3-bis(3-amino-2,5-difluorophenoxy)-4,6-bis(trifluoromethyl)benzene,
1,3-bis(3-amino-2,5-difluorophenoxy)-4,5-bis(trifluoromethyl)benzene,
1,3-bis(3-amino-2,6-difluorophenoxy)-2,4-bis(trifluoromethyl)benzene,
1,3-bis(3-amino-2,6-difluorophenoxy)-4,6-bis(trifluoromethyl)benzene,
1,3-bis(3-amino-2,6-difluorophenoxy)-4,5-bis(trifluoromethyl)benzene,
1,3-bis(3-amino-4,5-difluorophenoxy)-2,4-bis(trifluoromethyl)benzene,
1,3-bis(3-amino-4,5-difluorophenoxy)-4,6-bis(trifluoromethyl)benzene,
1,3-bis(3-amino-4,5-difluorophenoxy)-4,5-bis(trifluoromethyl)benzene,
1,3-bis(3-amino-4,6-difluorophenoxy)-2,4-bis(trifluoromethyl)benzene,
1,3-bis(3-amino-4,6-difluorophenoxy)-4,6-bis(trifluoromethyl)benzene,
1,3-bis(3-amino-4,6-difluorophenoxy)-4,5-bis(trifluoromethyl)benzene,
1,3-bis(3-amino-5,6-difluorophenoxy)-2,4-bis(trifluoromethyl)benzene,
1,3-bis(3-amino-5,6-difluorophenoxy)-4,6-bis(trifluoromethyl)benzene,
1,3-bis(3-amino-5,6-difluorophenoxy)-4,5-bis(trifluoromethyl)benzene,
1,3-bis(3-amino-2,4,5-trifluorophenoxy)-2,4-bis(trifluoromethyl)benzene,
1,3-bis(3-amino-2,4,5-trifluorophenoxy)-4,6-bis(trifluoromethyl)benzene,
1,3-bis(3-amino-2,4,5-trifluorophenoxy)-4,5-bis(trifluoromethyl)benzene,
1,3-bis(3-amino-2,4,6-trifluorophenoxy)-2,4-bis(trifluoromethyl)benzene,
1,3-bis(3-amino-2,4,6-trifluorophenoxy)-4,6-bis(trifluoromethyl)benzene,
1,3-bis(3-amino-2,4,6-trifluorophenoxy)-4,5-bis(trifluoromethyl)benzene,
1,3-bis(3-amino-4,5,6-trifluorophenoxy)-2,4-bis(trifluoromethyl)benzene,
1,3-bis(3-amino-4,5,6-trifluorophenoxy)-4,6-bis(trifluoromethyl)benzene,
1,3-bis(3-amino-4,5,6-trifluorophenoxy)-4,5-bis(trifluoromethyl)benzene,
1,3-bis(3-amino-2,4,5,6-tetrafluorophenoxy)-2,4-bis(trifluoromethyl)benzene,
1,3-bis(3-amino-2,4,5,6-tetrafluorophenoxy)-4,6-bis(trifluoromethyl)benzene,
1,3-bis(3-amino-2,4,5,6-tetrafluorophenoxy)-4,5-bis(trifluoromethyl)benzene,
1,3-bis(3-amino-5-fluorophenoxy)-2-fluoro-4-trifluoromethylbenzene,
1,3-bis(3-amino-5-fluorophenoxy)-5-fluoro-4-trifluoromethylbenzene,
1,3-bis(3-amino-5-fluorophenoxy)-6-fluoro-4-trifluoromethylbenzene,
1,3-bis(3-amino-4-fluorophenoxy)-2-fluoro-4-trifluoromethylbenzene,
1,3-bis(3-amino-4-fluorophenoxy)-5-fluoro-4-trifluoromethylbenzene,
1,3-bis(3-amino-4-fluorophenoxy)-6-fluoro-4-trifluoromethylbenzene,
1,3-bis(3-amino-2-fluorophenoxy)-2-fluoro-4-trifluoromethylbenzene,
1,3-bis(3-amino-2-fluorophenoxy)-5-fluoro-4-trifluoromethylbenzene,
1,3-bis(3-amino-2-fluorophenoxy)-6-fluoro-4-trifluoromethylbenzene,
1,3-bis(3-amino-6-fluorophenoxy)-2-fluoro-4-trifluoromethylbenzene,
1,3-bis(3-amino-6-fluorophenoxy)-5-fluoro-4-trifluoromethylbenzene,
1,3-bis(3-amino-6-fluorophenoxy)-6-fluoro-4-trifluoromethylbenzene,
1,3-bis(3-amino-2,6-difluorophenoxy)-2-fluoro-4-trifluoromethylbenzene,
1,3-bis(3-amino-2,6-difluorophenoxy)-5-fluoro-4-trifluoromethylbenzene,
1,3-bis(3-amino-2,6-difluorophenoxy)-6-fluoro-4-trifluoromethylbenzene,
1,3-bis(3-amino-2,5-difluorophenoxy)-2-fluoro-4-trifluoromethylbenzene,
1,3-bis(3-amino-2,5-difluorophenoxy)-5-fluoro-4-trifluoromethylbenzene,
1,3-bis(3-amino-2,5-difluorophenoxy)-6-fluoro-4-trifluoromethylbenzene,
1,3-bis(3-amino-2,4-difluorophenoxy)-2-fluoro-4-trifluoromethylbenzene,
1,3-bis(3-amino-2,4-difluorophenoxy)-5-fluoro-4-trifluoromethylbenzene,
1,3-bis(3-amino-2,4-difluorophenoxy)-6-fluoro-4-trifluoromethylbenzene,
1,3-bis(3-amino-4,6-difluorophenoxy)-2-fluoro-4-trifluoromethylbenzene,
1,3-bis(3-amino-4,6-difluorophenoxy)-5-fluoro-4-trifluoromethylbenzene,
1,3-bis(3-amino-4,6-difluorophenoxy)-6-fluoro-4-trifluoromethylbenzene,
1,3-bis(3-amino-4,5-difluorophenoxy)-2-fluoro-4-trifluoromethylbenzene, 1,3-bis(3-amino-4,5-difluorophenoxy)-5-fluoro-4-trifluoromethylbenzene,
1,3-bis(3-amino-4,5-difluorophenoxy)-6-fluoro-4-trifluoromethylbenzene,
1,3-bis(3-amino-5,6-difluorophenoxy)-2-fluoro-4-trifluoromethylbenzene,
1,3-bis(3-amino-5,6-difluorophenoxy)-5-fluoro-4-trifluoromethylbenzene,
1,3-bis(3-amino-5,6-difluorophenoxy)-6-fluoro-4-trifluoromethylbenzene,
1,3-bis(3-amino-2,4,5-trifluorophenoxy)-2-fluoro-4-trifluoromethylbenzene,
1,3-bis(3-amino-2,4,5-trifluorophenoxy)-5-fluoro-4-trifluoromethylbenzene,
1,3-bis(3-amino-2,4,5-trifluorophenoxy)-6-fluoro-4-trifluoromethylbenzene,
1,3-bis(3-amino-2,4,6-trifluorophenoxy)-2-fluoro-4-trifluoromethylbenzene,
1,3-bis(3-amino-2,4,6-trifluorophenoxy)-5-fluoro-4-trifluoromethylbenzene,
1,3-bis(3-amino-2,4,6-trifluorophenoxy)-6-fluoro-4-trifluoromethylbenzene,
1,3-bis(3-amino-2,5,6-trifluorophenoxy)-2-fluoro-4-trifluoromethylbenzene,
1,3-bis(3-amino-2,5,6-trifluorophenoxy)-5-fluoro-4-trifluoromethylbenzene,
1,3-bis(3-amino-2,5,6-trifluorophenoxy)-6-fluoro-4-trifluoromethylbenzene,
1,3-bis(3-amino-4,5,6-trifluorophenoxy)-2-fluoro-4-trifluoromethylbenzene,
1,3-bis(3-amino-4,5,6-trifluorophenoxy)-5-fluoro-4-trifluoromethylbenzene,
1,3-bis(3-amino-4,5,6-trifluorophenoxy)-6-fluoro-4-trifluoromethylbenzene,
1,3-bis(3-amino-2,4,5,6-tetrafluorophenoxy)-2-fluoro-4-trifluoromethylbenzene,
1,3-bis(3-amino-2,4,5,6-tetrafluorophenoxy)-5-fluoro-4-trifluoromethylbenzene,
1,3-bis(3-amino-2,4,5,6-tetrafluorophenoxy)-6-fluoro-4-trifluoromethylbenzene,
1,3-bis(3-amino-5-fluorophenoxy)-5-fluoro-2,4-bis(trifluoromethyl)benzene,
1,3-bis(3-amino-5-fluorophenoxy)-6-fluoro-2,4-bis(trifluoromethyl)benzene,
1,3-bis(3-amino-5-fluorophenoxy)-2-fluoro-4,6-bis(trifluoromethyl)benzene,
1,3-bis(3-amino-5-fluorophenoxy)-5-fluoro-4,6-bis(trifluoromethyl)benzene,
1,3-bis(3-amino-4-fluorophenoxy)-5-fluoro-2,4-bis(trifluoromethyl)benzene,
1,3-bis(3-amino-4-fluorophenoxy)-6-fluoro-2,4-bis(trifluoromethyl)benzene,
1,3-bis(3-amino-4-fluorophenoxy)-2-fluoro-4,6-bis(trifluoromethyl)benzene,
1,3-bis(3-amino-4-fluorophenoxy)-5-fluoro-4,6-bis(trifluoromethyl)benzene,
1,3-bis(3-amino-2-fluorophenoxy)-5-fluoro-2,4-bis(trifluoromethyl)benzene,
1,3-bis(3-amino-2-fluorophenoxy)-6-fluoro-2,4-bis(trifluoromethyl)benzene,
1,3-bis(3-amino-2-fluorophenoxy)-2-fluoro-4,6-bis(trifluoromethyl)benzene,
1,3-bis(3-amino-2-fluorophenoxy)-5-fluoro-4,6-bis(trifluoromethyl)benzene,
1,3-bis(3-amino-6-fluorophenoxy)-5-fluoro-2,4-bis(trifluoromethyl)benzene,
1,3-bis(3-amino-6-fluorophenoxy)-6-fluoro-2,4-bis(trifluoromethyl)benzene,
1,3-bis(3-amino-6-fluorophenoxy)-2-fluoro-4,6-bis(trifluoromethyl)benzene,
1,3-bis(3-amino-6-fluorophenoxy)-5-fluoro-4,6-bis(trifluoromethyl)benzene,
1,3-bis(3-amino-2,4-difluorophenoxy)-2-fluoro-4,6-bis(trifluoromethyl)benzene,
1,3-bis(3-amino-2,4-difluorophenoxy)-5-fluoro-4,6-bis(trifluoromethyl)benzene,
1,3-bis(3-amino-2,4-difluorophenoxy)-5-fluoro-2,4-bis(trifluoromethyl)benzene,
1,3-bis(3-amino-2,4-difluorophenoxy)-6-fluoro-2,4-bis(trifluoromethyl)benzene,
1,3-bis(3-amino-2,4-difluorophenoxy)-6-fluoro-4,5-bis(trifluoromethyl)benzene,
1,3-bis(3-amino-2,4-difluorophenoxy)-2-fluoro-4,5-bis(trifluoromethyl)benzene,
1,3-bis(3-amino-2,5-difluorophenoxy)-2-fluoro-4,6-bis(trifluoromethyl)benzene,
1,3-bis(3-amino-2,5-difluorophenoxy)-5-fluoro-4,6-bis(trifluoromethyl)benzene,
1,3-bis(3-amino-2,5-difluorophenoxy)-2-fluoro-4,5-bis(trifluoromethyl)benzene,
1,3-bis(3-amino-2,5-difluorophenoxy)-6-fluoro-4,5-bis(trifluoromethyl)benzene,
1,3-bis(3-amino-2,5-difluorophenoxy)-5-fluoro-2,4-bis(trifluoromethyl)benzene,
1,3-bis(3-amino-2,5-difluorophenoxy)-6-fluoro-2,4-bis(trifluoromethyl)benzene,
1,3-bis(3-amino-2,6-difluorophenoxy)-2-fluoro-4,6-bis(trifluoromethyl)benzene,
1,3-bis(3-amino-2,6-difluorophenoxy)-5-fluoro-4,6-bis(trifluoromethyl)benzene,
1,3-bis(3-amino-2,6-difluorophenoxy)-2-fluoro-4,5-bis(trifluoromethyl)benzene,
1,3-bis(3-amino-2,6-difluorophenoxy)-6-fluoro-4,5-bis(trifluoromethyl)benzene,
1,3-bis(3-amino-2,6-difluorophenoxy)-5-fluoro-2,4-bis(trifluoromethyl)benzene,
1,3-bis(3-amino-2,6-difluorophenoxy)-6-fluoro-2,4-bis(trifluoromethyl)benzene,
1,3-bis(3-amino-4,5-difluorophenoxy)-2-fluoro-4,6-bis(trifluoromethyl)benzene,
1,3-bis(3-amino-4,5-difluorophenoxy)-5-fluoro-4,6-bis(trifluoromethyl)benzene,
1,3-bis(3-amino-4,5-difluorophenoxy)-2-fluoro-4,5-bis(trifluoromethyl)benzene,
1,3-bis(3-amino-4,5-difluorophenoxy)-6-fluoro-4,5-bis(trifluoromethyl)benzene,
1,3-bis(3-amino-4,5-difluorophenoxy)-6-fluoro-2,4-bis(trifluoromethyl)benzene,
1,3-bis(3-amino-4,5-difluorophenoxy)-5-fluoro-2,4-bis(trifluoromethyl)benzene,
1,3-bis(3-amino-4,6-difluorophenoxy)-2-fluoro-4,6-bis(trifluoromethyl)benzene,
1,3-bis(3-amino-4,6-difluorophenoxy)-5-fluoro-4,6-bis(trifluoromethyl)benzene, 1,3-bis(3-amino-4,6-difluorophenoxy)-6-fluoro-4,5-bis(trifluoromethyl)benzene,
1,3-bis(3-amino-4,6-difluorophenoxy)-2-fluoro-4,5-bis(trifluoromethyl)benzene,
1,3-bis(3-amino-4,6-difluorophenoxy)-5-fluoro-2,4-bis(trifluoromethyl)benzene,
1,3-bis(3-amino-4,6-difluorophenoxy)-6-fluoro-2,4-bis(trifluoromethyl)benzene,
1,3-bis(3-amino-5,6-difluorophenoxy)-2-fluoro-4,6-bis(trifluoromethyl)benzene,
1,3-bis(3-amino-5,6-difluorophenoxy)-5-fluoro-4,6-bis(trifluoromethyl)benzene,
1,3-bis(3-amino-5,6-difluorophenoxy)-2-fluoro-4,5-bis(trifluoromethyl)benzene,
1,3-bis(3-amino-5,6-difluorophenoxy)-6-fluoro-4,5-bis(trifluoromethyl)benzene,
1,3-bis(3-amino-5,6-difluorophenoxy)-6-fluoro-2,4-bis(trifluoromethyl)benzene,
1,3-bis(3-amino-5,6-difluorophenoxy)-5-fluoro-2,4-bis(trifluoromethyl)benzene,
1,3-bis(3-amino-2,4,5-trifluorophenoxy)-2-fluoro-4,6-bis(trifluoromethyl)benzene,
1,3-bis(3-amino-2,4,5-trifluorophenoxy)-5-fluoro-4,6-bis(trifluoromethyl)benzene,
1,3-bis(3-amino-2,4,5-trifluorophenoxy)-2-fluoro-4,5-bis(trifluoromethyl)benzene,
1,3-bis(3-amino-2,4,5-trifluorophenoxy)-5-fluoro-4,5-bis(trifluoromethyl)benzene,
1,3-bis(3-amino-2,4,5-trifluorophenoxy)-5-fluoro-2,4-bis(trifluoromethyl)benzene,
1,3-bis(3-amino-2,4,5-trifluorophenoxy)-6-fluoro-2,4-bis(trifluoromethyl)benzene,
1,3-bis(3-amino-2,4,6-trifluorophenoxy)-2-fluoro-4,6-bis(trifluoromethyl)benzene,
1,3-bis(3-amino-2,4,6-trifluorophenoxy)-5-fluoro-4,6-bis(trifluoromethyl)benzene,
1,3-bis(3-amino-2,4,6-trifluorophenoxy)-2-fluoro-4,5-bis(trifluoromethyl)benzene,
1,3-bis(3-amino-2,4,6-trifluorophenoxy)-6-fluoro-4,5-bis(trifluoromethyl)benzene,
1,3-bis(3-amino-2,4,6-trifluorophenoxy)-6-fluoro-2,4-bis(trifluoromethyl)benzene,
1,3-bis(3-amino-2,4,6-trifluorophenoxy)-5-fluoro-2,4-bis(trifluoromethyl)benzene,
1,3-bis(3-amino-4,5,6-trifluorophenoxy)-2-fluoro-4,6-bis(trifluoromethyl)benzene,
1,3-bis(3-amino-4,5,6-trifluorophenoxy)-5-fluoro-4,6-bis(trifluoromethyl)benzene,
1,3-bis(3-amino-4,5,6-trifluorophenoxy)-2-fluoro-4,5-bis(trifluoromethyl)benzene,
1,3-bis(3-amino-4,5,6-trifluorophenoxy)-6-fluoro-4,5-bis(trifluoromethyl)benzene,
1,3-bis(3-amino-4,5,6-trifluorophenoxy)-6-fluoro-2,4-bis(trifluoromethyl)benzene,
1,3-bis(3-amino-4,5,6-trifluorophenoxy)-5-fluoro-2,4-bis(trifluoromethyl)benzene,
1,3-bis(3-amino-2,4,5,6-tetrafluorophenoxy)-2-fluoro-4,6-bis(trifluoromethyl)benzene,
1,3-bis(3-amino-2,4,5,6-tetrafluorophenoxy)-5-fluoro-4,6-bis(trifluoromethyl)benzene,
1,3-bis(3-amino-2,4,5,6-tetrafluorophenoxy)-2-fluoro-4,5-bis(trifluoromethyl)benzene,
1,3-bis(3-amino-2,4,5,6-tetrafluorophenoxy)-6-fluoro-4,5-bis(trifluoromethyl)benzene,
1,3-bis(3-amino-2,4,5,6-tetrafluorophenoxy)-6-fluoro-2,4-bis(trifluoromethyl)benzene,
1,3-bis(3-amino-2,4,5,6-tetrafluorophenoxy)-5-fluoro-2,4-bis(trifluoromethyl)benzene,
1,3-bis(3-amino-2-fluorophenoxy)-2,4-bis(trifluoromethyl)benzene,
1,3-bis(3-amino-2-fluorophenoxy)-4,5-bis(trifluoromethyl)benzene,
1,3-bis(3-amino-2-fluorophenoxy)-4,6-bis(trifluoromethyl)benzene,
1,3-bis(3-amino-4-fluorophenoxy)-2,4-bis(trifluoromethyl)benzene,
1,3-bis(3-amino-4-fluorophenoxy)-4,5-bis(trifluoromethyl)benzene,
1,3-bis(3-amino-4-fluorophenoxy)-4,6-bis(trifluoromethyl)benzene,
1,3-bis(3-amino-5-fluorophenoxy)-2,4-bis(trifluoromethyl)benzene,
1,3-bis(3-amino-5-fluorophenoxy)-4,5-bis(trifluoromethyl)benzene,
1,3-bis(3-amino-5-fluorophenoxy)-4,6-bis(trifluoromethyl)benzene,
1,3-bis(3-amino-6-fluorophenoxy)-2,4-bis(trifluoromethyl)benzene,
1,3-bis(3-amino-6-fluorophenoxy)-4,5-bis(trifluoromethyl)benzene,
1,3-bis(3-amino-6-fluorophenoxy)-4,6-bis(trifluoromethyl)benzene,
1,3-bis(3-amino-5-fluorophenoxy)-2,5-difluoro-4-trifluoromethylbenzene,
1,3-bis(3-amino-5-fluorophenoxy)-2,6-difluoro-4-trifluoromethylbenzene,
1,3-bis(3-amino-5-fluorophenoxy)-5,6-difluoro-4-trifluoromethylbenzene,
1,3-bis(3-amino-4-fluorophenoxy)-2,5-difluoro-4-trifluoromethylbenzene,
1,3-bis(3-amino-4-fluorophenoxy)-2,6-difluoro-4-trifluoromethylbenzene,
1,3-bis(3-amino-4-fluorophenoxy)-5,6-difluoro-4-trifluoromethylbenzene,
1,3-bis(3-amino-2-fluorophenoxy)-2,5-difluoro-4-trifluoromethylbenzene,
1,3-bis(3-amino-2-fluorophenoxy)-2,6-difluoro-4-trifluoromethylbenzene,
1,3-bis(3-amino-2-fluorophenoxy)-5,6-difluoro-4-trifluoromethylbenzene,
1,3-bis(3-amino-6-fluorophenoxy)-2,5-difluoro-4-trifluoromethylbenzene,
1,3-bis(3-amino-6-fluorophenoxy)-2,6-difluoro-4-trifluoromethylbenzene,
1,3-bis(3-amino-6-fluorophenoxy)-5,6-difluoro-4-trifluoromethylbenzene,
1,3-bis(3-amino-2,6-difluorophenoxy)-2,5-difluoro-4-trifluoromethylbenzene,
1,3-bis(3-amino-2,6-difluorophenoxy)-2,6-difluoro-4-trifluoromethylbenzene,
1,3-bis(3-amino-2,6-difluorophenoxy)-5,6-difluoro-4-trifluoromethylbenzene,
1,3-bis(3-amino-2,5-difluorophenoxy)-2,5-difluoro-4-trifluoromethylbenzene, 1,3-bis(3-amino-2,5-difluorophenoxy)-2,6-difluoro-4-trifluoromethylbenzene,
1,3-bis(3-amino-2,5-difluorophenoxy)-5,6-difluoro-4-trifluoromethylbenzene,
1,3-bis(3-amino-2,4-difluorophenoxy)-2,5-difluoro-4-trifluoromethylbenzene,
1,3-bis(3-amino-2,4-difluorophenoxy)-2,6-difluoro-4-trifluoromethylbenzene,
1,3-bis(3-amino-2,4-difluorophenoxy)-5,6-difluoro-4-trifluoromethylbenzene,
1,3-bis(3-amino-4,6-difluorophenoxy)-2,5-difluoro-4-trifluoromethylbenzene,
1,3-bis(3-amino-4,6-difluorophenoxy)-2,6-difluoro-4-trifluoromethylbenzene,
1,3-bis(3-amino-4,6-difluorophenoxy)-5,6-difluoro-4-trifluoromethylbenzene,
1,3-bis(3-amino-4,5-difluorophenoxy)-2,5-difluoro-4-trifluoromethylbenzene,
1,3-bis(3-amino-4,5-difluorophenoxy)-2,6-difluoro-4-trifluoromethylbenzene,
1,3-bis(3-amino-4,5-difluorophenoxy)-5,6-difluoro-4-trifluoromethylbenzene,
1,3-bis(3-amino-5,6-difluorophenoxy)-2,5-difluoro-4-trifluoromethylbenzene,
1,3-bis(3-amino-5,6-difluorophenoxy)-2,6-difluoro-4-trifluoromethylbenzene,
1,3-bis(3-amino-5,6-difluorophenoxy)-5,6-difluoro-4-trifluoromethylbenzene,
1,3-bis(3-amino-2,4,5-trifluorophenoxy)-2,5-difluoro-4-trifluoromethylbenzene,
1,3-bis(3-amino-2,4,5-trifluorophenoxy)-2,6-difluoro-4-trifluoromethylbenzene,
1,3-bis(3-amino-2,4,5-trifluorophenoxy)-5,6-difluoro-4-trifluoromethylbenzene,
1,3-bis(3-amino-2,4,6-trifluorophenoxy)-2,5-difluoro-4-trifluoromethylbenzene,
1,3-bis(3-amino-2,4,6-trifluorophenoxy)-2,6-difluoro-4-trifluoromethylbenzene,
1,3-bis(3-amino-2,4,6-trifluorophenoxy)-5,6-difluoro-4-trifluoromethylbenzene,
1,3-bis(3-amino-2,5,6-trifluorophenoxy)-2,5-difluoro-4-trifluoromethylbenzene,
1,3-bis(3-amino-2,5,6-trifluorophenoxy)-2,6-difluoro-4-trifluoromethylbenzene,
1,3-bis(3-amino-2,5,6-trifluorophenoxy)-5,6-difluoro-4-trifluoromethylbenzene,
1,3-bis(3-amino-4,5,6-trifluorophenoxy)-2,5-difluoro-4-trifluoromethylbenzene,
1,3-bis(3-amino-4,5,6-trifluorophenoxy)-2,6-difluoro-4-trifluoromethylbenzene,
1,3-bis(3-amino-4,5,6-trifluorophenoxy)-5,6-difluoro-4-trifluoromethylbenzene,
1,3-bis(3-amino-2,4,5,6-tetrafluorophenoxy)-2,5-difluoro-4-trifluoromethylbenzene,
1,3-bis(3-amino-2,4,5,6-tetrafluorophenoxy)-2,6-difluoro-4-trifluoromethylbenzene,
1,3-bis(3-amino-2,4,5,6-tetrafluorophenoxy)-5,6-difluoro-4-trifluoromethylbenzene,
1,3-bis(3-amino-5-fluorophenoxy)-5,6-difluoro-2,4-bis(trifluoromethyl)benzene,
1,3-bis(3-amino-5-fluorophenoxy)-2,5-difluoro-4,6-bis(trifluoromethyl)benzene,
1,3-bis(3-amino-5-fluorophenoxy)-2,6-difluoro-4,5-bis(trifluoromethyl)benzene,
1,3-bis(3-amino-4-fluorophenoxy)-5,6-difluoro-2,4-bis(trifluoromethyl)benzene,
1,3-bis(3-amino-4-fluorophenoxy)-2,5-difluoro-4,6-bis(trifluoromethyl)benzene,
1,3-bis(3-amino-4-fluorophenoxy)-2,6-difluoro-4,5-bis(trifluoromethyl)benzene,
1,3-bis(3-amino-2-fluorophenoxy)-5,6-difluoro-2,4-bis(trifluoromethyl)benzene,
1,3-bis(3-amino-2-fluorophenoxy)-2,5-difluoro-4,6-bis(trifluoromethyl)benzene,
1,3-bis(3-amino-2-fluorophenoxy)-2,6-difluoro-4,5-bis(trifluoromethyl)benzene,
1,3-bis(3-amino-6-fluorophenoxy)-5,6-difluoro-2,4-bis(trifluoromethyl)benzene,
1,3-bis(3-amino-6-fluorophenoxy)-2,5-difluoro-4,6-bis(trifluoromethyl)benzene,
1,3-bis(3-amino-6-fluorophenoxy)-2,6-difluoro-4,5-bis(trifluoromethyl)benzene,
1,3-bis(3-amino-2,4-difluorophenoxy)-2,5-difluoro-4,6-bis(trifluoromethyl)benzene,
1,3-bis(3-amino-2,4-difluorophenoxy)-2,6-difluoro-4,5-bis(trifluoromethyl)benzene,
1,3-bis(3-amino-2,4-difluorophenoxy)-5,6-difluoro-2,4-bis(trifluoromethyl)benzene,
1,3-bis(3-amino-2,5-difluorophenoxy)-2,5-difluoro-4,6-bis(trifluoromethyl)benzene,
1,3-bis(3-amino-2,5-difluorophenoxy)-2,6-difluoro-4,5-bis(trifluoromethyl)benzene,
1,3-bis(3-amino-2,5-difluorophenoxy)-5,6-difluoro-2,4-bis(trifluoromethyl)benzene,
1,3-bis(3-amino-2,6-difluorophenoxy)-2,5-difluoro-4,6-bis(trifluoromethyl)benzene,
1,3-bis(3-amino-2,6-difluorophenoxy)-2,6-difluoro-4,5-bis(trifluoromethyl)benzene,
1,3-bis(3-amino-2,6-difluorophenoxy)-3,5-difluoro-2,4-bis(trifluoromethyl)benzene,
1,3-bis(3-amino-4,5-difluorophenoxy)-2,5-difluoro-4,6-bis(trifluoromethyl)benzene,
1,3-bis(3-amino-4,5-difluorophenoxy)-2,6-difluoro-4,5-bis(trifluoromethyl)benzene,
1,3-bis(3-amino-4,5-difluorophenoxy)-3,5-difluoro-2,4-bis(trifluoromethyl)benzene,
1,3-bis(3-amino-4,6-difluorophenoxy)-2,5-difluoro-4,6-bis(trifluoromethyl)benzene,
1,3-bis(3-amino-4,6-difluorophenoxy)-3,6-difluoro-4,5-bis(trifluoromethyl)benzene,
1,3-bis(3-amino-4,6-difluorophenoxy)-3,5-difluoro-2,4-bis(trifluoromethyl)benzene,
1,3-bis(3-amino-5,6-difluorophenoxy)-4,6-bis(trifluoromethyl)benzene,
1,3-bis(3-amino-5,6-difluorophenoxy)-4,6-bis(trifluoromethyl)benzene,
1,3-bis(3-amino-5,6-difluorophenoxy)-4,6-bis(trifluoromethyl)benzene,
1,3-bis(3-amino-2,4,5-trifluorophenoxy)-4,6-bis(trifluoromethyl)benzene,
1,3-bis(3-amino-2,4,6-trifluorophenoxy)-4,6-bis(trifluoromethyl)benzene,
1,3-bis(3-amino-4,5,6-trifluorophenoxy)-4,6-bis(trifluoromethyl)benzene, 1,3-bis(3-amino-2,4,5,6-tetrafluorophenoxy)-4,6-bis(trifluoromethyl)benzene,
1,3-bis(3-amino-5-fluorophenoxy)-2,5-difluoro-4-trifluoromethylbenzene,
1,3-bis(3-amino-5-fluorophenoxy)-2,6-difluoro-4-trifluoromethylbenzene,
1,3-bis(3-amino-5-fluorophenoxy)-5,6-difluoro-4-trifluoromethylbenzene,
1,3-bis(3-amino-4-fluorophenoxy)-2,5-difluoro-4-trifluoromethylbenzene,
1,3-bis(3-amino-4-fluorophenoxy)-2,6-difluoro-4-trifluoromethylbenzene,
1,3-bis(3-amino-4-fluorophenoxy)-5,6-difluoro-4-trifluoromethylbenzene,
1,3-bis(3-amino-2-fluorophenoxy)-2,5-difluoro-4-trifluoromethylbenzene,
1,3-bis(3-amino-2-fluorophenoxy)-2,6-difluoro-4-trifluoromethylbenzene,
1,3-bis(3-amino-2-fluorophenoxy)-5,6-difluoro-4-trifluoromethylbenzene,
1,3-bis(3-amino-6-fluorophenoxy)-2,5-difluoro-4-trifluoromethylbenzene,
1,3-bis(3-amino-6-fluorophenoxy)-2,6-difluoro-4-trifluoromethylbenzene,
1,3-bis(3-amino-6-fluorophenoxy)-5,6-difluoro-4-trifluoromethylbenzene,
1,3-bis(3-amino-2,6-difluorophenoxy)-2,5-difluoro-4-trifluoromethylbenzene,
1,3-bis(3-amino-2,6-difluorophenoxy)-2,6-difluoro-4-trifluoromethylbenzene,
1,3-bis(3-amino-2,6-difluorophenoxy)-5,6-difluoro-4-trifluoromethylbenzene,
1,3-bis(3-amino-2,5-difluorophenoxy)-2,5-difluoro-4-trifluoromethylbenzene,
1,3-bis(3-amino-2,5-difluorophenoxy)-2,6-difluoro-4-trifluoromethylbenzene,
1,3-bis(3-amino-2,5-difluorophenoxy)-5,6-difluoro-4-trifluoromethylbenzene,
1,3-bis(3-amino-2,4-difluorophenoxy)-2,5-difluoro-4-trifluoromethylbenzene,
1,3-bis(3-amino-2,4-difluorophenoxy)-2,6-difluoro-4-trifluoromethylbenzene,
1,3-bis(3-amino-2,4-difluorophenoxy)-5,6-difluoro-4-trifluoromethylbenzene,
1,3-bis(3-amino-4,6-difluorophenoxy)-2,5-difluoro-4-trifluoromethylbenzene,
1,3-bis(3-amino-4,6-difluorophenoxy)-2,6-difluoro-4-trifluoromethylbenzene,
1,3-bis(3-amino-4,6-difluorophenoxy)-5,6-difluoro-4-trifluoromethylbenzene,
1,3-bis(3-amino-4,5-difluorophenoxy)-2,5-difluoro-4-trifluoromethylbenzene,
1,3-bis(3-amino-4,5-difluorophenoxy)-2,6-difluoro-4-trifluoromethylbenzene,
1,3-bis(3-amino-4,5-difluorophenoxy)-5,6-difluoro-4-trifluoromethylbenzene,
1,3-bis(3-amino-5,6-difluorophenoxy)-2,5-difluoro-4-trifluoromethylbenzene,
1,3-bis(3-amino-5,6-difluorophenoxy)-2,6-difluoro-4-trifluoromethylbenzene,
1,3-bis(3-amino-5,6-difluorophenoxy)-5,6-difluoro-4-trifluoromethylbenzene,
1,3-bis(3-amino-2,4,5-trifluorophenoxy)-2,5-difluoro-4-trifluoromethylbenzene,
1,3-bis(3-amino-2,4,5-trifluorophenoxy)-2,6-difluoro-4-trifluoromethylbenzene,
1,3-bis(3-amino-2,4,5-trifluorophenoxy)-5,6-difluoro-4-trifluoromethylbenzene,
1,3-bis(3-amino-2,4,6-trifluorophenoxy)-2,5-difluoro-4-trifluoromethylbenzene,
1,3-bis(3-amino-2,4,6-trifluorophenoxy)-2,6-difluoro-4-trifluoromethylbenzene,
1,3-bis(3-amino-2,4,6-trifluorophenoxy)-5,6-difluoro-4-trifluoromethylbenzene,
1,3-bis(3-amino-2,5,6-trifluorophenoxy)-2,5-difluoro-4-trifluoromethylbenzene,
1,3-bis(3-amino-2,5,6-trifluorophenoxy)-2,6-difluoro-4-trifluoromethylbenzene,
1,3-bis(3-amino-2,5,6-trifluorophenoxy)-5,6-difluoro-4-trifluoromethylbenzene,
1,3-bis(3-amino-4,5,6-trifluorophenoxy)-2,5-difluoro-4-trifluoromethylbenzene,
1,3-bis(3-amino-4,5,6-trifluorophenoxy)-2,6-difluoro-4-trifluoromethylbenzene,
1,3-bis(3-amino-4,5,6-trifluorophenoxy)-5,6-difluoro-4-trifluoromethylbenzene,
1,3-bis(3-amino-2,4,5,6-tetrafluorophenoxy)-2,5-difluoro-4-trifluoromethylbenzene,
1,3-bis(3-amino-2,4,5,6-tetrafluorophenoxy)-2,6-difluoro-4-trifluoromethylbenzene,
1,3-bis(3-amino-2,4,5,6-tetrafluorophenoxy)-5,6-difluoro-4-trifluoromethylbenzene,
1,3-bis(3-amino-2-fluoro-5-trifluoromethylphenoxy)-2-difluoro-4-trifluoromethylbenzene,
1,3-bis(3-amino-2-fluoro-5-trifluoromethylphenoxy)-5-difluoro-4-trifluoromethylbenzene,
1,3-bis(3-amino-2-fluoro-5-trifluoromethylphenoxy)-6-fluoro-4-trifluoromethylbenzene,
1,3-bis(3-amino-4-fluoro-5-trifluoromethylphenoxy)-2-fluoro-4-trifluoromethylbenzene,
1,3-bis(3-amino-4-fluoro-5-trifluoromethylphenoxy)-5-fluoro-4-trifluoromethylbenzene,
1,3-bis(3-amino-4-fluoro-5-trifluoromethylphenoxy)-6-fluoro-4-trifluoromethylbenzene,
1,3-bis(3-amino-6-fluoro-5-trifluoromethylphenoxy)-2-fluoro-4-trifluoromethylbenzene,
1,3-bis(3-amino-6-fluoro-5-trifluoromethylphenoxy)-5-fluoro-4-trifluoromethylbenzene,
1,3-bis(3-amino-6-fluoro-5-trifluoromethylphenoxy)-6-fluoro-4-trifluoromethylbenzene,
1,3-bis(3-amino-2-fluoro-4-trifluoromethylphenoxy)-2-fluoro-4-trifluoromethylbenzene,
1,3-bis(3-amino-2-fluoro-4-trifluoromethylphenoxy)-5-fluoro-4-trifluoromethylbenzene,
1,3-bis(3-amino-2-fluoro-4-trifluoromethylphenoxy)-6-fluoro-4-trifluoromethylbenzene,
1,3-bis(3-amino-5-fluoro-4-trifluoromethylphenoxy)-2-fluoro-4-trifluoromethylbenzene,
1,3-bis(3-amino-5-fluoro-4-trifluoromethylphenoxy)-5-fluoro-4-trifluoromethylbenzene,
1,3-bis(3-amino-5-fluoro-4-trifluoromethylphenoxy)-6-fluoro-4-trifluoromethylbenzene,
1,3-bis(3-amino-6-fluoro-4-trifluoromethylphenoxy)-2-fluoro-4-trifluoromethylbenzene, 1,3-bis(3-amino-6-fluoro-4-trifluoromethylphenoxy)-5-fluoro-4-trifluoromethylbenzene,
1,3-bis(3-amino-6-fluoro-4-trifluoromethylphenoxy)-6-fluoro-4-trifluoromethylbenzene,
1,3-bis(3-amino-4-fluoro-2-trifluoromethylphenoxy)-2-fluoro-4-trifluoromethylbenzene,
1,3-bis(3-amino-4-fluoro-2-trifluoromethylphenoxy)-5-fluoro-4-trifluoromethylbenzene,
1,3-bis(3-amino-4-fluoro-2-trifluoromethylphenoxy)-6-fluoro-4-trifluoromethylbenzene,
1,3-bis(3-amino-5-fluoro-2-trifluoromethylphenoxy)-2-fluoro-4-trifluoromethylbenzene,
1,3-bis(3-amino-5-fluoro-2-trifluoromethylphenoxy)-5-fluoro-4-trifluoromethylbenzene,
1,3-bis(3-amino-5-fluoro-2-trifluoromethylphenoxy)-6-fluoro-4-trifluoromethylbenzene,
1,3-bis(3-amino-6-fluoro-2-trifluoromethylphenoxy)-2-fluoro-4-trifluoromethylbenzene,
1,3-bis(3-amino-6-fluoro-2-trifluoromethylphenoxy)-5-fluoro-4-trifluoromethylbenzene,
1,3-bis(3-amino-6-fluoro-2-trifluoromethylphenoxy)-6-fluoro-4-trifluoromethylbenzene,
1,3-bis(3-amino-2-fluoro-6-trifluoromethylphenoxy)-2-fluoro-4-trifluoromethylbenzene,
1,3-bis(3-amino-2-fluoro-6-trifluoromethylphenoxy)-5-fluoro-4-trifluoromethylbenzene,
1,3-bis(3-amino-2-fluoro-6-trifluoromethylphenoxy)-6-fluoro-4-trifluoromethylbenzene,
1,3-bis(3-amino-4-fluoro-6-trifluoromethylphenoxy)-2-fluoro-4-trifluoromethylbenzene,
1,3-bis(3-amino-4-fluoro-6-trifluoromethylphenoxy)-5-fluoro-4-trifluoromethylbenzene,
1,3-bis(3-amino-4-fluoro-6-trifluoromethylphenoxy)-6-fluoro-4-trifluoromethylbenzene,
1,3-bis(3-amino-5-fluoro-6-trifluoromethylphenoxy)-2-fluoro-4-trifluoromethylbenzene,
1,3-bis(3-amino-5-fluoro-6-trifluoromethylphenoxy)-6-fluoro-4-trifluoromethylbenzene,
1,3-bis(3-amino-5-fluoro-6-trifluoromethylphenoxy)-5-fluoro-4-trifluoromethylbenzene,
1,3-bis(3-amino-5-trifluoromethylphenoxy)-2,6-difluoro-4-trifluoromethylbenzene,
1,3-bis(3-amino-5-trifluoromethylphenoxy)-2,5-difluoro-4-trifluoromethylbenzene,
1,3-bis(3-amino-5-trifluoromethylphenoxy)-5,6-difluoro-4-trifluoromethylbenzene,
1,3-bis(3-amino-4-trifluoromethylphenoxy)-2,6-difluoro-4-trifluoromethylbenzene,
1,3-bis(3-amino-4-trifluoromethylphenoxy)-2,5-difluoro-4-trifluoromethylbenzene,
1,3-bis(3-amino-4-trifluoromethylphenoxy)-5,6-difluoro-4-trifluoromethylbenzene,
1,3-bis(3-amino-2-trifluoromethylphenoxy)-2,6-difluoro-4-trifluoromethylbenzene,
1,3-bis(3-amino-2-trifluoromethylphenoxy)-2,5-difluoro-4-trifluoromethylbenzene,
1,3-bis(3-amino-2-trifluoromethylphenoxy)-5,6-difluoro-4-trifluoromethylbenzene,
1,3-bis(3-amino-6-trifluoromethylphenoxy)-2,5-difluoro-4-trifluoromethylbenzene,
1,3-bis(3-amino-6-trifluoromethylphenoxy)-5,6-difluoro-4-trifluoromethylbenzene,
1,3-bis(3-amino-6-trifluoromethylphenoxy)-2,6-difluoro-4-trifluoromethylbenzene,
1,3-bis(3-amino-5-trifluoromethylphenoxy)-2,5,6-trifluoro-4-trifluoromethylbenzene,
1,3-bis(3-amino-4-trifluoromethylphenoxy)-2,5,6-trifluoro-4-trifluoromethylbenzene,
1,3-bis(3-amino-2-trifluoromethylphenoxy)-2,5,6-trifluoro-4-trifluoromethylbenzene,
1,3-bis(3-amino-6-trifluoromethylphenoxy)-2,5,6-trifluoro-4-trifluoromethylbenzene,
1,3-bis(3-amino-2,4-difluoro-5-trifluoromethylphenoxy)-2-fluoro-4-trifluoromethylbenzene,
1,3-bis(3-amino-2,6-difluoro-5-trifluoromethylphenoxy)-2-fluoro-4-trifluoromethylbenzene,
1,3-bis(3-amino-4,6-difluoro-5-trifluoromethylphenoxy)-2-fluoro-4-trifluoromethylbenzene,
1,3-bis(3-amino-2,4-difluoro-5-trifluoromethylphenoxy)-5-fluoro-4-trifluoromethylbenzene,
1,3-bis(3-amino-2,6-difluoro-5-trifluoromethylphenoxy)-5-fluoro-4-trifluoromethylbenzene,
1,3-bis(3-amino-4,6-difluoro-5-trifluoromethylphenoxy)-5-fluoro-4-trifluoromethylbenzene,
1,3-bis(3-amino-2,4-difluoro-5-trifluoromethylphenoxy)-6-fluoro-4-trifluoromethylbenzene,
1,3-bis(3-amino-2,6-difluoro-5-trifluoromethylphenoxy)-6-fluoro-4-trifluoromethylbenzene,
1,3-bis(3-amino-4,6-difluoro-5-trifluoromethylphenoxy)-6-fluoro-4-trifluoromethylbenzene,
1,3-bis(3-amino-2,5-difluoro-4-trifluoromethylphenoxy)-2-fluoro-4-trifluoromethylbenzene,
1,3-bis(3-amino-2,6-difluoro-4-trifluoromethylphenoxy)-2-fluoro-4-trifluoromethylbenzene,
1,3-bis(3-amino-5,6-difluoro-4-trifluoromethylphenoxy)-2-fluoro-4-trifluoromethylbenzene,
1,3-bis(3-amino-2,5-difluoro-4-trifluoromethylphenoxy)-5-fluoro-4-trifluoromethylbenzene,
1,3-bis(3-amino-2,6-difluoro-4-trifluoromethylphenoxy)-5-fluoro-4-trifluoromethylbenzene,
1,3-bis(3-amino-5,6-difluoro-4-trifluoromethylphenoxy)-5-fluoro-4-trifluoromethylbenzene,
1,3-bis(3-amino-2,5-difluoro-4-trifluoromethylphenoxy)-6-fluoro-4-trifluoromethylbenzene,
1,3-bis(3-amino-2,6-difluoro-4-trifluoromethylphenoxy)-6-fluoro-4-trifluoromethylbenzene,
1,3-bis(3-amino-5,6-difluoro-4-trifluoromethylphenoxy)-6-fluoro-4-trifluoromethylbenzene,
1,3-bis(3-amino-4,5-difluoro-2-trifluoromethylphenoxy)-2-fluoro-4-trifluoromethylbenzene,
1,3-bis(3-amino-4,6-difluoro-2-trifluoromethylphenoxy)-2-fluoro-4-trifluoromethylbenzene,
1,3-bis(3-amino-5,6-difluoro-2-trifluoromethylphenoxy)-2-fluoro-4-trifluoromethylbenzene,
1,3-bis(3-amino-4,5-difluoro-2-trifluoromethylphenoxy)-5-fluoro-4-trifluoromethylbenzene,
1,3-bis(3-amino-4,6-difluoro-2-trifluoromethylphenoxy)-5-fluoro-4-trifluoromethylbenzene,
1,3-bis(3-amino-5,6-difluoro-2-trifluoromethylphenoxy)-5-fluoro-4-trifluoromethylbenzene,
1,3-bis(3-amino-4,5-difluoro-2-trifluoromethylphenoxy)-6-fluoro-4-trifluoromethylbenzene,
1,3-bis(3-amino-4,6-difluoro-2-trifluoromethylphenoxy)-6-fluoro-4-trifluoromethylbenzene, 1,3-bis(3-amino-5,6-difluoro-2-trifluoromethylphenoxy)-6-fluoro-4-trifluoromethylbenzene,
1,3-bis(3-amino-2,4-difluoro-6-trifluoromethylphenoxy)-2-fluoro-4-trifluoromethylbenzene,
1,3-bis(3-amino-2,5-difluoro-6-trifluoromethylphenoxy)-2-fluoro-4-trifluoromethylbenzene,
1,3-bis(3-amino-4,5-difluoro-6-trifluoromethylphenoxy)-2-fluoro-4-trifluoromethylbenzene,
1,3-bis(3-amino-2,4-difluoro-6-trifluoromethylphenoxy)-5-fluoro-4-trifluoromethylbenzene,
1,3-bis(3-amino-2,5-difluoro-6-trifluoromethylphenoxy)-5-fluoro-4-trifluoromethylbenzene,
1,3-bis(3-amino-4,5-difluoro-6-trifluoromethylphenoxy)-5-fluoro-4-trifluoromethylbenzene,
1,3-bis(3-amino-2,4-difluoro-6-trifluoromethylphenoxy)-6-fluoro-4-trifluoromethylbenzene,
1,3-bis(3-amino-2,5-difluoro-6-trifluoromethylphenoxy)-6-fluoro-4-trifluoromethylbenzene,
1,3-bis(3-amino-4,5-difluoro-6-trifluoromethylphenoxy)-6-fluoro-4-trifluoromethylbenzene,
1,3-bis(3-amino-2,4-difluoro-5-trifluoromethylphenoxy)-5-trifluoromethylbenzene,
1,3-bis(3-amino-2,6-difluoro-5-trifluoromethylphenoxy)-5-trifluoromethylbenzene,
1,3-bis(3-amino-4,6-difluoro-5-trifluoromethylphenoxy)-5-trifluoromethylbenzene,
1,3-bis(3-amino-2,5-difluoro-4-trifluoromethylphenoxy)-4-trifluoromethylbenzene,
1,3-bis(3-amino-2,6-difluoro-4-trifluoromethylphenoxy)-4-trifluoromethylbenzene,
1,3-bis(3-amino-5,6-difluoro-4-trifluoromethylphenoxy)-4-trifluoromethylbenzene,
1,3-bis(3-amino-4,5-difluoro-2-trifluoromethylphenoxy)-4-trifluoromethylbenzene,
1,3-bis(3-amino-4,6-difluoro-2-trifluoromethylphenoxy)-4-trifluoromethylbenzene,
1,3-bis(3-amino-5,6-difluoro-2-trifluoromethylphenoxy)-4-trifluoromethylbenzene,
1,3-bis(3-amino-4,5-difluoro-6-trifluoromethylphenoxy)-4-trifluoromethylbenzene,
1,3-bis(3-amino-2,4-difluoro-6-trifluoromethylphenoxy)-4-trifluoromethylbenzene,
1,3-bis(3-amino-2,5-difluoro-6-trifluoromethylphenoxy)-4-trifluoromethylbenzene,
1,3-bis(3-amino-2,4-difluoro-5-trifluoromethylphenoxy)-2,5-difluoro-4-trifluoromethylbenzene,
1,3-bis(3-amino-2,4-difluoro-5-trifluoromethylphenoxy)-2,6-difluoro-4-trifluoromethylbenzene,
1,3-bis(3-amino-2,4-difluoro-5-trifluoromethylphenoxy)-5,6-difluoro-4-trifluoromethylbenzene,
1,3-bis(3-amino-2,6-difluoro-5-trifluoromethylphenoxy)-2,5-difluoro-4-trifluoromethylbenzene,
1,3-bis(3-amino-2,6-difluoro-5-trifluoromethylphenoxy)-2,6-difluoro-4-trifluoromethylbenzene,
1,3-bis(3-amino-2,6-difluoro-5-trifluoromethylphenoxy)-5,6-difluoro-4-trifluoromethylbenzene,
1,3-bis(3-amino-4,6-difluoro-5-trifluoromethylphenoxy)-2,5-difluoro-4-trifluoromethylbenzene,
1,3-bis(3-amino-4,6-difluoro-5-trifluoromethylphenoxy)-2,6-difluoro-4-trifluoromethylbenzene,
1,3-bis(3-amino-4,6-difluoro-5-trifluoromethylphenoxy)-5,6-difluoro-4-trifluoromethylbenzene,
1,3-bis(3-amino-2,5-difluoro-4-trifluoromethylphenoxy)-2,5-difluoro-4-trifluoromethylbenzene,
1,3-bis(3-amino-2,5-difluoro-4-trifluoromethylphenoxy)-2,6-difluoro-4-trifluoromethylbenzene,
1,3-bis(3-amino-2,5-difluoro-4-trifluoromethylphenoxy)-5,6-difluoro-4-trifluoromethylbenzene,
1,3-bis(3-amino-2,6-difluoro-4-trifluoromethylphenoxy)-2,5-difluoro-4-trifluoromethylbenzene,
1,3-bis(3-amino-2,6-difluoro-4-trifluoromethylphenoxy)-2,6-difluoro-4-trifluoromethylbenzene,
1,3-bis(3-amino-2,6-difluoro-4-trifluoromethylphenoxy)-5,6-difluoro-4-trifluoromethylbenzene,
1,3-bis(3-amino-5,6-difluoro-4-trifluoromethylphenoxy)-2,5-difluoro-4-trifluoromethylbenzene,
1,3-bis(3-amino-5,6-difluoro-4-trifluoromethylphenoxy)-2,6-difluoro-4-trifluoromethylbenzene,
1,3-bis(3-amino-5,6-difluoro-4-trifluoromethylphenoxy)-5,6-difluoro-4-trifluoromethylbenzene,
1,3-bis(3-amino-4,5-difluoro-2-trifluoromethylphenoxy)-2,5-difluoro-4-trifluoromethylbenzene,
1,3-bis(3-amino-4,5-difluoro-2-trifluoromethylphenoxy)-2,6-difluoro-4-trifluoromethylbenzene,
1,3-bis(3-amino-4,5-difluoro-2-trifluoromethylphenoxy)-5,6-difluoro-4-trifluoromethylbenzene,
1,3-bis(3-amino-4,6-difluoro-2-trifluoromethylphenoxy)-2,5-difluoro-4-trifluoromethylbenzene,
1,3-bis(3-amino-4,6-difluoro-2-trifluoromethylphenoxy)-2,6-difluoro-4-trifluoromethylbenzene,
1,3-bis(3-amino-4,6-difluoro-2-trifluoromethylphenoxy)-5,6-difluoro-4-trifluoromethylbenzene,
1,3-bis(3-amino-5,6-difluoro-2-trifluoromethylphenoxy)-2,5-difluoro-4-trifluoromethylbenzene,
1,3-bis(3-amino-5,6-difluoro-2-trifluoromethylphenoxy)-2,6-difluoro-4-trifluoromethylbenzene,
1,3-bis(3-amino-5,6-difluoro-2-trifluoromethylphenoxy)-5,6-difluoro-4-trifluoromethylbenzene,
1,3-bis(3-amino-4,5-difluoro-6-trifluoromethylphenoxy)-2,5-difluoro-4-trifluoromethylbenzene,
1,3-bis(3-amino-4,5-difluoro-6-trifluoromethylphenoxy)-2,6-difluoro-4-trifluoromethylbenzene,
1,3-bis(3-amino-4,5-difluoro-6-trifluoromethylphenoxy)-5,6-difluoro-4-trifluoromethylbenzene,
1,3-bis(3-amino-2,4-difluoro-6-trifluoromethylphenoxy)-2,5-difluoro-4-trifluoromethylbenzene,
1,3-bis(3-amino-2,4-difluoro-6-trifluoromethylphenoxy)-2,6-difluoro-4-trifluoromethylbenzene,
1,3-bis(3-amino-2,4-difluoro-6-trifluoromethylphenoxy)-5,6-difluoro-4-trifluoromethylbenzene,
1,3-bis(3-amino-2,5-difluoro-6-trifluoromethylphenoxy)-2,5-difluoro-4-trifluoromethylbenzene,
1,3-bis(3-amino-2,5-difluoro-6-trifluoromethylphenoxy)-2,6-difluoro-4-trifluoromethylbenzene,
1,3-bis(3-amino-2,5-difluoro-6-trifluoromethylphenoxy)-5,6-difluoro-4-trifluoromethylbenzene,
1,3-bis(3-amino-2,4-difluoro-5-trifluoromethylphenoxy)-2,5,6-trifluoro-4-trifluoromethylbenzene,
1,3-bis(3-amino-2,6-difluoro-5-trifluoromethylphenoxy)-2,5,6-trifluoro-4-trifluoromethylbenzene,
1,3-bis(3-amino-4,6-difluoro-5-trifluoromethylphenoxy)-2,5,6-trifluoro-4-trifluoromethylbenzene,
1,3-bis(3-amino-2,5-difluoro-4-trifluoromethylphenoxy)-2,5,6-trifluoro-4-trifluoromethylbenzene, 1,3-bis(3-amino-2,6-difluoro-4-trifluoromethylphenoxy)-2,5,6-trifluoro-4-trifluoromethylbenzene,
1,3-bis(3-amino-5,6-difluoro-4-trifluoromethylphenoxy)-2,5,6-trifluoro-4-trifluoromethylbenzene,
1,3-bis(3-amino-4,5-difluoro-2-trifluoromethylphenoxy)-2,5,6-trifluoro-4-trifluoromethylbenzene,
1,3-bis(3-amino-4,6-difluoro-2-trifluoromethylphenoxy)-2,5,6-trifluoro-4-trifluoromethylbenzene,
1,3-bis(3-amino-5,6-difluoro-2-trifluoromethylphenoxy)-2,5,6-trifluoro-4-trifluoromethylbenzene,
1,3-bis(3-amino-4,5-difluoro-6-trifluoromethylphenoxy)-2,5,6-trifluoro-4-trifluoromethylbenzene,
1,3-bis(3-amino-2,4-difluoro-6-trifluoromethylphenoxy)-2,5,6-trifluoro-4-trifluoromethylbenzene,
1,3-bis(3-amino-2,5-difluoro-6-trifluoromethylphenoxy)-2,5,6-trifluoro-4-trifluoromethylbenzene,
1,3-bis(3-amino-2-fluoro-5-trifluoromethylphenoxy)-2,6-difluoro-4-trifluoromethylbenzene,
1,3-bis(3-amino-4-fluoro-5-trifluoromethylphenoxy)-2,6-difluoro-4-trifluoromethylbenzene,
1,3-bis(3-amino-6-fluoro-5-trifluoromethylphenoxy)-2,6-difluoro-4-trifluoromethylbenzene,
1,3-bis(3-amino-2-fluoro-5-trifluoromethylphenoxy)-2,5-difluoro-4-trifluoromethylbenzene,
1,3-bis(3-amino-4-fluoro-5-trifluoromethylphenoxy)-2,5-difluoro-4-trifluoromethylbenzene,
1,3-bis(3-amino-6-fluoro-5-trifluoromethylphenoxy)-2,5-difluoro-4-trifluoromethylbenzene,
1,3-bis(3-amino-2-fluoro-5-trifluoromethylphenoxy)-5,6-difluoro-4-trifluoromethylbenzene,
1,3-bis(3-amino-4-fluoro-5-trifluoromethylphenoxy)-5,6-difluoro-4-trifluoromethylbenzene,
1,3-bis(3-amino-6-fluoro-5-trifluoromethylphenoxy)-5,6-difluoro-4-trifluoromethylbenzene,
1,3-bis(3-amino-2-fluoro-4-trifluoromethylphenoxy)-2,6-difluoro-4-trifluoromethylbenzene,
1,3-bis(3-amino-5-fluoro-4-trifluoromethylphenoxy)-2,6-difluoro-4-trifluoromethylbenzene,
1,3-bis(3-amino-6-fluoro-4-trifluoromethylphenoxy)-2,6-difluoro-4-trifluoromethylbenzene,
1,3-bis(3-amino-2-fluoro-4-trifluoromethylphenoxy)-2,5-difluoro-4-trifluoromethylbenzene,
1,3-bis(3-amino-5-fluoro-4-trifluoromethylphenoxy)-2,5-difluoro-4-trifluoromethylbenzene,
1,3-bis(3-amino-6-fluoro-4-trifluoromethylphenoxy)-2,5-difluoro-4-trifluoromethylbenzene,
1,3-bis(3-amino-2-fluoro-4-trifluoromethylphenoxy)-5,6-difluoro-4-trifluoromethylbenzene,
1,3-bis(3-amino-5-fluoro-4-trifluoromethylphenoxy)-5,6-difluoro-4-trifluoromethylbenzene,
1,3-bis(3-amino-6-fluoro-4-trifluoromethylphenoxy)-5,6-difluoro-4-trifluoromethylbenzene,
1,3-bis(3-amino-4-fluoro-2-trifluoromethylphenoxy)-2,6-difluoro-4-trifluoromethylbenzene,
1,3-bis(3-amino-5-fluoro-2-trifluoromethylphenoxy)-2,6-difluoro-4-trifluoromethylbenzene,
1,3-bis(3-amino-6-fluoro-2-trifluoromethylphenoxy)-2,6-difluoro-4-trifluoromethylbenzene,
1,3-bis(3-amino-4-fluoro-2-trifluoromethylphenoxy)-2,5-difluoro-4-trifluoromethylbenzene,
1,3-bis(3-amino-5-fluoro-2-trifluoromethylphenoxy)-2,5-difluoro-4-trifluoromethylbenzene,
1,3-bis(3-amino-6-fluoro-2-trifluoromethylphenoxy)-2,5-difluoro-4-trifluoromethylbenzene,
1,3-bis(3-amino-4-fluoro-2-trifluoromethylphenoxy)-5,6-difluoro-4-trifluoromethylbenzene,
1,3-bis(3-amino-5-fluoro-2-trifluoromethylphenoxy)-5,6-difluoro-4-trifluoromethylbenzene,
1,3-bis(3-amino-6-fluoro-2-trifluoromethylphenoxy)-5,6-difluoro-4-trifluoromethylbenzene,
1,3-bis(3-amino-2-fluoro-6-trifluoromethylphenoxy)-2,5-difluoro-4-trifluoromethylbenzene,
1,3-bis(3-amino-4-fluoro-6-trifluoromethylphenoxy)-2,5-difluoro-4-trifluoromethylbenzene,
1,3-bis(3-amino-5-fluoro-6-trifluoromethylphenoxy)-2,5-difluoro-4-trifluoromethylbenzene,
1,3-bis(3-amino-2-fluoro-6-trifluoromethylphenoxy)-5,6-difluoro-4-trifluoromethylbenzene,
1,3-bis(3-amino-4-fluoro-6-trifluoromethylphenoxy)-5,6-difluoro-4-trifluoromethylbenzene,
1,3-bis(3-amino-5-fluoro-6-trifluoromethylphenoxy)-5,6-difluoro-4-trifluoromethylbenzene,
1,3-bis(3-amino-2-fluoro-6-trifluoromethylphenoxy)-2,6-difluoro-4-trifluoromethylbenzene,
1,3-bis(3-amino-4-fluoro-6-trifluoromethylphenoxy)-2,6-difluoro-4-trifluoromethylbenzene,
1,3-bis(3-amino-5-fluoro-6-trifluoromethylphenoxy)-2,6-difluoro-4-trifluoromethylbenzene,
1,3-bis(3-amino-2-fluoro-5-trifluoromethylphenoxy)-2,5,6-trifluoro-4-trifluoromethylbenzene,
1,3-bis(3-amino-4-fluoro-5-trifluoromethylphenoxy)-2,5,6-trifluoro-4-trifluoromethylbenzene,
1,3-bis(3-amino-6-fluoro-5-trifluoromethylphenoxy)-2,5,6-trifluoro-4-trifluoromethylbenzene,
1,3-bis(3-amino-2-fluoro-4-trifluoromethylphenoxy)-2,5,6-trifluoro-4-trifluoromethylbenzene,
1,3-bis(3-amino-5-fluoro-4-trifluoromethylphenoxy)-2,5,6-trifluoro-4-trifluoromethylbenzene,
1,3-bis(3-amino-6-fluoro-4-trifluoromethylphenoxy)-2,5,6-trifluoro-4-trifluoromethylbenzene,
1,3-bis(3-amino-4-fluoro-2-trifluoromethylphenoxy)-2,5,6-trifluoro-4-trifluoromethylbenzene,
1,3-bis(3-amino-5-fluoro-2-trifluoromethylphenoxy)-2,5,6-trifluoro-4-trifluoromethylbenzene,
1,3-bis(3-amino-6-fluoro-2-trifluoromethylphenoxy)-2,5,6-trifluoro-4-trifluoromethylbenzene,
1,3-bis(3-amino-2-fluoro-6-trifluoromethylphenoxy)-2,5,6-trifluoro-4-trifluoromethylbenzene,
1,3-bis(3-amino-4-fluoro-6-trifluoromethylphenoxy)-2,5,6-trifluoro-4-trifluoromethylbenzene,
1,3-bis(3-amino-5-fluoro-6-trifluoromethylphenoxy)-2,5,6-trifluoro-4-trifluoromethylbenzene,
1,3-bis(3-amino-2,4,6-trifluoro-5-trifluoromethylphenoxy)-4-trifluoromethylbenzene,
1,3-bis(3-amino-2,5,6-trifluoro-4-trifluoromethylphenoxy)-4-trifluoromethylbenzene,
1,3-bis(3-amino-4,5,6-trifluoro-2-trifluoromethylphenoxy)-4-trifluoromethylbenzene,
1,3-bis(3-amino-2,4,5-trifluoro-6-trifluoromethylphenoxy)-4-trifluoromethylbenzene,
1,3-bis(3-amino-2,4,6-trifluoro-5-trifluoromethylphenoxy)-2-fluoro-4-trifluoromethylbenzene,
1,3-bis(3-amino-2,4,6-trifluoro-5-trifluoromethylphenoxy)-5-fluoro-4-trifluoromethylbenzene, 1,3-bis(3-amino-2,4,6-trifluoro-5-trifluoromethylphenoxy)-6-fluoro-4-trifluoromethylbenzene,
1,3-bis(3-amino-2,5,6-trifluoro-4-trifluoromethylphenoxy)-2-fluoro-4-trifluoromethylbenzene,
1,3-bis(3-amino-2,5,6-trifluoro-4-trifluoromethylphenoxy)-5-fluoro-4-trifluoromethylbenzene,
1,3-bis(3-amino-2,5,6-trifluoro-4-trifluoromethylphenoxy)-6-fluoro-4-trifluoromethylbenzene,
1,3-bis(3-amino-4,5,6-trifluoro-2-trifluoromethylphenoxy)-2-fluoro-4-trifluoromethylbenzene,
1,3-bis(3-amino-4,5,6-trifluoro-2-trifluoromethylphenoxy)-5-fluoro-4-trifluoromethylbenzene,
1,3-bis(3-amino-4,5,6-trifluoro-2-trifluoromethylphenoxy)-6-fluoro-4-trifluoromethylbenzene,
1,3-bis(3-amino-2,4,5-trifluoro-6-trifluoromethylphenoxy)-2-fluoro-4-trifluoromethylbenzene,
1,3-bis(3-amino-2,4,5-trifluoro-6-trifluoromethylphenoxy)-5-fluoro-4-trifluoromethylbenzene,
1,3-bis(3-amino-2,4,5-trifluoro-6-trifluoromethylphenoxy)-6-fluoro-4-trifluoromethylbenzene,
1,3-bis(3-amino-2,4,6-trifluoro-5-trifluoromethylphenoxy)-2,5-difluoro-4-trifluoromethylbenzene,
1,3-bis(3-amino-2,4,6-trifluoro-5-trifluoromethylphenoxy)-2,6-difluoro-4-trifluoromethylbenzene,
1,3-bis(3-amino-2,4,6-trifluoro-5-trifluoromethylphenoxy)-5,6-difluoro-4-trifluoromethylbenzene,
1,3-bis(3-amino-2,4,6-trifluoro-4-trifluoromethylphenoxy)-2,5-difluoro-4-trifluoromethylbenzene,
1,3-bis(3-amino-2,4,6-trifluoro-4-trifluoromethylphenoxy)-2,6-difluoro-4-trifluoromethylbenzene,
1,3-bis(3-amino-2,4,6-trifluoro-4-trifluoromethylphenoxy)-5,6-difluoro-4-trifluoromethylbenzene,
1,3-bis(3-amino-2,4,6-trifluoro-6-trifluoromethylphenoxy)-2,5-difluoro-4-trifluoromethylbenzene,
1,3-bis(3-amino-2,4,6-trifluoro-6-trifluoromethylphenoxy)-2,6-difluoro-4-trifluoromethylbenzene,
1,3-bis(3-amino-2,4,6-trifluoro-6-trifluoromethylphenoxy)-5,6-difluoro-4-trifluoromethylbenzene,
1,3-bis(3-amino-2,4,6-trifluoro-2-trifluoromethylphenoxy)-2,5-difluoro-4-trifluoromethylbenzene,
1,3-bis(3-amino-2,4,6-trifluoro-2-trifluoromethylphenoxy)-2,6-difluoro-4-trifluoromethylbenzene,
1,3-bis(3-amino-2,4,6-trifluoro-2-trifluoromethylphenoxy)-5,6-difluoro-4-trifluoromethylbenzene,
1,3-bis(3-amino-2,4,6-trifluoro-5-trifluoromethylphenoxy)-2,5,6-trifluoro-4-trifluoromethylbenzene,
1,3-bis(3-amino-2,5,6-trifluoro-4-trifluoromethylphenoxy)-2,5,6-trifluoro-4-trifluoromethylbenzene,
1,3-bis(3-amino-4,5,6-trifluoro-2-trifluoromethylphenoxy)-2,5,6-trifluoro-4-trifluoromethylbenzene,
1,3-bis(3-amino-2,4,5-trifluoro-6-trifluoromethylphenoxy)-2,5,6-trifluoro-4-trifluoromethylbenzene,
1,3-bis(3-aminophenoxy)-2,4,5-tris(trifluoromethyl)benzene,
1,3-bis(3-aminophenoxy)-2,4,6-tris(trifluoromethyl)benzene,
1,3-bis(3-aminophenoxy)-4,5,6-tris(trifluoromethyl)benzene,
1,3-bis(3-aminophenoxy)-6-fluoro-2,4,5-tris(trifluoromethyl)benzene,
1,3-bis(3-aminophenoxy)-5-fluoro-2,4,6-tris(trifluoromethyl)benzene,
1,3-bis(3-aminophenoxy)-2-fluoro-4,5,6-tris(trifluoromethyl)benzene,
1,3-bis(3-amino-z'-pentafluoroethylphenoxy)-4-trifluoromethylbenzenes,
1,3-bis(3-amino-z'-heptafluoroisopropylphenoxy)-4-trifluoromethylbenzenes,
1,3-bis(3-amino-z'-heptafluoropropylphenoxy)-4-trifluoromethylbenzenes,
1,3-bis(3-aminophenoxy)-4-trifluoromethyl-w'-pentafluoroethylbenzenes,
1,3-bis(3-aminophenoxy)-4-trifluoromethyl-w'-heptafluoropropylbenzenes,
1,3-bis(3-aminophenoxy)-4-trifluoromethyl-w'-heptafluoroisopropylbenzenes,
1,3-bis(3-amino-z",z'",z""-trifluoro-z'-pentafluoroethylphenoxy)-4-trifluoromethylbenzenes,
1,3-bis(3-amino-z",z'",z""-trifluoro-z'-heptafluoroisopropylphenoxy)-4-trifluoromethylbenzenes,
1,3-bis(3-amino-z",z'",z""-trifluoro-z'-heptafluoropropylphenoxy)-4-trifluoromethylbenzenes,
1,3-bis(3-amino-z'-pentafluoroethylphenoxy)-w'-pentafluoroethyl-4-trifluoromethylbenzenes,
1,3-bis(3-amino-z'-pentafluoroethylphenoxy)-w'-heptafluoropropyl-4-trifluoromethylbenzenes,
1,3-bis(3-amino-z'-pentafluoroethylphenoxy)-w'-heptafluoroisopropyl-4-trifluoromethylbenzenes,
1,3-bis(3-amino-z'-heptafluoropropylphenoxy)-w'-pentafluoroethyl-4-trifluoromethylbenzenes,
1,3-bis(3-amino-z'-heptafluoropropylphenoxy)-w'-heptafluoropropyl-4-trifluoromethylbenzenes,
1,3-bis(3-amino-z'-heptafluoropropylphenoxy)-w'-heptafluoroisopropyl-4-trifluoromethylbenzenes,
1,3-bis(3-amino-z'-heptafluoroisopropylphenoxy)-w'-pentafluoroethyl-4-trifluoromethylbenzenes,
1,3-bis(3-amino-z'-heptafluoroisopropylphenoxy)-w'-heptafluoropropyl-4-trifluoromethylbenzenes, 1,3-bis(3-amino-z'-heptafluoroisopropylphenoxy)-w'-heptafluoroisopropyl-4-trifluoromethylbenzenes, 1,3-bis(3-aminophenoxy)-w"-fluoro-4-trifluoromethyl-w'-pentafluoroethylbenzenes, 1,3-bis(3-aminophenoxy)-w"-fluoro-4-trifluoromethyl-w'-heptafluoropropylbenzenes, 1,3-bis(3-aminophenoxy)-w"-fluoro-4-trifluoromethyl-w'-heptafluoroisopropylbenzenes, 1,3-bis(3-aminophenoxy)-w",w'"-difluoro-4-trifluoromethyl-w'-pentafluoroethylbenzenes, 1,3-bis(3-aminophenoxy)-w",w'"-difluoro-4-trifluoromethyl-w'-heptafluoropropylbenzenes, 1,3-bis(3-aminophenoxy)-w",w'"-difluoro-4-trifluoromethyl-w'-heptafluoroisopropylbenzenes, 1,3-bis(3-amino-z",z'",z""-trifluoro-z'-pentafluoroethylphenoxy)-w",w'"-difluoro-4-trifluoromethyl-w'-pentafluoroethylbenzenes, 1,3-bis(3-amino-z",z'",z""-trifluoro-z'-pentafluoroethylphenoxy)-w",w'"-difluoro-4-trifluoromethyl-w'-heptafluoropropylbenzenes, 1,3-bis(3-amino-z",z'",z""-trifluoro-z'-pentafluoroethylphenoxy)-w",w'"-difluoro-4-trifluoromethyl-w'-heptafluoroisopropylbenzenes, 1,3-bis(3-amino-z",z'",z""-trifluoro-z'-heptafluoroisopropylphenoxy)-w",w'"-difluoro-4-trifluoromethyl-w'-pentafluoroethylbenzenes, 1,3-bis(3-amino-z",z'",z""-trifluoro-z'-heptafluoroisopropylphenoxy)-w",w'"-difluoro-4-trifluoromethyl-w'-heptafluoropropylbenzenes, 1,3-bis(3-amino-z",z'",z""-trifluoro-z'-heptafluoroisopropylphenoxy)-w",w'"-difluoro-4-trifluoromethyl-w'-heptafluoroisopropylbenzenes, 1,3-bis(3-amino-z",z'",z""-trifluoro-z'-heptafluoropropylphenoxy)-w",w'"-difluoro-4-trifluoromethyl-w'-pentafluoroethylbenzenes, 1,3-bis(3-amino-z",z'",z""-trifluoro-z'-heptafluoropropylphenoxy)-w",w'"-difluoro-4-trifluoromethyl-w'-heptafluoropropylbenzenes, and 1,3-bis(3-amino-z",z'",z""-trifluoro-z'-heptafluoropropylphenoxy)-w",w'"-difluoro-4-trifluoromethyl-w'-heptafluoroisopropylbenzenes, wherein z' is 2, 4, 5 or 6; w' is 2, 5 or 6; z", z'" and z"" are 2, 4, 5 or 6; w" is 2, 5 or 6; and w'" is 2,5 or 6, although z', z", z'" and z"" are different each other, and w', w" and w'" are different each other;

preferably 1,3-bis(3-amino-5-trifluoromethylphenoxy)-4-trifluoromethylbenzene, 1,3-bis(3-amino-4-trifluoromethylphenoxy)-4-trifluoromethylbenzene, 1,3-bis(3-amino-2-trifluoromethylphenoxy)-4-trifluoromethylbenzene, 1,3-bis(3-amino-6-trifluoromethylphenoxy)-4-trifluoromethylbenzene, 1,3-bis(3-amino-5-trifluoromethylphenoxy)-2,5,6-trifluoro-4-trifluoromethylbenzene, 1,3-bis(3-amino-4-trifluoromethylphenoxy)-2,5,6-trifluoro-4-trifluoromethylbenzene, 1,3-bis(3-amino-2-trifluoromethylphenoxy)-2,5,6-trifluoro-4-trifluoromethylbenzene, 1,3-bis(3-amino-6-trifluoromethylphenoxy)-2,5,6-trifluoro-4-trifluoromethylbenzene, 1,3-bis(3-amino-2,4,6-trifluoro-5-trifluoromethylphenoxy)-2,5,6-trifluoro-4-trifluoromethylbenzene, 1,3-bis(3-amino-2,5,6-trifluoro-4-trifluoromethylphenoxy)-2,5,6-trifluoro-4-trifluoromethylbenzene, 1,3-bis(3-amino-2,4,5-trifluoro-6-trifluoromethylphenoxy)-2,5,6-trifluoro-4-trifluoromethylbenzene, 1,3-bis(3-amino-5-fluorophenoxy)-4-trifluoromethylbenzene, 1,3-bis(3-amino-4-fluorophenoxy)-4-trifluoromethylbenzene, 1,3-bis(3-amino-2-fluorophenoxy)-4-trifluoromethylbenzene, 1,3-bis(3-amino-6-fluorophenoxy)-4-trifluoromethylbenzene, 1,3-bis(3-amino-5-fluorophenoxy)-2,4-bis(trifluoromethyl)benzene, 1,3-bis(3-amino-5-fluorophenoxy)-4,6-bis(trifluoromethyl)benzene, 1,3-bis(3-amino-5-fluorophenoxy)-4,5-bis(trifluoromethyl)benzene, 1,3-bis(3-amino-4-fluorophenoxy)-2,4-bis(trifluoromethyl)benzene, 1,3-bis(3-amino-4-fluorophenoxy)-4,6-bis(trifluoromethyl)benzene, 1,3-bis(3-amino-4-fluorophenoxy)-4,5-bis(trifluoromethyl)benzene, 1,3-bis(3-amino-2-fluorophenoxy)-2,4-bis(trifluoromethyl)benzene, 1,3-bis(3-amino-2-fluorophenoxy)-4,6-bis(trifluoromethyl)benzene, 1,3-bis(3-amino-2-fluorophenoxy)-4,5-bis(trifluoromethyl)benzene, 1,3-bis(3-amino-6-fluorophenoxy)-2,4-bis(trifluoromethyl)benzene, 1,3-bis(3-amino-6-fluorophenoxy)-4,6-bis(trifluoromethyl)benzene, 1,3-bis(3-amino-6-fluorophenoxy)- 4,5-bis(trifluoromethyl)benzene, 1,3-bis(3-amino-2-trifluoromethylphenoxy)-2,4-bis(trifluoromethyl)benzene, 1,3-bis(3-amino-4-trifluoromethylphenoxy)-2,4-bis(trifluoromethyl)benzene, 1,3-bis(3-amino-5-trifluoromethylphenoxy)-2,4-bis(trifluoromethyl)benzene, 1,3-bis(3-amino-6-trifluoromethylphenoxy)-2,4-bis(trifluoromethyl)benzene, 1,3-bis(3-amino-2-trifluoromethylphenoxy)-4,5-bis(trifluoromethyl)benzene, 1,3-bis(3-amino-4-trifluoromethylphenoxy)-4,5-bis(trifluoromethyl)benzene, 1,3-bis(3-amino-5-trifluoromethylphenoxy)-4,5-bis(trifluoromethyl)benzene, 1,3-bis(3-amino-6-trifluoromethylphenoxy)-4,5-bis(trifluoromethyl)benzene, 1,3-bis(3-amino-2-trifluoromethylphenoxy)-4,6-bis(trifluoromethyl)benzene, 1,3-bis(3-amino-4-trifluoromethylphenoxy)-4,6-bis(trifluoromethyl)benzene, 1,3-bis(3-amino-5-trifluoromethylphenoxy)-4,6-bis(trifluoromethyl)benzene, and 1,3-bis(3-amino-6-trifluoromethylphenoxy)-4,6-bis(trifluoromethyl)benzene;

more preferably 1,3-bis(3-amino-5-trifluoromethylphenoxy)-4-trifluoromethylbenzene, 1,3-bis(3-amino-5-fluorophenoxy)-4-trifluoromethylbenzene, 1,3-bis(3-amino-4-fluorophenoxy)-4-trifluoromethylbenzene, 1,3-bis(3-amino-6-fluorophenoxy)-4-trifluoromethylbenzene, 1,3-bis(3-amino-5-trifluoromethylphenoxy)-4,6-bis(trifluoromethyl)benzene, 1,3-bis(3-amino-4-trifluoromethylphenoxy)-4,6-bis(trifluoromethyl)benzene, 1,3-bis(3-amino-2,4,6-trifluoro-5-trifluoromethylphenoxy)-2,5,6-trifluoro-4-trifluoromethylbenzene.

The novel fluorine-containing polyamide of this invention is prepared from a diamine represented by formula (2), of course including, besides the above-mentioned diamines, 1,3-bis(3-aminophenoxy)-2-trifluoromethylbenzene, 1,3-bis(3-aminophenoxy)-5-trifluoromethylbenzene, 1,4-bis(3-aminophenoxy)-2-trifluoromethylbenzene, 1,3- bis(4-aminophenoxy)-2-trifluoromethylbenzene, 1,3-bis(4-aminophenoxy)-4-trifluoromethylbenzene, 1,3-bis(4-aminophenoxy)-5-trifluoromethylbenzene, 1,4-bis(4-aminophenoxy)-2-trifluoromethylbenzene, 1,3-bis(3-amino-2-trifluoromethylphenoxy)benzene, 1,3-bis(3-amino-4-trifluoromethylphenoxy)benzene, 1,3-bis(3-amino-5-trifluoromethylphenoxy)benzene, 1,3-bis(3-amino-6-trifluoromethylphenoxy)benzene, 1,3-bis(4-amino-2-trifluoromethylphenoxy)benzene, 1,3-bis(4-amino-3-trifluoromethylphenoxy)benzene, 1,4-bis(3-amino-2-trifluoromethylphenoxy)benzene, 1,4-bis(3-amino-4-trifluoromethylphenoxy)benzene, 1,4-bis(3-amino-5-trifluoromethylphenoxy)benzene, 1,4-bis(3-amino-6-trifluoromethylphenoxy)benzene, 1,4-bis(4-amino-2-trifluoromethylphenoxy)benzene, 1,4-bis(4-amino-3-trifluoromethylphenoxy)benzene, 1,3-bis(3-amino-6-trifluoromethylphenoxy)-5-trifluoromethylbenzene, 1,3-bis(3-amino-5-trifluoromethylphenoxy)-5-trifluoromethylbenzene, 1,3-bis(3-amino-4-trifluoromethylphenoxy)-5-trifluoromethylbenzene, 1,3-bis(3-amino-2-trifluoromethylphenoxy)-5-trifluoromethylbenzene, 1,3-bis(3-amino-6-trifluoromethylphenoxy)-2-trifluoromethylbenzene, 1,3-bis(3-amino-5-trifluoromethylphenoxy)-2-trifluoromethylbenzene, 1,3-bis(3-amino-4-trifluoromethylphenoxy)-2-trifluoromethylbenzene, 1,3-bis(3-amino-2-trifluoromethylphenoxy)-2-trifluoromethylbenzene, 1,3-bis(4-amino-3-trifluoromethylphenoxy)-5-trifluoromethylbenzene, 1,3-bis(4-amino-2-trifluoromethylphenoxy)-5-trifluoromethylbenzene, 1,3-bis(4-amino-3-trifluoromethylphenoxy)-4-trifluoromethylbenzene, 1,3-bis(4-amino-2-trifluoromethylphenoxy)-4-trifluoromethylbenzene, 1,3-bis(4-amino-3-trifluoromethylphenoxy)-2-trifluoromethylbenzene, 1,3-bis(4-amino-2-trifluoromethylphenoxy)-2-trifluoromethylbenzene, 1,4-bis(3-amino-6-trifluoromethylphenoxy)-3-trifluoromethylbenzene, 1,4-bis(3-amino-5-trifluoromethylphenoxy)-3-trifluoromethylbenzene, 1,4-bis(3-amino- 4-trifluoromethylphenoxy)-3-trifluoromethylbenzene, 1,4-bis(3-amino-2-trifluoromethylphenoxy)-3-trifluoromethylbenzene, 1,4-bis(3-amino-6-trifluoromethylphenoxy)-2-trifluoromethylbenzene, 1,4-bis(3-amino-5-trifluoromethylphenoxy)-2-trifluoromethylbenzene, 1,4-bis(3-amino-4-trifluoromethylphenoxy)-2-trifluoromethylbenzene, 1,4-bis(3-amino-2-trifluoromethylphenoxy)-2-trifluoromethylbenzene, 1,4-bis(4-amino-3-trifluoromethylphenoxy)-3-trifluoromethylbenzene, 1,4-bis(4-amino-2-trifluoromethylphenoxy)-3-trifluoromethylbenzene, 1,4-bis(4-amino-3-trifluoromethylphenoxy)-2-trifluoromethylbenzene, 1,4-bis(4-amino-2-trifluoromethylphenoxy)-2-trifluoromethylbenzene, 1,3-bis[3-amino-2,4-bis(trifluoromethyl)phenoxy]benzene, 1,3-bis[3-amino-2,5-bis(trifluoromethyl)phenoxy]benzene, 1,3-bis[3-amino-2,6-bis(trifluoromethyl)phenoxy]benzene, 1,3-bis[3-amino-4,5-bis(trifluoromethyl)phenoxy]benzene, 1,3-bis[3-amino-4,6-bis(trifluoromethyl)phenoxy]benzene, 1,3-bis[3-amino-5,6-bis(trifluoromethyl)phenoxy]benzene, 1,3-bis[4-amino-2,3-bis(trifluoromethyl)phenoxy]benzene, 1,3-bis[4-amino-2,5-bis(trifluoromethyl)phenoxy]benzene, 1,3-bis[4-amino-2,6-bis(trifluoromethyl)phenoxy]benzene, 1,3-bis[4-amino-3,5-bis(trifluoromethyl)phenoxy]benzene, 1,4-bis[3-amino-2,4-bis(trifluoromethyl)phenoxy]benzene, 1,4-bis[3-amino-2,5-bis(trifluoromethyl)phenoxy]benzene, 1,4-bis[3-amino-2,6-bis(trifluoromethyl)phenoxy]benzene, 1,4-bis[3-amino-4,5-bis(trifluoromethyl)phenoxy]benzene, 1,4-bis[3-amino-4,6-bis(trifluoromethyl)phenoxy]benzene, 1,4-bis[3-amino-5,6-bis(trifluoromethyl)phenoxy]benzene, 1,4-bis[4-amino-2,3-bis(trifluoromethyl)phenoxy]benzene, 1,4-bis[4-amino-2,5-bis(trifluoromethyl)phenoxy]benzene, 1,4-bis[4-amino-2,6-bis(trifluoromethyl)phenoxy]benzene, 1,4-bis[4-amino-3,5-bis(trifluoromethyl)phenoxy]benzene, 1,3-bis[3-amino-2,4-bis(trifluoromethyl)phenoxy]-5-trifluoromethylbenzene, 1,3-bis[3-amino-2,5-bis(trifluoromethyl)phenoxy]-5-trifluoromethylbenzene, 1,3-bis[3-amino-2,6-bis(trifluoromethyl)phenoxy]-5-trifluoromethylbenzene, 1,3-bis[3-amino-4,5-bis(trifluoromethyl)phenoxy]-5-trifluoromethylbenzene, 1,3-bis[3-amino-4,6-bis(trifluoromethyl)phenoxy]-5-trifluoromethylbenzene, 1,3-bis[3-amino-5,6-bis(trifluoromethyl)phenoxy]-5-trifluoromethylbenzene, 1,3-bis[3-amino-2,4-bis(trifluoromethyl)phenoxy]-4-trifluoromethylbenzene, 1,3-bis[3-amino-2,5-bis(trifluoromethyl)phenoxy]-4-trifluoromethylbenzene, 1,3-bis[3-amino-2,6-bis(trifluoromethyl)phenoxy]-4-trifluoromethylbenzene, 1,3-bis[3-amino-4,5-bis(trifluoromethyl)phenoxy]-4-trifluoromethylbenzene, 1,3-bis[3-amino-4,6-bis(trifluoromethyl)phenoxy]-4-trifluoromethylbenzene, 1,3-bis[3-amino-5,6-bis(trifluoromethyl)phenoxy]-4-trifluoromethylbenzene, 1,3-bis[3-amino-2,4-bis(trifluoromethyl)phenoxy]-2-trifluoromethylbenzene, 1,3-bis[3-amino-2,5-bis(trifluoromethyl)phenoxy]-2-trifluoromethylbenzene, 1,3-bis[3-amino-2,6-bis(trifluoromethyl)phenoxy]-2-trifluoromethylbenzene, 1,3-bis[3-amino-4,5-bis(trifluoromethyl)phenoxy]-2-trifluoromethylbenzene, 1,3-bis[3-amino-4,6-bis(trifluoromethyl)phenoxy]-2-trifluoromethylbenzene, 1,3-bis[3-amino-5,6-bis(trifluoromethyl)phenoxy]-2-trifluoromethylbenzene, 1,3-bis[4-amino-2,3-bis(trifluoromethyl)phenoxy]-5-trifluoromethylbenzene, 1,3-bis[4-amino-2,5-bis(trifluoromethyl)phenoxy]-5-trifluoromethylbenzene, 1,3-bis[4-amino-2,6-bis(trifluoromethyl)phenoxy]-5-trifluoromethylbenzene, 1,3-bis[4-amino-3,5-bis(trifluoromethyl)phenoxy]-5-trifluoromethylbenzene, 1,3-bis[4-amino-2,3-bis(trifluoromethyl)phenoxy]-4-trifluoromethylbenzene, 1,3-bis[4-amino-2,5-bis(trifluoromethyl)phenoxy]-4-trifluoromethylbenzene, 1,3-bis[4-amino-2,6-bis(trifluoromethyl)phenoxy]-4-trifluoromethylbenzene, 1,3-bis[4-amino-3,5-bis(trifluoromethyl)phenoxy]-4-trifluoromethylbenzene, 1,3-bis[4-amino-2,5-bis(trifluoromethyl)phenoxy]-2-trifluoromethylbenzene, 1,3-bis[4-amino-2,6-bis(trifluoromethyl)phenoxy]-2-trifluoromethylbenzene, 1,3-bis[4-amino-3,5-bis(trifluoromethyl)phenoxy]-2-trifluoromethylbenzene, 1,4-bis[3-amino-2,4-bis(trifluoromethyl)phenoxy]-3-trifluoromethylbenzene, 1,4-bis[3-amino- 2,5-bis(trifluoromethyl)phenoxy]-3-trifluoromethylbenzene, 1,4-bis[3-amino-2,6-bis(trifluoromethyl)phenoxy]-3-trifluoromethylbenzene, 1,4-bis[3-amino-4,5-bis(trifluoromethyl)phenoxy]-3-trifluoromethylbenzene, 1,4-bis[3-amino-4,6-bis(trifluoromethyl)phenoxy]-3-trifluoromethylbenzene, 1,4-bis[3-amino-5,6-bis(trifluoromethyl)phenoxy]-3-trifluoromethylbenzene, 1,4-bis[3-amino-2,4-bis(trifluoromethyl)phenoxy]-2-trifluoromethylbenzene, 1,4-bis[3-amino-2,5-bis(trifluoromethyl)phenoxy]-2-trifluoromethylbenzene, 1,4-bis[3-amino-2,6-bis(trifluoromethyl)phenoxy]-2-trifluoromethylbenzene, 1,4-bis[3-amino-4,5-bis(trifluoromethyl)phenoxy]-2-trifluoromethylbenzene, 1,4-bis[3-amino-4,6-bis(trifluoromethyl)phenoxy]-2-trifluoromethylbenzene, 1,4-bis[3-amino-5,6-bis(trifluoromethyl)phenoxy]-2-trifluoromethylbenzene, 1,4-bis[4-amino-2,3-bis(trifluoromethyl)phenoxy]-3-trifluoromethylbenzene, 1,4-bis[4-amino-2,5-bis(trifluoromethyl)phenoxy]-3-trifluoromethylbenzene, 1,4-bis[4-amino-2,6-bis(trifluoromethyl)phenoxy]-3-trifluoromethylbenzene, 1,4-bis[4-amino-3,5-bis(trifluoromethyl)phenoxy]-3-trifluoromethylbenzene, 1,4-bis[4-amino-2,3-bis(trifluoromethyl)phenoxy]-2-trifluoromethylbenzene, 1,4-bis[4-amino-2,5-bis(trifluoromethyl)phenoxy]-2-trifluoromethylbenzene, 1,4-bis[4-amino-2,6-bis(trifluoromethyl)phenoxy]-2-trifluoromethylbenzene, 1,4-bis[4-amino-3,5-bis(trifluoromethyl)phenoxy]-2-trifluoromethylbenzene, 1,3-bis[3-amino-tris(trifluoromethyl)phenoxy]benzenes, 1,3-bis[4-amino-tris(trifluoromethyl)phenoxy]benzenes, 1,4-bis[3-amino-tris(trifluoromethyl)phenoxy]benzenes, 1,4-bis[4-amino-tris(trifluoromethyl)phenoxy]benzenes, 1,3-bis[3-amino-tris(trifluoromethyl)phenoxy]-5-trifluoromethylbenzenes, 1,3-bis[3-amino-tris(trifluoromethyl)phenoxy]-4-trifluoromethylbenzenes, 1,3-bis[3-amino-tris(trifluoromethyl)phenoxy]-2-trifluoromethylbenzenes, 1,3-bis[4-amino-tris(trifluoromethyl)phenoxy]-5-trifluoromethylbenzenes, 1,3-bis[4-amino-tris(trifluoromethyl)phenoxy]-4-trifluoromethylbenzenes, 1,3-bis[4-amino-tris(trifluoromethyl)phenoxy]-2-trifluoromethylbenzenes, 1,4-bis[3-amino-tris(trifluoromethyl)phenoxy]-3-trifluoromethylbenzenes, 1,4-bis[3-amino-tris(trifluoromethyl)phenoxy]-2-trifluoromethylbenzenes, 1,4-bis[4-amino-tris(trifluoromethyl)phenoxy]-3-trifluoromethylbenzenes, and 1,4-bis[4-amino-tris(trifluoromethyl)phenoxy]-2-trifluoromethylbenzenes.

Among these diamines are more preferable 1,3-bis(3-aminophenoxy)-4-trifluoromethylbenzene, 1,3-bis(3-aminophenoxy)-5-trifluoromethylbenzene, 1,3-bis(3-amino-5-trifluoromethylphenoxy)benzene, 1,4-bis(3-amino-5-trifluoromethylphenoxy)benzene, 1,3-bis(3-amino-5-trifluoromethylphenoxy)-5-trifluoromethylbenzene and/or 1,3-bis(3-amino-5-trifluoromethylphenoxy)-4-trifluoromethylbenzene in the light of their availability and price.

A fluorine-containing aromatic diamine may be prepared by the following processes;

(i) reacting a dihalogeno or dinitro compound represented by general formula (10) with a m-nitrophenol derivative represented by general formula (11) in the presence of a base, in an aprotic polar solvent at 100 to 250° C., to produce an aromatic dinitro compound, which is then reduced;

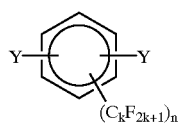

(10)

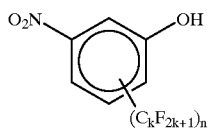

(11)

wherein k and n are as defined above; and Y is a halogen atom or nitro group, although, when n is zero in formula (10), n is not zero in formula (11);

(ii) reacting a dihydroxy compound represented by general formula (12) with a m-dinitro or m-nitrohalogeno compound represented by general formula (13) in the presence of a base, in an aprotic polar solvent at 100 to 250° C., to produce an aromatic dinitro compound, which is then reduced;

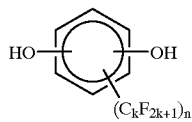

(12)

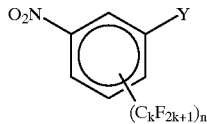

(13)

wherein Y and k are as defined above, although, when n is zero in formula (12), n is not zero in formula (13); and (iii) reacting a dihalogeno or dinitro compound represented by general formula (10) with a m-aminophenol derivative represented by general formula (14) in the presence of a base, in an aprotic polar solvent at 100 to 250° C.;

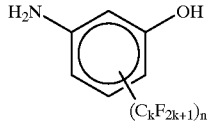

(14)

wherein k and n are as defined above, although, when n is zero in formula (10), n is not zero in this formula.

This invention will be specifically described, but is not limited to these specific examples.

In an example of the process (i), 3,5-dinitrobenzotrifluoride is condensed with m-nitrophenol in the presence of a base, in an aprotic solvent, to give 1,3-bis(3-nitrophenoxy)-5-trifluoromethylbenzene, which is then reduced to 1,3-bis(3-aminophenoxy)-5-trifluoromethylbenzene, in a high yield.

One of the starting materials, 3,5-dinitrobenzotrifluoride, can be prepared by treating benzotrifluoride with mixed acid according to a known process such as one described in J.Am.Chem.Soc., 74, pp. 3011–14.

In this process, the amount of m-nitrophenol may be at least 2 molar equivalents to 3,5-dinitrobenzotrifluoride, preferably 2 to 2.5 molar equivalents in the light of some conditions such as complexity in post-treatment and cost.

Bases which may be used include alkali metal carbonates, bicarbonates, hydroxides and alkoxides such as potassium carbonate, potassium bicarbonate, potassium hydroxide, sodium carbonate, sodium hydroxide, sodium bicarbonate, lithium carbonate, lithium hydroxide, sodium methoxide and potassium isopropoxide. These bases may be used in the amount of at least 1 molar equivalent, preferably 1 to 2 molar equivalents to hydroxy groups in the starting biphenol.

Aprotic polar solvents which may be used include N,N-dimethylformamide, N,N-diethylformamide, N,N-dimethylacetamide, N-methylpyrrolidone, 1,3-dimethyl-2-imidazolidinone, dimethyl sulfoxide and sulfolane. An adequate amount of these solvents may be generally, but is not limited to, 1 to 10 folds by weight to the amount of the starting materials.

In this process, a phase transfer catalyst may be used for accelerating a reaction, including copper powder, copper compounds, crown ethers, polyethylene glycol, quaternary ammonium salts and quaternary phosphonium salts.

Reaction temperature may be generally 80 to 250° C., preferably 100 to 200° C.

Generally, a reaction procedure may be either placing a predetermined amount of m-nitrophenol, a base and an aprotic solvent to convert m-nitrophenol into an alkali metal salt and then adding 3,5-dinitrobenzotrifluoride to react with the salt, or blending all the materials and then heating them to proceed a reaction. However, a procedure to be used is not limited to these, and may be another one as appropriate.

When the reaction system contains moisture, the moisture may be purged by passing a gas such as nitrogen during the reaction, but frequently it is azeotropically removed from the system with a small amount of an appropriate solvent such as benzene, toluene, xylene and chlorobenzene.

Completion of the reaction may be determined by observing reduction in the starting materials using thin layer chromatography or high performance liquid chromatography. At the end of the reaction, the mixture is condensed or poured into, for example, water to give a crude dinitro compound. The compound may be purified by recrystallization from a solvent or a slagging.

The dinitro compound prepared by the above process may be reduced to give a corresponding diamino compound. The dinitro compound can be reduced, without limitation, by applying a general procedure for reduction of a nitro group to an amino group such as those described in Shin Jikken Kagaku Koza, 15, Oxidation and Reduction II, Maruzen (1977), and catalytic reduction is industrially preferred. In the catalytic reduction, a catalyst may be a metal catalyst generally used for catalytic reduction such as nickel, palladium, platinum, rhodium, ruthenium, cobalt and copper catalysts, preferably a palladium catalyst.

These catalysts may be used as a metal, but in general are supported by a carrier such as carbon, barium sulfate, silica gel, alumina and Celite, or a Raney catalyst in the case of nickel, cobalt or copper. The amount of the catalyst may be, but is not limitedto, 0.01 to 10 wt % as a metal to a starting dinitro compound, and it may be generally 2 to 8 wt % in the state of metal, and 0.1 to 5 wt % when supported on a carrier.

The reaction solvent which may be used during the reduction may be any of those inert to the reaction preferably including, but is not limited to, alcohols such as methanol, ethanol and isopropyl alcohol; glycols such as ethyleneglycol and propyleneglycol; and ethers such as diethyl ether, dioxane, tetrahydrofuran and methyl cellosolve; as well as sometimes aliphatic hydrocarbons such as hexane and cyclohexane; aromatic hydrocarbons such as benzene, toluene and xylenes; esters such as ethyl acetate and butyl acetate; halogenated hydrocarbons such as dichloromethane, chloroform, carbon tetrachloride, 1,2-dichloroethane, 1,1,2-trichloroethane and tetrachloroethane; and N,N-dimethylformamide.

When using a reaction solvent without miscibility with water, a general phase transfer catalyst such as quaternary ammonium salts and quaternary phosphonium salts may be used if the reaction is slow. The solvent may be used in the amount sufficient to suspend or completely solubilize the starting materials, and generally, but not limited to, 0.5 to 10 fold by weight to the amount of the starting materials.

Reaction temperature may be, but is not limited to, 20 to 200° C., preferably 20 to 100° C. Reaction pressure may be about an atmospheric pressure to 50 atm.

Reduction may be conducted by solubilizing or suspending a starting material in a solvent, adding a catalyst and then introducing hydrogen gas with stirring at a predetermined temperature. Completion of the reaction may be determined by various procedures such as measuring the amount of absorbed hydrogen, thin layer chromatography and high performance liquid chromatography. At the end of the reaction, the catalyst used may be removed, and the reaction solvent may be evaporated to give a desired product.

In the process of (ii), 3,5-dinitrobenzotrifluoride is reacted with resorcinol or hydroquinone in the presence of a base in an aprotic polar solvent to give a dinitro compound, which is then reduced to give 1,3- or 1,4-bis(3-amino-5-trifluoromethylphenoxy)benzene in a high yield.

A dinitro compound, 3,5-dinitrobenzotrifluoride, can be prepared, for example, by treating benzotrifluoride with mixed acid according to a process described in J.Am.Chem.Soc., 74, pp. 3011–14. Resorcinol and hydroquinone are commercially and easily available.

In this process, the amount of 3,5-dinitrobenzotrifluoride may be at least 2 molar equivalents to resorcinol or hydroquinone, preferably 2 to 2.5 molar equivalents in the light of some conditions such as complexity in post-treatment and cost.

Bases which may be used include alkali metal carbonates, bicarbonates, hydroxides and alkoxides as described in the process (i). These bases may be used in the amount of at least 1 molar equivalent, preferably 1 to 2 molar equivalents to hydroxy groups in the starting biphenol.

Aprotic polar solvents which may be used are also as described in the process (i). An adequate amount of these solvents may be generally, but is not limited to, 1 to 10 fold by weight to the amount of the starting materials.

Reaction temperature may be generally 40 to 250° C., preferably 80 to 180° C. Furthermore, catalysts as described in the process (i) may be used for accelerating the reaction without limitation.

Generally, a reaction procedure may be either placing a predetermined amount of resorcinol or hydroquinone, a base and a solvent to convert resorcinol or hydroquinone into an alkali metal salt and then adding 3,5-dinitrobenzotrifluoride to react with the salt, or blending all the materials including 3,5-dinitrobenzotrifluoride and then heating them to proceed a reaction. However, a procedure to be used is not limited to these, and may be another one as appropriate.

When the reaction system contains moisture, the moisture may be purged by passing a gas such as nitrogen during the reaction, but frequently it is azeotropically removed from the system with a small amount of an appropriate solvent such as benzene, toluene, xylene and chlorobenzene.

Completion of the reaction may be determined by observing reduction in the starting materials using thin layer chromatography or high performance liquid chromatography. At the end of the reaction, the mixture is condensed or poured into, for example, water to give a crude dinitro compound. The compound may be purified by recrystallization from a solvent or a slagging.

The dinitro compound prepared by the above process may be reduced to give a corresponding diamino compound. The dinitro compound can be reduced as described in the process (i).

The reduction procedure may be almost as described in the process (i) in terms of catalyst type, appearance and amount; solvent type and amount; and addition of a phase transfer catalyst such as quaternary ammonium salts and quaternary phosphonium salts generally used when the reaction is slow.

Reaction temperature may be, but is not limited to, 20 to 200° C., preferably 20 to 100° C. Reaction pressure may be about an atmospheric pressure to 50 atm.

Reduction may be conducted by solubilizing or suspending a starting material in a solvent, adding a catalyst and then introducing hydrogen gas with stirring at a predetermined temperature. Completion of the reaction may be determined by various procedures such as measuring the amount of absorbed hydrogen, thin layer chromatography and high performance liquid chromatography. At the end of the reaction, the catalyst used may be removed, and the reaction solvent may be evaporated to give a desired product.

The process (iii) gives 3,5-bis(3-amino-5-trifluoromethylphenoxy)trifluoromethylbenzene or 2,4-bis (3-amino-5-trifluoromethylphenoxy)trifluoromethylbenzene in a high yield, by reacting 3,5-dihalogenobenzotrifluoride, 3,5-dinitrobenzotrifluoride, 2,4-dihalogenobenzotrifluoride or 2,4-dinitrobenzotrifluoride (hereinafter, these are referred to as benzotrifluoride derivative) with 3-amino-5-trifluoromethylphenol in the presence of a base in an aprotic polar solvent.

One of the materials, the trifluoromethylbenzene derivative, may be prepared by a known process; for example, 3,5-dinitrobenzotrifluoride, can be prepared by treating benzotrifluoride with mixed acid according to a process described in J.Am.Chem.Soc., 74, pp. 3011–14. Another material, 3-amino-trifluoromethylphenol, may be prepared by a known process, for example, described in J.Am.Chem.Soc., 1949 pp. 3016–20.

In this process, the amount of 3-amino-5-trifluoromethylphenol may be at least 2 molar equivalents to the trifluoromethylbenzene derivative, preferably 2 to 2.5 molar equivalents in the light of some conditions such as complexity in post-treatment and cost.

Bases which may be used include alkali metal carbonates, bicarbonates, hydroxides and alkoxides as described in the above processes. These bases may be used in the amount of at least 1 molar equivalent, preferably 1 to 2 molar equivalents to hydroxy groups in the starting biphenol.

Aprotic polar solvents which may be used are also as described in the above processes. An adequate amount of these solvents may be generally, but is not limited to, 1 to 10 fold by weight to the amount of the starting materials.

Reaction temperature may be generally 40 to 250° C., preferably 80 to 180° C. In this process of this invention, a phase transfer catalyst may be used for accelerating a reaction, including copper powder, copper compounds, crown ethers, polyethylene glycol, quaternary ammonium salts and quaternary phosphonium salts.

Generally, a reaction procedure may be either placing a predetermined amount of 3-amino-5-trifluoromethylphenol, a base and an aprotic solvent to convert 3-amino-5-trifluoromethylphenol into an alkali metal salt and then adding a trifluoromethylbenzene derivative to react with the salt, or blending all the materials including a trifluoromethylbenzene derivative and then heating them to proceed a reaction. However, a procedure to be used is not limited to these, and may be another one as appropriate.

When the reaction system contains moisture, the moisture may be purged by passing a gas such as nitrogen during the reaction, but frequently it is azeotropically removed from the system with a small amount of an appropriate solvent such as benzene, toluene, xylene and chlorobenzene.

Completion of the reaction may be determined by observing reduction in the starting materials using thin layer chromatography or high performance liquid chromatography. At the end of the reaction, the mixture is condensed or poured into, for example, water to give a crude dinitro compound. The compound may be purified by recrystallization from a solvent or a slagging.

At the end of the reaction, the catalyst used in reduction may be removed, and the reaction solvent may be evaporated to give a desired product.

In the process (iii), 2,4-dichlorobenzotrifluoride may be condensed with m-aminophenol in the presence of a base in an aprotic polar solvent, to give 1,3-bis(3-aminophenoxy)-4-trifluoromethylbenzene. The materials, 2,4-dichlorobenzotrifluoride and m-aminophenol are commercially and easily available.

In this process, the amount of m-aminophenol may be at least 2 molar equivalents to 2,4-dichlorobenzotrifluoride, preferably 2 to 2.5 molar equivalents in the light of some conditions such as complexity in post-treatment and cost.

Bases and aprotic polar solvents which may be used are as described in the process (ii). These bases may be used in the amount of at least 1 molar equivalent, preferably 1 to 2 molar equivalents to hydroxy groups in the starting m-aminophenol. An adequate amount of these solvents may be generally, but is not limited to, 1 to 10 fold by weight to the amount of the starting materials.

In this process of this invention, a phase transfer catalyst may be used for accelerating a reaction, including copper powder, copper compounds, crown ethers, polyethylene glycol, quaternary ammonium salts and quaternary phosphonium salts.

Reaction temperature may be generally 40 to 250° C., preferably 80 to 180° C.

Generally, a reaction procedure may be either placing a predetermined amount of m-aminophenol, a base and an aprotic polar solvent to convert m-aminophenol into an alkali metal salt and then adding 2,4-dichlorobenzotrifluoride to react with the salt, or blending all the materials including 2,4-dichlorobenzotrifluoride and then heating them to proceed a reaction. However, a procedure to be used is not limited to these, and may be another one as appropriate.

When the reaction system contains moisture, the moisture may be purged bypassing a gas such as nitrogen during the reaction, but frequently it is azeotropically removed from the system with a small amount of an appropriate solvent such as benzene, toluene, xylene and chlorobenzene. Completion of the reaction may be determined as described in the process (ii).

Diamines which may be used for preparing the polyamides or the polyimides related to this invention, are not limited to these, without departing from the scope of this invention.

Furthermore, other known diamines may be combined as long as they do not adversely affect the excellent properties of the product of this invention, wherein their amount may be less than 50 equivalent parts, preferably up to 30 equivalent parts, more preferably up to 10 equivalent parts, to 100 equivalent parts of a diamine represented by general formula (7).

The other known diamines include m-phenylenediamine, o-phenylenediamine, p-phenylenediamine, m-aminobenzylamine, p-aminobenzylamine, 3,3'-diaminobiphenyl, 4,4'-diaminobiphenyl, 4,4'-diaminodiphenyl ether, 3,3'-diaminodiphenyl ether, 3,4'-diaminodiphenyl ether, bis(3-aminophenyl) sulfide, (3-aminophenyl)(4-aminophenyl) sulfide, bis(4-aminophenyl) sulfide, bis(3-aminophenyl) sulfoxide, (3-aminophenyl)(4-aminophenyl) sulfoxide, bis(4-aminophenyl) sulfoxide, bis(3-aminophenyl) sulfone, (3-aminophenyl)(4-aminophenyl) sulfone, bis(4-aminophenyl) sulfone, 3,3'-diaminobenzophenone, 3,4'-diaminobenzophenone, 4,4'-diaminobenzophenone, 3,3'-diamino-4,4'-diphenoxybenzophenone, 3,3'-diaminodiphenylmethane, 3,4'-diaminodiphenylmethane, 4,4'-diaminodiphenylmethane, bis[4-(3-aminophenoxy)phenyl]methane, bis[4-(4-aminophenoxy)phenyl]methane, 1,1-bis[4-(3-aminophenoxy)phenyl]ethane, 1,1-bis[4-(4-aminophenoxy)phenyl]ethane, 1,2-bis[4-(3-aminophenoxy)phenyl]ethane, 1,2-bis[4-(4-aminophenoxy)phenyl]ethane, 2,2-bis[4-(3-aminophenoxy)phenyl]propane, 2,2-bis[4-(4-aminophenoxy)phenyl]propane, 2,2-bis[4-(3-aminophenoxy)phenyl]butane, 2,2-bis[4-(3-aminophenoxy)phenyl]-1,1,1,3,3,3-hexafluoropropane, 2,2-bis[4-(4-aminophenoxy)phenyl]-1,1,1,3,3,3-hexafluoropropane, 1,3-bis(3-aminophenoxy)benzene, 1,3-bis(4-aminophenoxy)benzene, 1,4-bis(3-aminophenoxy)benzene, 1,4-bis(4-aminophenoxy)benzene, 1,3-bis(3-aminophenoxy)-2-trifluoromethylbenzene, 1,3-bis(3-aminophenoxy)-5-trifluoromethylbenzene, 1,3-bis(3-amino-5-trifluoromethylphenoxy)benzene, 1,3-bis(3-amino-5-trifluoromethylphenoxy)-5-trifluoromethylbenzene, 1,3-bis(3-amino-5-trifluoromethylphenoxy)-4-trifluoromethylbenzene, 1,3-bis(3-aminobenzoyl)benzene, 1,3-bis(4-aminobenzoyl)benzene, 1,4-bis(3-aminobenzoyl)benzene, 1,4-bis(4-aminobenzoyl)benzene, 1,3-bis(3-amino-α,α-dimethylbenzyl)benzene, 1,3-bis(4-amino-α,α-dimethylbenzyl)benzene, 1,4-bis(3-amino-α,α-dimethylbenzyl)benzene, 1,4-bis(4-amino-α,α-dimethylbenzyl)benzene, 4,4'-bis(3-aminophenoxy) biphenyl, 4,4'-bis(4-aminophenoxy)biphenyl, bis[(4-(3-aminophenoxy)phenyl) ketone, bis[(4-(4-aminophenoxy)phenyl) ketone, bis[(4-(3-aminophenoxy)phenyl) sulfide, bis[(4-(4-aminophenoxy)phenyl) sulfide, bis[(4-(3-aminophenoxy)phenyl) sulfoxide, bis[(4-(4-aminophenoxy)phenyl) sulfoxide, bis[(4-(3-aminophenoxy)phenyl) sulfone, bis[(4-(4-aminophenoxy)phenyl) sulfone, bis[(4-(3-aminophenoxy)phenyl) ether, bis[(4-(4-aminophenoxy)phenyl) ether, 1,4-bis[4-(3-aminophenoxy)benzoyl]benzene, 1,3-bis[4-(3-aminophenoxy)benzoyl]benzene, 4,4'-bis[3-(4-aminophenoxy)benzoyl]diphenyl ether, 4,4'-bis[3-(3-aminophenoxy)benzoyl]diphenyl ether, 4,4'-bis[4-(4-amino-α,α-dimethylbenzyl)phenoxy]benzophenone, 4,4'-bis[4-(4-amino-α,α-dimethylbenzyl)phenoxy]diphenyl sulfone, bis[4-{4-(4-aminophenoxy)phenoxy}phenyl] sulfone, 1,4-bis[4-(4-aminophenoxy)-α,α-dimethylbenzyl] benzene, 1,4-bis[4-(3-aminophenoxy)-α,α-dimethylbenzyl] benzene, 1,3-bis[4-(4-aminophenoxy)-α,α-dimethylbenzyl] benzene, 1,3-bis[4-(3-aminophenoxy)-α,α-dimethylbenzyl] benzene, 3,3'-diamino-4,4'-difluorobenzophenone, 3,3'-diamino-5,5'-bis(trifluoromethyl)diphenyl ether, 4,4'-diamino-5,5'-bis(trifluoromethyl)diphenyl ether;

6,6'-bis(2-aminophenoxy)-3,3,3',3'-tetramethyl-1,1'-spirobiindan, 6,6'-bis(3-aminophenoxy)-3,3,3',3'-tetramethyl-1,1'-spirobiindan, 6,6'-bis(4-aminophenoxy)-3,3,3',3'-tetramethyl-1,1'-spirobiindan, 6,6'-bis(x-amino-y-methylphenoxy)-3,3,3',3'-tetramethyl-1,1'-spirobiindans, 6,6'-bis(x-amino-y-ethylphenoxy)-3,3,3',3'-tetramethyl-1,1'-spirobiindans, 6,6'-bis(x-amino-y-propylphenoxy)-3,3,3',3'-tetramethyl-1,1'-spirobiindans, 6,6'-bis(x-amino-y-isopropylphenoxy)-3,3,3',3'-tetramethyl-1,1'-spirobiindans, 6,6'-bis(x-amino-y-methoxyphenoxy)-3,3,3',3'-tetramethyl-1,1'-spirobiindans, 6,6'-bis(x-amino-y-ethoxyphenoxy)-3,3,3',3'-tetramethyl-1,1'-spirobiindans, 6,6'-bis(x-amino-y-propoxyphenoxy)-3,3,3',3'-tetramethyl-1,1'-spirobiindans, p1 6,6'-bis(x-amino-y-isopropoxyphenoxy)-3,3,3',3'-tetramethyl-1,1'-spirobiindans, 6,6'-bis(x-amino-y-phenylphenoxy)-3,3,3',3'-tetramethyl-1,1'-spirobiindans, 6,6'-bis(x-amino-y-phenoxyphenoxy)-3,3,3',3'-tetramethyl-1,1'-spirobiindans, 6,6'-bis(x-amino-y-benzylphenoxy)-3,3,3',3'-tetramethyl-1,1'-spirobiindans, 6,6'-bis[x-amino-y-(1-naphthyl)phenoxy]-3,3,3',3'-tetramethyl-1,1'-spirobiindans, 6,6'-bis[x-amino-y-(2-naphthyl)phenoxy]-3,3,3',3'-tetramethyl-1,1'-spirobiindans, 6,6'-bis[x-amino-y-(2,3,4,5,6-pentafluorophenyl)phenoxy]-3,3,3',3'-tetramethyl-1,1'-spirobiindans, 6,6'-bis[x-amino-y-(z-tolyl)phenoxy]-3,3,3',3'-tetramethyl-1,1'-spirobiindans, 6,6'-bis[x-amino-y-(x', y'-xylyl)phenoxy]-3,3,3',3'-tetramethyl-1,1'-spirobiindans, 6,6'-bis(x-amino-y-mesitylphenoxy)-3,3,3',3'-tetramethyl-1,1'-spirobiindans, 6,6'-bis[x-amino-y-(z-propylphenyl)phenoxy]-3,3,3',3'-tetramethyl-1,1'-spirobiindans, 6,6'-bis[x-amino-y-(z-cumenyl)phenoxy]-3,3,3',3'-tetramethyl-1,1'-spirobiindans, 6,6'-bis[x-amino-y-(2,3,4,5,6-pentafluorophenoxy)phenoxy]-3,3,3',3'-tetramethyl-1,1'-spirobiindans, 6,6'-bis[x-amino-y-(z-methylphenoxy)phenoxy]-3,3,3',3'-tetramethyl-1,1'-spirobiindans, 6,6'-bis[x-amino-y-(z-ethylphenoxy)phenoxy]-3,3,3',3'-tetramethyl-1,1'-spirobiindans, 6,6'-bis[x-amino-y-(z-isopropylphenoxy)phenoxy]-3,3,3',3'-tetramethyl-1,1'-spirobiindans, 6,6'-bis[x-amino-y-(x', y'-dimethylphenoxy)phenoxy]-3,3,3',3'-tetramethyl-1,1'-spirobiindans, 6,6'-bis[x-amino-y-(z-methoxyphenyl)phenoxy]-3,3,3',3'-tetramethyl-1,1'-spirobiindans, 6,6'-bis[x-amino-y-(z-methoxyphenoxy)phenoxy]-3,3,3',3'-tetramethyl-1,1'-spirobiindans, 6,6'-bis[x-amino-y-(z-trifluoromethylphenyl)phenoxy]-3,3,3',3'-tetramethyl-1,1'-spirobiindans, 6,6'-bis[x-amino-y-(z-trifluoromethylphenoxy)phenoxy]-3,3,3',3'-tetramethyl-1,1'-spirobiindans, 6,6'-bis[x-amino-y-(z-trifluoromethoxyphenyl)phenoxy]-3,3,3',3'-tetramethyl-1,1'-spirobiindan, 6,6'-bis[x-amino-y-(z-trifluoromethoxyphenoxy)phenoxy]-3,3,3',3'-tetramethyl-1,1'-spirobiindans;

1,3-bis(3-aminophenoxy)-4-trifluoromethylbenzene, 1,3-bis(3-amino-z'-ethylphenoxy)-4-trifluoromethylbenzenes, 1,3-bis(3-amino-z'-propylphenoxy)-4-trifluoromethylbenzenes, 1,3-bis(3-amino-z'-isopropylphenoxy)-4-trifluoromethylbenzenes, 1,3-bis(3-amino-z'-methoxyphenoxy)-4-trifluoromethylbenzenes, 1,3-bis(3-amino-z'-ethoxyphenoxy)-4-trifluoromethylbenzenes, 1,3-bis(3-amino-z'- propoxyphenoxy)-4-trifluoromethylbenzenes, 1,3-bis (3-amino-z'-isopropoxyphenoxy)-4-trifluoromethylbenzenes, 1,3-bis(3-amino-z'-phenylphenoxy)-4-trifluoromethylbenzenes, 1,3-bis(3-amino-z'-benzylphenoxy)-4-trifluoromethylbenzenes, 1,3-bis[3-amino-z'-(1-naphtyl)phenoxy]-4-trifluoromethylbenzenes, 1,3-bis[3-amino-z'-(2-naphtyl)phenoxy]-4-trifluoromethylbenzenes, 1,3-bis[3-amino-z'-(2,3,4,5,6-pentafluorophenyl)phenoxy]-4-trifluoromethylbenzenes, 1,3-bis[3-amino-z'-(x,y-xylyl)phenoxy]-4-trifluoromethylbenzenes, 1,3-bis(3-amino-z'-mesitylphenoxy)-4-trifluoromethylbenzenes, 1,3-bis[3-amino-z'-(z-propylphenyl)phenoxy]-4-trifluoromethylbenzenes, 1,3-bis[3-amino-z'-(z-cumenyl)phenoxy]-4-trifluoromethylbenzenes, 1,3-bis[3-amino-z'-(2,3,4,5,6-pentafluorophenoxy)phenoxy]-4-trifluoromethylbenzenes, 1,3-bis[3-amino-z'-(z-methylphenoxy)phenoxy]-4-trifluoromethylbenzenes, 1,3-bis[3-amino-z'-(z-ethylphenoxy)phenoxy]-4-trifluoromethylbenzenes, 1,3-bis[3-amino-z'-(z-isopropylphenoxy)phenoxy]-4-trifluoromethylbenzenes, 1,3-bis[3-amino-z'-(x,y-dimethylphenoxy)phenoxy]-4-trifluoromethylbenzenes, 1,3-bis[3-amino-z'-(z-methoxyphenyl)phenoxy]-4-trifluoromethylbenzenes, 1,3-bis[3-amino-z'-(z-methoxyphenoxy)phenoxy]-4-trifluoromethylbenzenes, 1,3-bis[3-amino-z'-(z-trifluoromethylphenyl)phenoxy]-4-trifluoromethylbenzenes, 1,3-bis[3-amino-z'-(z-trifluoromethylphenoxy)phenoxy]-4-trifluoromethylbenzenes, 1,3-bis[3-amino-z'-(z-trifluoromethoxyphenyl)phenoxy]-4-trifluoromethylbenzenes and 1,3-bis[3-amino-z'-(z-trifluoromethoxyphenoxy)phenoxy]-4-trifluoromethylbenzenes, wherein x and y are different from each other and represent an integer of 2 to 6; z- represents o-, m- or p-; x' and y' are, independently of x and y, different from each other and represent an integer of 2 to 6; and z' is an integer of 2 to 6.

In preparation of the fluorine-containing polyamide of this invention, a diamine represented by formula (2) may be partially replaced with another diamine, which may be any of the above diamines.

A dicarboxylic dihalide represented by general formula (8) may be a derivative in which two —OH groups of the corresponding dicarboxylic acid are replaced by a halogen atom such as —F, —Cl and —Br. Examples are phthalic halides, terephthalic halides, isophthalic halides, methylphthalic halides, methylterephthalic halides, methylisophthalic halides, ethylphthalic halides, ethylterephthalic halides, ethylisophthalic halides, methoxyphthalic halides, methoxyterephthalic halides, methoxyisophthalic halides, ethoxyphthalic halides, ethoxyterephthalic halides, ethoxyisophthalic halides, chlorophthalic halides, chloroterephthalic halides, chloroisophthalic halides, bromophthalic halides, bromoterephthalic halides, bromoisophthalic halides, tetrafluorophthalic halides, tetrafluoroterephthalic halides, tetrafluoroisophthalic halides, trifluoromethylisophthalic halides, trifluoromethylterephthalic halides, ditrifluoromethylisophthalic halides, ditrifluoromethylterephthalic halides, tetratrifluoromethylisophthalic halides, tetratrifluoromethylterephthalic halides, 1,2-naphthalenedicarboxylic halides, 1,4-naphthalenedicarboxylic halides, 1,5-naphthalenedicarboxylic halides, 2,3-naphthalenedicarboxylic halides, 2,6-naphthalenedicarboxylic halides, 3,3'-biphenyldicarboxylic halides, 4,4'-biphenyldicarboxylic halides, 4,4'-diphenyl ether dicarboxylic halides, 3,3'-diphenyl ether dicarboxylic halides, 3,4'-diphenyl ether dicarboxylic halides, bis(3-carboxyphenyl) sulfide halides, (3-carboxyphenyl)(4-carboxyphenyl) sulfide halides, bis(4-carboxyphenyl) sulfide halides, bis(3-carboxyphenyl) sulfone halides, (3-carboxyphenyl)(4-carboxyphenyl) sulfone halides, bis(4-carboxyphenyl) sulfone halides, 3,3'-benzophenonedicarboxylic halides, 3,4'-benzophenonedicarboxylic halides, 4,4'-benzophenonedicarboxylic halides, 3,3'-diphenylmethanedicarboxylic halides, 3,4'-diphenylmethanedicarboxylic halides, 4,4'-diphenylmethanedicarboxylic halides, bis[4-(3-carboxyphenoxy)phenyl]methane halides, bis[4-(4-carboxyphenoxy)phenyl]methane halides, 2,2-bis[4-(3-carboxyphenoxy)phenyl]propane halides, 2,2-bis[4-(4-carboxyphenoxy)phenyl]propane halides, 2,2-bis[4-(3-carboxyphenoxy)phenyl]-1,1,1,3,3,3-hexafluoropropane halides, 2,2-bis[4-(4-carboxyphenoxy)phenyl]-1,1,1,3,3,3-hexafluoropropane halides, 1,3-bis(3-carboxyphenoxy)benzene halides, 1,3-bis(4-carboxyphenoxy)benzene halides, 1,4-bis(3-carboxyphenoxy)benzene halides, 1,4-bis(4-carboxyphenoxy)benzene halides, 1,3-bis(3-carboxyphenoxy)-2-trifluoromethylbenzene halides, 1,3-bis(3-carboxyphenoxy)-4-trifluoromethylbenzene halides, 1,3-bis(3-carboxyphenoxy)-5-trifluoromethylbenzene halides, 1,3-bis(3-carboxy-5-trifluoromethylphenoxy)benzene halides, 1,3-bis(3-carboxy-5-trifluoromethylphenoxy)-5-trifluoromethylbenzene halides, 1,3-bis(3-carboxy-5-trifluoromethylphenoxy)-4-trifluoromethylbenzene halides, 1,3-bis(3-carboxybenzoyl)benzene halides, 1,3-bis(4-carboxybenzoyl)benzene halides, 1,4-bis(3-carboxybenzoyl)benzene halides, 1,4-bis(4-carboxybenzoyl)benzene halides, 4,4'-bis(3-carboxyphenoxy)biphenyl halides, 4,4'-bis(4-carboxyphenoxy)biphenyl halides, bis[4-(3-carboxyphenoxy)phenyl] ether halides, bis[4-(4-carboxyphenoxy)phenyl] ether halides, 3,3'-dicarboxy-4,4'-difluorobenzophenone halides, 3,3'-dicarboxy-5,5'-bis(trifluoromethyl)diphenyl ether halides, 4,4'-dicarboxy-5,5'-bis(trifluoromethyl)diphenyl ether halides, 4,4'-bis[2-(4-carboxyphenylphenoxy)-1,1,1,3,3,3-hexafluoroisopropyl]diphenyl ether halides and 4,4'-bis[2-(4-carboxyphenylphenoxy)-1,1,1,3,3,3-hexafluoroisopropyl]biphenyl ether halides.

In a fluorine-containing polyamide, a dicarboxylic acid derivative which may be used also includes 2,2'-biphenyl dicarboxylic acid and its derivatives, 4,4'-biphenyl dicarboxylic acid and its derivatives, 4,4'-diphenyl ether dicarboxylic acid and its derivatives, 4,4'-diphenyl sulfide dicarboxylic acid and its derivatives, 4,4'-benzophenone dicarboxylic acid and its derivatives, 4,4'-diphenyl sulfone dicarboxylic acid and its derivatives, 4,4'-diphenylmethane dicarboxylic acid and its derivatives, 2,2'-(4-carboxyphenyl) propane and its derivatives, 2,2'-(4-carboxyphenyl)-1,1,1,3, 3,3-hexafluoropropane and its derivatives, 1,4-naphthalene dicarboxylic acid and its derivatives, 2,3-naphthalene dicarboxylic acid and its derivatives, and 2,6-naphthalene dicarboxylic acid and its derivatives.

Among these dicarboxylic acids or their derivatives represented by general formula (8), phthalic acid, isophthalic acid and terephthalic acid and their derivatives (preferably, acid chlorides) are most preferably in the light of many factors such as performance of a polyamide obtained including heat resistance, availability, readiness in preparation and price.

In this invention, the dicarboxylic halide is, however, not limited to these examples, and may be used solely or in combination of two or more.

Furthermore, when polymerizing the polyamide according to the above process, a dicarboxylic acid or its derivative represented by general formula (8) may be partially replaced with another dicarboxylic acid or its derivative, respectively, as long as it does not adversely affect the excellent physical properties of the product prepared by the process of this invention.

The dicarboxylic acid or its derivative which may be used as a partial alternative may be those represented by general formula (15);

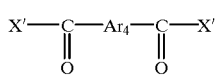
(15)

wherein X' is as defined above;

for example, oxalic acid or its derivative and propylene dicarboxylic acid or its derivative where $Ar_4$ is an aliphatic group;

1,2-cyclohexane dicarboxylic acid and its derivative where $Ar_4$ is a cyclic aliphatic group;

phthalic acid, isophthalic acid and their derivatives where $Ar_4$ is a monocyclic aromatic group;

2,3-naphthalene dicarboxylic acid, 2,6-naphthalene dicarboxylic acid, 1,8-naphthalene dicarboxylic acid and their derivatives where $Ar_4$ is a fused polycyclic aromatic group;

biphenyl-2,2'-dicarboxylic acid, biphenyl-4,4'-dicarboxylic acid and their derivatives where $Ar_4$ is a non-fused cyclic aromatic group to which an aromatic group is directly bound; and benzophenone dicarboxylic acid, biphenyl dicarboxylic acid and their derivatives where $Ar_4$ is a non-fused cyclic aromatic group to which an aromatic group is bound via a crosslinking group, wherein the term "derivatives" means those in which —OH groups in the carboxylic acid are replaced with halogen atom or atoms such as F, Cl, Br and I.

A process for preparing a polyamide or its copolymer or a fluorine-containing polyamide used in this invention is not limited to the above ones, and a variety of known processes can be applied. For example, the polymerization may be conducted using a non-halogenated dicarboxylic acid instead of the above dihalide.

In preparation of the polyamide or its copolymer used in this invention, the end of the molecule may be protected with a monovalent carboxylic acid or its derivative, or a monovalent amine. In other words, it can be prepared in a manner that a dicarboxylic acid or its derivative is partly replaced with a monocarboxylic acid or its derivative such as monocarboxylic halides, or a diamine is partly replaced with a monoamine.

Monocarboxylic acids which may be used in these processes include benzoic acid, chlorobenzoic acids, bromobenzoic acids, methylbenzoic acids, ethylbenzoic acids, methoxybenzoic acids, ethoxybenzoic acids, nitrobenzoic acids, acetylbenzoic acids, acetoxybenzoic acids, hydroxybenzoic acids, biphenylcarboxylic acids, benzophenonecarboxylic acids, diphenyl ether carboxylic acids, diphenyl sulfide carboxylic acids, diphenyl sulfone carboxylic acids, 2,2-diphenylpropanecarboxylic acids, 2,2-diphenyl-1,1,1,3,3,3-hexafluoropropanecarboxylic acids, naphthalenecarboxylic acids, acetic acid, chloroacetic acid, dichloroacetic acid, trichloroacetic acid, fluoroacetic acid, difluoroacetic acid, trifluoroacetic acid, nitroacetic acid, propionic acid, butyric acid, valeric acid, caproic acid and cyclohexanecarboxylic acid. These monocarboxylic acids may be used solely or in combination of two or more.

Monocarboxylic acids include acid chlorides and acid bromides of these monocarboxylic acids, which may be used solely or in combination of two or more.

Monocarboxylic acid esters include alkyl esters having 1 to 10 carbons, phenyl esters, fluorophenyl esters, chlorophenyl esters, bromophenyl esters, methylphenyl esters, ethylphenyl esters, propylphenyl esters, isopropylphenyl esters, butylphenyl esters, isobutylphenyl esters, t-butylphenyl esters, methoxyphenyl esters, ethoxyphenyl esters, nitrophenyl esters, phenylphenyl esters and naphthyl esters of the above monocarboxylic acids, which may be used solely or in combination of two or more.

The amount of a monocarboxylic acid used is 0.001 to 1.00 mol per 1 mol of an aromatic diamine. If it is less than 0.001 mol, a viscosity will be increased during hot molding, leading to deterioration of moldability and processability. If it is over 1.00 mol, mechanical properties will be deteriorated. It is preferably 0.01 to 0.50 mol.

Monoamines which may be used, include aniline, o-toluidine, m-toluidine, p-toluidine, 2,3-xylidine, 2,4-xylidine, 2,5-xylidine, 2,6-xylidine, 3,4-xylidine, 3,5-xylidine, o-chloroaniline, m-chloroaniline, p-chloroaniline, o-bromoaniline, m-bromoaniline, p-bromoaniline, o-nitroaniline, m-nitroaniline, p-nitroaniline, o-anisidine, m-anisidine, p-anisidine, o-phenetidine, m-phenetidine, p-phenetidine, o-aminophenol, m-aminophenol, p-aminophenol, o-aminobenzaldehyde, m-aminobenzaldehyde, p-aminobenzaldehyde, o-aminobenzonitrile, m-aminobenzonitrile, p-aminobenzonitrile, 2-aminobiphenyl, 3-aminobiphenyl, 4-aminobiphenyl, 2-aminophenyl phenyl ether, 3-aminophenyl phenyl ether, 4-aminophenyl phenyl ether, 2-aminobenzophenone, 3-aminobenzophenone, 4-aminobenzophenone, 2-aminophenyl phenyl sulfide, 3-aminophenyl phenyl sulfide, 4-aminophenyl phenyl sulfide, 2-aminophenyl phenyl sulfone, 3-aminophenyl phenyl sulfone, 4-aminophenyl phenyl sulfone, α-naphthylamine, β-naphthylamine, 1-amino-2-naphthol, 2-amino-1-naphthol, 4-amino-1-naphthol, 5-amino-1-naphthol, 5-amino-2-naphthol, 7-amino-2-naphthol, 8-amino-1-naphthol, 8-amino-2-naphthol, 1-aminoanthracene, 2-aminoanthracene and 9-aminoanthracene.

These monoamines may be used solely or in combination of two or more. The amount of a monoamine used is 0.001 to 1.00 mol per 1 mol of an aromatic dicarboxylic acid. If it is less than 0.001 mol, a viscosity will be increased during hot molding, leading to deterioration of moldability and processability. If it is over 1.00 mol, mechanical properties will be deteriorated. It is preferably 0.01 to 0.50 mol.

A logarithmic viscosity of a polyamide or its copolymer for an optical component of this invention is 0.01 dL/g to 3.00 dL/g both including, preferably 0.05 dL/g to 2.5 dL/g both including, more preferably 0.10 dL/g to 2.0 dL/g both including, in the light of its mechanical properties and processability. The logarithmic viscosity can be determined at 35° C. after dissolving 0.50 g of a powdery polyamide or its copolymer in 100 mL of N-methyl-2-pyrrolidone.

A logarithmic viscosity of the fluorine-containing polyamide of this invention is 0.01 dL/g to 3.00 dL/g both including, preferably 0.05 dL/g to 2.5 dL/g both including, more preferably 0.10 dL/g to 2.0 dL/g both including, in the light of its mechanical properties and processability. The logarithmic viscosity can be determined at 35° C. after dissolving 0.50 g of the polyamide powder in 100 mL of hexamethylphosphoric triamide.

A tetracarboxylic dianhydride represented by general formula (9) which may be used in preparation of a polyimide for the organic optical component of this invention includes pyromellitic dianhydride, 3,3',4,4'-benzophenonetetracarboxylic dianhydride,
2,2',3,3'-benzophenonetetracarboxylic dianhydride,
3,3',4,4'-biphenyltetracarboxylic dianhydride,
2,2',3,3'-biphenyltetracarboxylic dianhydride,
2,2-bis(3,4-dicarboxyphenyl)propane dianhydride,
2,2-bis(2,3-dicarboxyphenyl)propane dianhydride,
2,2-bis(3,4-dicarboxyphenyl)-1,1,1,3,3,3-hexafluoropropane dianhydride,
2,2-bis(2,3-dicarboxyphenyl)-1,1,1,3,3,3-hexafluoropropane dianhydride,
3,3',4,4'-diphenyl ether tetracarboxylic dianhydride,
3,3',4,4'-diphenyl sulfone tetracarboxylic dianhydride,
bis(2,3-dicarboxyphenyl)methane dianhydride,
bis(3,4-dicarboxyphenyl)methane dianhydride,
1,3-bis[(3,4-dicarboxy)benzoyl]benzene dianhydride,
1,4-bis[(3,4-dicarboxy)benzoyl]benzene dianhydride,
1,3-bis[(3,4-dicarboxy)phenoxy]benzene dianhydride,
1,4-bis[(3,4-dicarboxy)phenoxy]benzene dianhydride,
2,2-bis[4-(3,4-dicarboxyphenoxy)phenyl]propane dianhydride,
2,2-bis[4-(2,3-dicarboxyphenoxy)phenyl]propane dianhydride,
2,2-bis[4-(3,4-dicarboxyphenoxy)phenyl]-1,1,1,3,3,3-hexafluoropropane dianhydride,
2,2-bis[4-(2,3-dicarboxyphenoxy)phenyl]-1,1,1,3,3,3-hexafluoropropane dianhydride,
bis[4-(3,4-dicarboxyphenoxy)phenyl] ketone dianhydride,
bis[4-(2,3-dicarboxyphenoxy)phenyl] ketone dianhydride,
4,4'-bis(3,4-dicarboxyphenoxy)biphenyl dianhydride,
4,4'-bis(2,3-dicarboxyphenoxy)biphenyl dianhydride,
bis[4-(3,4-dicarboxyphenoxy)phenyl] sulfone dianhydride,
bis[4-(2,3-dicarboxyphenoxy)phenyl] sulfone dianhydride,
bis[4-(3,4-dicarboxyphenoxy)phenyl] sulfide dianhydride,
bis[4-(2,3-dicarboxyphenoxy)phenyl] sulfide dianhydride,
2,3,6,7-naphthalenetetracarboxylic dianhydride, and
1,2,3,4-benzenetetracarboxylic dianhydride, although a tetracarboxylic dianhydride may not be limited to these within the scope of this invention. These may be used solely or in combination of two or more.

When polymerizing the polyimide, its end can be suitably protected by conducting the reaction in the presence of an aromatic dicarboxylic anhydride or an aromatic monoamine, according to, for example, any of the following procedures;

(a) reacting a tetracarboxylic dianhydride and a diamine; and then adding a dicarboxylic anhydride or an aromatic monoamine;
(b) adding a dicarboxylic anhydride to a diamine and then adding a tetracarboxylic dianhydride, or adding an aromatic monoamine to a tetracarboxylic dianhydride and then adding a diamine; and
(c) simultaneously adding a tetracarboxylic dianhydride, a diamine and a dicarboxylic anhydride or an aromatic monoamine.

Aromatic dicarboxylic anhydrides which can be used in the reaction, include phthalic anhydride, 2,3-benzophenonedicarboxylic anhydride, 3,4-benzophenonedicarboxylic anhydride, 2,3-dicarboxyphenyl phenyl ether anhydride, 3,4-dicarboxyphenyl phenyl ether anhydride, 2,3-biphenyldicarboxylic anhydride, 3,4-biphenyldicarboxylic anhydride, 2,3-dicarboxyphenyl phenyl sulfone anhydride, 3,4-dicarboxyphenyl phenyl sulfone anhydride, 2,3-dicarboxyphenyl phenyl sulfide anhydride, 3,4-dicarboxyphenyl phenyl sulfide anhydride, 1,2-naphthalenedicarboxylic anhydride, 2,3-naphthalenedicarboxylic anhydride, 1,8-naphthalenedicarboxylic anhydride, 1,2-anthracenedicarboxylic anhydride, 2,3-anthracenedicarboxylic anhydride and 1,9-anthracenedicarboxylic anhydride. These dicarboxylic anhydride may be used solely or in combination of two or more. Among these dicarboxylic anhydride, phthalic anhydrides is most preferable in the light of performance and practicability of a resin produced.

The amount of a dicarboxylic anhydride used is 0.001 to 1.00 mol per 1 mol of an aromatic diamine. If it is less than 0.001 mol, a viscosity will be increased during hot molding, leading to deterioration of moldability and processability. If it is over 1.00 mol, mechanical properties will be deteriorated. It is preferably 0.01 to 0.50 mol.

The monoamine may be selected from the above monoamines. These monoamines may be used solely or in combination of two or more. The amount of a monoamine used is 0.001 to 1.00 mol per 1 mol of an aromatic dicarboxylic acid. If it is less than 0.001 mol, a viscosity will be increased during hot molding, leading to deterioration of moldability and processability. If it is over 1.00 mol, mechanical properties will be deteriorated. It is preferably 0.01 to 0.50 mol.

A logarithmic viscosity of a polyimide used in this invention is 0.01 dL/g to 3.00 dL/g both including, preferably 0.05 dL/g to 2.5 dL/g both including, more preferably 0.10 dL/g to 2.0 dL/g both including, in the light of its mechanical properties and processability. The logarithmic viscosity can be determined after dissolving 0.50 g of a sample in 100 mL of a mixture of p-chlorophenol and phenol (90:10 wt %) by heating and then cooling the mixture to 35° C.

A polyamide or its copolymer, or a polyimide may be prepared by condensation polymerizing a diamine and dicarboxylic acid, or a diamine and a tetracarboxylic dianhydride in an organic solvent, respectively. Organic solvents which may be used in the process, include N,N-dimethylformamide, N,N-diethylformamide, N,N-dimethylacetamide, N,N-diethylacetamide, N,N-dimethylmethoxyacetamide, N-methyl-2-pyrrolidone, 1,3-dimethyl-2-imidazolidinone, N-methylcaprolactam, sulfolane, 2,4-lutidine, 2,6-lutidine, quinoline, isoquinoline, trimethylamine, tripropylamine, tributylamine, tripentylamine, N,N-dimethylaniline, N,N-diethylaniline, dichloromethane, chloroform, carbon tetrachloride, 1,1,1-trichloroethane, 1,1,2-trichloroethane, trichloroethylene, 1,1,2,2-tetrachloroethane, tetrachloroethylene, n-hexane, cyclohexane, methyl acetate, ethyl acetate, propyl acetate, butyl acetate, acetonitrile, propionitrile, acetone, methyl ethyl ketone, methyl butyl ketone, methyl isobutyl ketone, cyclohexanone, acetophenone, isopropyl ether, tetrahydropyrane, 1,3-dioxane, phenetol, benzyl ether, phenyl ether, 1,2-dimethoxyethane, bis(2-methoxyethyl) ether, 1,2-bis(2-methoxyethoxy)ethane, benzene, toluene, o-xylene, m-xylene, p-xylene, diphenyl, terphenyl, benzyl chloride, nitrobenzene, 2-nitrotoluene, 3-nitrotoluene, 4-nitrotoluene, chlorobenzene, 2-chlorotoluene, 3-chlorotoluene, 4-chlorotoluene, o-dichlorobenzene, p-dichlorobenzene, bromobenzene, 2,3-xylenol, 2,4-xylenol, 3,4-xylenol, 3,5-xylenol, bis[2-(2-methoxyethoxy)ethyl] ether, tetrahydrofuran, 1,3-dioxane, 1,4-dioxane, xylene, pyridine, α-picoline, β-picoline, γ-picoline, dimethyl sulfoxide, dimethyl sulfone, tetramethyl urea, hexamethylphosphoric triamide, phenol, o-cresol, m-cresol, p-cresol, m-cresylic acid, o-chlorophenol, p-chlorophenol, methanol, ethanol, propanol, isopropanol, butanol, isobutanol, tert-butanol, cyclohexanol, benzyl alcohol and anisole.

These organic solvents may be used solely or in combination of two or more, depending on the starting monomers used in the reaction and a polymerization procedure.

When a dicarboxylic dihalide is used as a starting monomer in the case of a polyamide, a de-hydrohalogenating agent is concomitantly used in general. De-hydrohalogenating agents which may be used include trimethylamine, triethylamine, tripropylamine, tributylamine, tripentylamine, N,N-dimethylbenzylamine, N,N-diethylbenzylamine, N,N-dimethylcyclohexylamine, N,N-diethylcyclohexylamine, N,N-dimethylaniline, N,N-diethylaniline, N-methylpyrrolidine, N-ethylpyrrolidine, N-methylpiperidine, N-ethylpiperidine, N-methylmorpholine, N-ethylmorpholine, pyridine, α-picoline, β-picoline, γ-picoline, 2,4-lutidine, 2,6-lutidine, quinoline, isoquinoline, ethylene oxide and propylene oxide, preferably pyridine and γ-picoline.

When a dicarboxylic acid is used as a starting monomer in the case of a polyamide, a condensing agent is generally used. Condensing agents which may be used include sulfur trioxide, thionyl chloride, sulfites, picryl chloride, phosphorus pentoxide, phosphorus oxychloride, phosphite-pyridine condensing agent, triphenylphosphine-hexachloroethane condensing agent and propylphosphoric anhydride-N-methyl-2-pyrrolidone condensing agent.

In preparing the polyimide, the reaction may be conducted in an organic solvent, according to any known process; for example, 1) blending monomers in the organic solvent to form a polyamic acid; removing the solvent at a lower temperature by some procedure such as vacuum distillation, or pouring the polyamic acid solution into a poor solvent, to isolate the polyamic acid; and then heating the product to be converted to a polyimide;

2) preparing a polyamic acid solution as described in the above 1); adding a dehydrating agent represented by acetic anhydride to the solution; chemically converting the acid into an imide, if necessary, in the presence of a catalyst; isolating the polyimide according to a known procedure; and washing and drying the polyimide;

3) preparing a polyamic acid solution as described in the above 1); and then thermally converting the acid into an imide, while removing the solvent under a reduced pressure or by heating; and 4) charging materials into the solvent; and heating the mixture to form a polyamic acid and convert it into an imide simultaneously, if necessary, in the presence of a catalyst, an azeotropic agent and/or a dehydrating agent.

A reaction temperature for preparation of a polyamide is generally equal to or below 300° C., depending on some factors such as a polymerization procedure and the type of the solvent. A reaction pressure is not limited, and the atmospheric pressure may be adequate. A reaction period may vary depending on some factors such as the types of starting monomers, a polymerization procedure, the type of a solvent, the type of a de-hydrohalogenating agent, the type of the condensing agent and a reaction temperature; generally 10 min to 24 hours is adequate. It will be adequate for preparation of a polyimide that the reaction is conducted at 100° C. to 250° C. for 1 hour to 24 hours, but these conditions are not limited to them.

The following will describe a process for preparing an optical component of this invention from the above polyamide or its copolymer or a polyimide.

A substrate for an optical disk or magneto-optical disk may be molded according to a known process such as a melting injection molding, as in the case of a conventional thermoplastic polymer such as polycarbonate and polyester.

Furthermore, an optical lens may be suitably formed according to a known process such as a melting injection molding as in the case of, for example, polycarbonate or polyester (See, e.g. JP-A 60-135901).

An organic optical component which is formed according to the above process from a polyamide or its copolymer comprising the repeating structural unit represented by formula (1) has excellent transparency, mechanical strength and heat resistance, and a low birefringence, which is useful as an optical disk substrate, a pickup lens, a plastic board for a liquid crystal cell or a prism.

The fluorine-containing polyamide of this invention can be subject to melt molding. In such a case, another thermoplastic resin may be blended in an appropriate amount depending on its purpose, as long as it does not adversely affect the objective of this invention; examples of such a thermoplastic resin include polyethylene, polypropylene, polycarbonates, polyalylates, polyamides, polyimides, polysulfones, polyether sulfones, polyether ketones, polyether ether ketone, polyphenylene sulfides, polyamide imides, polyetherimides and modified polyphenylene oxides.

Furthermore, a thermosetting resin and/or a filler can be blended as long as it does not adversely affect the objective of this invention. The thermosetting resin includes phenol resins and epoxy resins. The filler includes abrasion resistance improvers such as graphite, Carborundum, silica power, molybdenum disulfide and fluorinated resins; reinforcing materials such as glass fiber, carbon fiber, boron fiber, silicon carbide fiber, carbon whisker, asbestos, metal fiber and ceramic fiber; incombustibility improvers such as antimony trioxide, magnesium carbonate and calcium carbonate; electric characteristic improvers such as clay and mica; tracking resistance improvers such as asbestos, silica and graphite; acid resistance improvers such as barium sulfate, silica and calcium meta-silicate; heat conductivity improvers such as iron powder, zinc powder, aluminum powder and copper powder; glass beads; talc; diatom diatomaceous earth; alumina; silacaballon; hydrated alumina; metal oxides; and pigments.

Various types of fibrous reinforcing materials may be used in melt molding of the fluorine-containing polyamide of this invention, such as glass fiber, carbon fiber, potassium titanate fiber, aromatic polyamide fibers, silicon carbide fiber, alumina fiber, boron fiber and ceramic fibers, more preferably glass fiber and aromatic polyamide fibers.

A resin composition from the fluorine-containing polyamide of this invention may be prepared according to a known process, preferably by the following process.

(1) premixing a polyamide powder and a fibrous reinforcing material with a blending measures such as a mortar, Henschel mixer, a drum blender, a tumbler blender, a ball mill and a ribbon blender, mixing it with known measures such as a melt blender and a heating roller, and then pelletizing or pulverizing the mixture; or (2) dissolving or suspending a polyamide powder in an organic solvent, soaking a fibrous reinforcing material in the solution or suspension, and then removing the solvent in an air forced oven to pelletize or pulverize it, wherein the solvent may include N,N-dimethylformamide, N,N-dimethylacetamide, N,N-diethylacetamide, N,N-dimethylmethoxyacetamide, N-methyl-2-pyrrolidone, 1,3-dimethyl-2-imidazolidinone, N-methylcaprolactam, 1,2-dimethoxyethane, bis(2-methoxyethyl) ether, 1,2-bis(2-methoxyethoxy)ethane, bis[2-(2-methoxyethoxy) ethyl] ether, tetrahydrofuran, 1,3-dioxane, 1,4-dioxane, pyridine, picoline, dimethyl sulfoxide, dimethyl sulfone, tetramethyl urea and hexamethylphosphoric triamide. These organic solvents can be used solely or in combination of two or more.

The fluorine-containing polyamide resin composition of this invention may be formed for a practical use by a known molding process such as injection molding, extrusion molding, compression molding and rotational molding.

EXAMPLES

This invention will be specifically illustrated by the following examples, but is not limited to these.

Polyamides

Processes for preparation of the polyamides used in the examples and the comparative examples will be described, but this invention is not limited to the preparation examples.

In the following preparation examples and comparative preparation examples, the diamines and the dicarboxylic dihalides used are as follows.

In these preparation examples and comparative examples, "$\eta_{inh}$" means a logarithmic viscosity determined in a concentration of 0.5 dL/g in N-methyl-2-pyrrolidone at 35° C.; "Tg" means a glass-transition temperature determined by DSC at a warming rate of 16° C./min; and "$Td_5$" means a 5% weight-loss temperature in the air determined by DTA-TG at a warming rate of 10° C./min.

Diamines (represented by the following symbols of A) to M) in the tables)

A): 1,3-bis(3-aminophenoxy)-4-trifluoromethylbenzene;

B): 1,3-bis(3-amino-4-isopropylphenoxy)-4-trifluoromethylbenzene;

C): 1,3-bis(3-amino-5-methoxyphenoxy)-4-trifluoromethylbenzene;

D): 1,3-bis(3-amino-4-benzylphenoxy)-4-trifluoromethylbenzene;

E): 1,3-bis[3-amino-4-(2,3,4,5,6-pentafluorophenyl)phenoxy]-4-trifluoromethylbenzene;

F): 2,2-bis[4-(3-aminophenoxy)phenyl]propane;

G): 1,3-bis(3-aminophenoxy)benzene;

H): 1,3-bis(3-amino-5-trifluoromethylphenoxy)-4-trifluoromethylbenzene;

I): 1,3-bis(3-amino-5-fluorophenoxy)-4-trifluoromethylbenzene;

J): 1,3-bis(3-amino-4-fluorophenoxy)-4-trifluoromethylbenzene;

K): 1,3-bis(3-amino-6-fluorophenoxy)-4-trifluoromethylbenzene;

L): 1,3-bis(3-amino-2,5,6-trifluoro-4-trifluoromethylphenoxy)-2,5,6-trifluoro-4-trifluoromethylbenzene;

M): bis[4-(3-aminophenoxy)phenyl] sulfoxide

Dicarboxylic dihalides (represented by the following symbols of W) to U) in the tables)

W): terephthalic dichloride;

X): isophthalic dichloride;

Y): 4,4'-biphenyldicarboxylic dichloride;

Z): 2,2-bis(4-chloroformylphenyl)-1,1,1,3,3,3-hexafluoropropane;

U): 4-trifluoromethylisophthalic dichloride.

Preparation Examples 1 to 13

In a vessel equipped with an agitator and a nitrogen inlet tube were charged and dissolved in an atmosphere of nitrogen, 0.05 mol of a diamine and N-methyl-2-pyrrolidone in the amounts shown in Table 1, and then 12.14 g of triethylamine (0.12 mol) was added to the mixture, which was then cooled to 5° C. Then, with more vigorous stirring, a dicarboxylic dihalide was charged in the amount shown in Table 1 (0.05 mol), and the mixture was stirred at room temperature for additional 3hours. The resulting viscous polymer solution was poured into 1 liter of methanol to give a white powder. The powder was filtered, washed with 1 liter of methanol, and dried under a reduced pressure at 180° C. for 12 hours to give a polyamide powder. Tables 1 and 2 show the yield after polymerization, the logarithmic viscosity, glass-transition temperature and a 5% weight-loss temperature for each polyamide powder. Furthermore, the polyamide powder obtained was dissolved in N-methyl-2-pyrrolidone in a concentration of 20 wt %, was cast on a glass plate, and was heated at 100° C. for 30 min, 200° for 30 min and 250° C. for 1 hour, to give a polyamide film.

TABLE 1

| | Diamine | | Dihalide | | | Polymer | | | |
|---|---|---|---|---|---|---|---|---|---|
| Prep Ex. No. | Compd | Amt. (g) | Compd | Amt. (g) | NMP (g) | Yield (g) | $\eta_{inh}$ (dl/g) | $T_g$ (° C.) | $Td_5$ (° C.) |
| 1 | A | 18.02 | W | 10.15 | 85 | 97.1 | 1.11 | 213 | 508 |
| 2 | A | 18.02 | X | 10.15 | 85 | 95.9 | 1.08 | 202 | 503 |
| 3 | A | 18.02 | Y | 13.96 | 96 | 98.1 | 0.95 | 209 | 501 |
| 4 | A | 18.02 | Z | 21.46 | 115 | 96.8 | 0.88 | 199 | 497 |
| 5 | A | 18.02 | W | 5.08 | 85 | 95.2 | 1.05 | 206 | 507 |
| | | | X | 5.08 | | | | | |
| 6 | B | 22.23 | X | 10.15 | 97 | 95.0 | 0.92 | 201 | 500 |
| 7 | B | 22.23 | Y | 13.96 | 108 | 96.6 | 0.93 | 203 | 508 |

TABLE 1-continued

| Prep Ex. No. | Diamine Compd | Amt. (g) | Dihalide Compd | Amt. (g) | NMP (g) | Polymer Yield (g) | $\eta_{inh}$ (dl/g) | $T_g$ (° C.) | $Td_5$ (° C.) |
|---|---|---|---|---|---|---|---|---|---|
| 8 | C | 21.02 | W | 10.15 | 94 | 97.6 | 0.80 | 208 | 506 |
| 9 | C | 21.02 | Y | 13.96 | 105 | 96.4 | 1.05 | 203 | 499 |
| 10 | D | 27.03 | X | 10.15 | 112 | 95.3 | 0.98 | 192 | 505 |
| 11 | D | 27.03 | Z | 21.46 | 145 | 95.8 | 0.86 | 195 | 501 |
| 12 | E | 34.63 | W | 10.15 | 164 | 95.9 | 0.97 | 197 | 502 |
| 13 | E | 34.63 | Z | 21.46 | 168 | 96.0 | 1.00 | 187 | 498 |

Dihalide: dicarboxylic dihalide
NMP: N-methyl-2-pyrrolidone

Comparative Preparation Examples 1 to 6

Polyamide powders were prepared as described in Preparation Examples 1 to 13, using a diamine, N-methyl-2-pyrrolidone, triethylamine and a dicarboxylic dihalide in the amounts shown in Table 2. The physical properties for these polyamide powders are also shown in Table 3. Furthermore, films were prepared from these polyamide powders as described in Preparation Examples 1 to 13.

TABLE 2

| Comp. Prep. Ex. No. | Diamine Compd | Amt. (g) | Dihalide Compd | Amt. (g) | NMP (g) | Polymer Yield (g) | $\eta_{inh}$ (dl/g) | $T_g$ (° C.) | $Td_5$ (° C.) |
|---|---|---|---|---|---|---|---|---|---|
| 1 | F | 20.53 | Y | 13.96 | 103 | 98.0 | 1.05 | 210 | 488 |
| 2 | F | 20.53 | Z | 21.46 | 126 | 97.5 | 0.89 | 202 | 499 |
| 3 | G | 14.62 | W | 10.15 | 74 | 96.8 | 0.93 | 218 | 502 |
| 4 | G | 14.62 | X | 10.15 | 74 | 98.4 | 0.97 | 205 | 501 |
| 5 | G | 14.62 | Y | 13.96 | 86 | 97.2 | 1.05 | 211 | 508 |
| 6 | G | 14.62 | Z | 21.46 | 108 | 94.0 | 1.08 | 203 | 504 |

Dihalide: dicarboxylic dihalide
NMP: N-methyl-2-pyrrolidone
Triethylamine used: 12.14 g Preparation Examples 14 to 16

In a vessel equipped with an agitator and a nitrogen inlet tube were charged and dissolved in an atmosphere of nitrogen, a diamine and N,N-dimethylacetamide in the amounts shown in Table 3, and then 1.53 g of benzoyl chloride was added to the mixture, which was then cooled to 0° C. Then, with more vigorous stirring, a dicarboxylic dihalide was charged in the amount shown in Table 4, and the mixture was stirred at room temperature for additional 3 hours. The resulting viscous polymer solution was poured into 1 liter of methanol to give a white powder. The powder was filtered, washed with 1 liter of methanol, and dried under a reduced pressure at 180° C. for 12 hours to give a polyamide powder. Tables 4 show the logarithmic viscosity, glass-transition temperature and 5% weight-loss temperature for each polyamide powder.

Comparative Preparation Examples 7 and 8

Polyamide powders were prepared as described in Preparation Examples 14 to 16, using a diamine, N,N-dimethylacetamide and a dicarboxylic dihalide in the amounts shown in Table 3, as well as 1.53 g of benzoyl chloride. The physical properties for these polyamide powders are also shown in Table 3.

TABLE 3

| Prep. Example No. | Diamine Compound | Amt. (g) | Dihalide Compound | Amt. (g) | DMAA (g) | Polymer $\eta_{inh}$ (dl/g) | $T_g$ (° C.) | $Td_5$ (° C.) |
|---|---|---|---|---|---|---|---|---|
| Prep. Ex. | | | | | | | | |
| 14 | A | 36.04 | W | 19.49 | 167 | 0.43 | 200 | 494 |
| 15 | A | 36.04 | X | 19.49 | 167 | 0.43 | 200 | 494 |
| 16 | A | 36.04 | Z | 41.20 | 232 | 0.44 | 194 | 503 |

TABLE 3-continued

| Prep. Example No. | Diamine Compound | Amt. (g) | Dihalide Compound | Amt. (g) | DMAA (g) | $\eta_{inh}$ (dL/g) | $T_g$ (° C.) | $Td_5$ (° C.) |
|---|---|---|---|---|---|---|---|---|
| Comp. Prep. Ex. | | | | | | | | |
| 7 | G | 29.23 | W | 19.49 | 146 | 0.47 | 215 | 501 |
| 8 | G | 29.23 | X | 19.49 | 146 | 0.45 | 210 | 498 |

Dihalide: dicarboxylic dihalide
DMAA: N,N-dimethylacetamide

Preparation Example 17

In a vessel equipped with an agitator and a nitrogen inlet tube were charged and dissolved in an atmosphere of nitrogen, 24.82 g of 1,3-bis(3-amino-5-trifluoromethylphenoxy)-4-trifluoromethylbenzene (0.05 mol) and 105 g of N-methyl-2-pyrrolidone, and then 12.14 g of triethylamine (0.12 mol) was added to the mixture, which was then cooled to 5° C. Then, with more vigorous stirring, 10.15 g of isophthalic dichloride (0.05 mol) was charged, and the mixture was stirred at room temperature for additional 3 days. The resulting viscous polymer solution was poured into 1 liter of a mixture of methanol (500 mL) and water (500 mL) to give a white powder. The powder was filtered, washed with 1 liter of methanol, and dried under a reduced pressure at 160° C. for 12 hours to give a polyamide powder (yield: 98.2%). Its logarithmic viscosity, glass-transition temperature and 5% weight-loss temperature were 0.77 dL/g, 179° C. and 472° C., respectively. Furthermore, the polyamide powder obtained was dissolved in N-methyl-2-pyrrolidone in a concentration of 20 wt %, was cast on a glass plate, and was heated at 100° C. for 30 min, at 200° for 30 min and at 250° C. for 1 hour, to give a polyamide film.

Preparation Examples 18 to 25

Polyamide powders were prepared as described in Preparation Example 17. Table 4 shows the diamine, dicarboxylic dihalide, yield after polymerization, logarithmic viscosity, glass-transition temperature and 5% weight-loss temperature for each polyamide powder. Furthermore, polyamide films were prepared as described in Preparation Example 17.

Preparation Example 26

In a vessel equipped with an agitator and a nitrogen inlet tube were charged and dissolved in an atmosphere of nitrogen, 24.82 g of 1,3-bis(3-amino-5-trifluoromethylphenoxy)-4-trifluoromethylbenzene (0.05 mol) and 110 g of N-methyl-2-pyrrolidone, and then 12.14 g of triethylamine (0.12 mol) was added to the mixture, which was then cooled to 5° C. Then, with more vigorous stirring, 5.08 g of isophthalic dichloride (0.025 mol) and 6.78 g of 4-trifluoromethylisophthalic dichloride (0.025 mol) were charged, and the mixture was stirred at room temperature for additional 3 days. The reaction was worked up as described in Preparation Example 17, to give a polyamide powder, from which a polyamide film was formed as described in Preparation Example 17. The yield and several physical properties for the polyamide powder are shown as in Preparation Examples 17 to 25.

Preparation Examples 27

A polyamide powder was prepared as described in Preparation Example 26. Table 4 shows the diamine, dicarboxylic dihalide, yield after polymerization, logarithmic viscosity, glass-transition temperature and 5% weight-loss temperature for the polyamide powder. Furthermore, a polyamide film was prepared as described in Preparation Example 17.

Preparation Example 28

In a vessel equipped with an agitator and a nitrogen inlet tube were charged and dissolved in an atmosphere of nitrogen, 12.41 g of 1,3-bis(3-amino-5-trifluoromethylphenoxy)-4-trifluoromethylbenzene (0.025 mol), 9.9 g of 1,3-bis(3-amino-5-fluorophenoxy)-4-trifluoromethylbenzene (0.025 mol) and 105 g of N-methyl-2-pyrrolidone, and then 12.14 g of triethylamine (0.12 mol) was added to the mixture, which was then cooled to 5° C. Then, with more vigorous stirring and cooling, 10.15 g of isophthalic dichloride was charged, and the mixture was stirred at room temperature for additional 3 days. The reaction was worked up as described in Preparation Example 17, to give a polyamide powder, from which a polyamide film was formed as described in Preparation Example 17. The yield and several physical properties for the polyamide powder are shown as in Preparation Examples 17 to 27.

Preparation Examples 29

A polyamide powder was prepared as described in Preparation Example 28. Table 4 shows the diamine, dicarboxylic dihalide, yield after polymerization, logarithmic viscosity, glass-transition temperature and 5% weight-loss temperature for the polyamide powder. Furthermore, a polyamide film was prepared as described in Preparation Example 17.

Preparation Example 30

In a vessel equipped with an agitator and a nitrogen inlet tube were charged and dissolved in an atmosphere of nitrogen, 9.83 g of 1,3-bis(3-amino-5-fluorophenoxy)-4-trifluoromethylbenzene (0.025 mol), 9.83 g of 1,3-bis(3-amino-4-fluorophenoxy)-4-trifluoromethylbenzene (0.025 mol) and 127 g of N-methyl-2-pyrrolidone, and then 12.14 g of triethylamine (0.12 mol) was added to the mixture, which was then cooled to 5° C. Then, with cooling, 6.98 g of 4,4'-biphenylcarboxylic dichloride (0.025 mol) and 10.73 g of 2,2-bis(4-chloroformylphenyl)-1,1,1,3,3,3-hexafluoropropane (0.025 mol) were charged, and the mixture was stirred at room temperature for additional 3 days. The reaction was worked up as described in Preparation Example 17, to give a polyamide powder, from which a polyamide film was formed as described in Preparation Example 17. The yield and several physical properties for the polyamide powder are shown as in Preparation Examples 17 to 29.

Preparation Examples 31 to 32

A polyamide powder was prepared as described in Preparation Example 28. Table 4 shows diamine, dicarboxylic dihalide, yield after polymerization, logarithmic viscosity, glass-transition temperature and 5% weight-loss temperature for the polyamide powder. Furthermore, a polyamide film was prepared as described in Preparation Example 17.

TABLE 4

| Prep Ex. No. | Diamine Compound | Amt. (g) | Dihalide Compound | Amt. (g) | NMP (g) | Polymer's Properties |  |  |  |
|---|---|---|---|---|---|---|---|---|---|
|  |  |  |  |  |  | Yield (g) | $\eta_{inh}$ (dl/g) | $T_g$ (° C.) | $Td_5$ (° C.) |
| 17 | H | 24.82 | X | 10.15 | 105 | 98.2 | 0.77 | 182 | 472 |
| 18 | H | 24.82 | W | 10.15 | 105 | 98.5 | 0.85 | 192 | 480 |
| 19 | H | 24.82 | U | 13.55 | 115 | 97.9 | 0.74 | 180 | 478 |
| 20 | I | 19.66 | Z | 21.46 | 123 | 96.5 | 0.76 | 186 | 475 |
| 21 | I | 19.66 | X | 10.15 | 89 | 97.2 | 0.86 | 181 | 480 |
| 22 | J | 19.66 | Y | 14.46 | 102 | 96.5 | 0.76 | 192 | 478 |
| 23 | J | 19.66 | W | 10.15 | 89 | 97.5 | 0.66 | 190 | 485 |
| 24 | K | 19.66 | Y | 14.46 | 102 | 97.9 | 0.68 | 190 | 480 |
| 25 | L | 32.91 | U | 13.55 | 139 | 96.3 | 0.60 | 180 | 470 |
| 26 | H | 24.82 | X | 5.08 | 110 | 97.6 | 0.74 | 181 | 475 |
|  |  |  | U | 6.78 |  |  |  |  |  |
| 27 | J | 19.66 | W | 5.08 | 96 | 98.0 | 0.69 | 191 | 483 |
|  |  |  | Y | 7.23 |  |  |  |  |  |
| 28 | H | 12.41 | X | 10.15 | 105 | 98.2 | 0.78 | 182 | 481 |
|  | I | 9.83 |  |  |  |  |  |  |  |
| 29 | K | 9.83 | U | 13.55 | 120 | 97.3 | 0.70 | 188 | 485 |
|  | L | 16.46 |  |  |  |  |  |  |  |
| 30 | I | 9.83 | Y | 7.23 | 113 | 97.8 | 0.74 | 187 | 476 |
|  | J | 9.83 | Z | 10.73 |  |  |  |  |  |
| 31 | H | 7.44 | X | 10.15 | 91 | 98.1 | 0.81 | 188 | 490 |
|  | A | 12.61 |  |  |  |  |  |  |  |
| 32 | H | 2.48 | X | 10.15 | 87 | 98.3 | 0.79 | 190 | 492 |
|  | A | 16.22 |  |  |  |  |  |  |  |

Dihalide: dicarboxylic dihalide
NMP: N-methyl-2-pyrrolidone

Comparative Preparation Example 9

A polyamide powder was prepared as described in Preparation Example 17, using a diamine and a dicarboxylic dihalide in the amounts shown in Table 5. The physical properties for the polyamide powder are also shown in Table 5. Furthermore, a polyamide film was prepared as described in Preparation Examples 17 to 30.

Comparative Preparation Example 10

A polyamide powder was prepared as described in Preparation Example 26, using a diamine and a dicarboxylic dihalide in the amounts shown in Table 5. The physical properties for the polyamide powder are also shown in Table 5. Furthermore, a polyamide film was prepared as described in Preparation Examples 17 to 30.

Comparative Preparation Example 11

A polyamide powder was prepared as described in Preparation Example 30, using a diamine and a dicarboxylic dihalide in the amounts shown in Table 5. The physical properties for the polyamide powder are also shown in Table 7. Furthermore, a polyamide film was prepared as described in Preparation Examples 17 to 30.

TABLE 5

| Comp. Prep. Ex. No. | Diamine Compound | Amt. (g) | Dihalide Compound | Amt. (g) | NMP (g) | Polymer's Properties |  |  |  |
|---|---|---|---|---|---|---|---|---|---|
|  |  |  |  |  |  | Yield (g) | $\eta_{inh}$ (dl/g) | $T_g$ (° C.) | $Td_5$ (° C.) |
| 9 | M | 20.53 | X | 10.15 | 92 | 98.2 | 0.99 | 222 | 488 |
| 10 | G | 14.62 | W | 5.08 | 74 | 97.8 | 1.06 | 203 | 502 |
|  |  |  | X | 5.08 |  |  |  |  |  |
| 11 | M | 10.27 | Y | 7.23 | 90 | 98.5 | 1.11 | 210 | 495 |
|  | G | 7.31 | W | 5.08 |  |  |  |  |  |

Dihalide: dicarboxylic dihalide
NMP: N-methyl-2-pyrrolidone

Preparation Example 33

In a vessel equipped with an agitator and a nitrogen inlet tube were charged and dissolved in an atmosphere of nitrogen, 99.26 g of 1,3-bis(3-amino-5-trifluoromethylphenoxy)-4-trifluoromethylbenzene (0.20 mol) and 546 g of N,N-dimethylacetamide, and then 30.20 g of propylene oxide (0.56 mol) was added to the mixture, which was then cooled to 5° C. Then, with more vigorous stirring and cooling, 82.82 g of 2,2-bis(4-chloroformylphenyl)-1,1,1,3,3,3-hexafluoropropane (0.193 mol) was charged, and the mixture was stirred at room temperature for additional 3 days. Then 1.97 g of benzoyl chloride was added, and the mixture was stirred at room temperature for additional 3 days. The resulting viscous polymer solution was poured into 4 liters of a mixture of methanol (2 liters) and water (2 liters) to give a white powder. The powder as filtered, washed with 4 liters of methanol, and dried under a reduced pressure at 160° C. for 12 hours to give a polyamide powder. Table 6 shows the yield after polymerization, logarithmic viscosity, glass-transition temperature and 5% weight-loss temperature for the polyamide powder.

Preparation Examples 34 to 36

Polyamide powders were prepared as described in Preparation Example 33, using a diamine and a dicarboxylic dihalide shown in Table 6. Table 6 shows the diamine, dicarboxylic dihalide, an yield after polymerization, logarithmic viscosity, glass-transition temperature and 5% weight-loss temperature for each polyamide powder.

Preparation Example 37

In a vessel equipped with an agitator and a nitrogen inlet tube were charged and dissolved in an atmosphere of nitrogen, 39.33 g of 1,3-bis(3-amino-4-fluorophenoxy)-4-trifluoromethylbenzene (0.10 mol), 39.33 g of 1,3-bis(3-amino-6-fluorophenoxy)-4-trifluoromethylbenzene (0.10 mol) and 484 g of N,N-dimethylacetamide, and then 30.20 g of propylene oxide (0.52 mol) was added to the mixture, which was then cooled to 0° C. Then, with more vigorous stirring and cooling, 82.82 g of isophthalic dichloride (0.193 mol) was charged, and the mixture was stirred at room temperature for additional 3 days. Then, 1.97 g of benzoyl chloride was added, and the mixture was stirred at room temperature for additional 3 days. The resulting viscous polymer solution was poured into 4 liters of a mixture of methanol (2 liters) and water (2 liters) to give a white powder. The powder was filtered, washed with 4 liters of methanol, and dried under a reduced pressure at 180° C. for 12 hours to give a polyamide powder. Table 6 shows the yield after polymerization, logarithmic viscosity, glass-transition temperature and 5% weight-loss temperature for the polyamide powder.

Preparation Example 38

In a vessel equipped with an agitator and a nitrogen inlet tube were charged and dissolved in an atmosphere of nitrogen, 131.65 g of 1,3-bis(3-amino-2,5,6-trifluoro-4-fluorophenoxy)-2.5.6-trifluoro-4-trifluoromethylbenzene (0.20 mol) and 535 g of N,N-dimethylacetamide, and then 30.20 g of propylene oxide (0.52 mol) was added to the mixture, which was then cooled to 0° C. Then, with more vigorous stirring and cooling, 19.59 g of terephthalic dichloride (0.0965 mol) and 26.93 g of 4,4'-biphenylcarboxylic dichloride (0.0965 mol) were charged, and the mixture was stirred at room temperature for additional 3 days. Then, 1.97 g of benzoyl chloride was added, and the mixture was stirred at room temperature for additional 3 days. The resulting viscous polymer solution was poured into 4 liters of a mixture of methanol (2 liters) and water (2 liters) to give a white powder. The powder was filtered, washed with 4 liters of methanol, and dried under a reduced pressure at 180° C. for 12 hours to give a polyamide powder. Table 6 shows the yield after polymerization, logarithmic viscosity, glass-transition temperature and 5% weight-loss temperature for the polyamide powder.

Preparation Example 39

In a vessel equipped with an agitator and a nitrogen inlet tube were charged and dissolved in an atmosphere of nitrogen, 49.63 g of 1,3-bis(3-amino-5-trifluoromethylphenoxy)-4-trifluoromethylbenzene (0.10 mol), 39.33 g of 1,3-bis(3-amino-5-fluorophenoxy)-4-trifluoromethylbenzene (0.10 mol), and 404 g of N,N-dimethylacetamide, and then 30.20 g of propylene oxide (0.52 mol) was added to the mixture, which was then cooled to 0° C. Then, with more vigorous stirring and cooling, 19.59 g of isophthalic dichloride (0.0965 mol) and 26.15 g of 4-trifluoromethylisophthalic dichloride (0.0965 mol) were charged, and the mixture was stirred at room temperature for additional 3 days. Then, 1.97 g of benzoyl chloride was added, and the mixture was stirred at room temperature for additional 3 days. The resulting viscous polymer solution was poured into 4 liters of a mixture of methanol (2 liters) and water (2 liters) to give a white powder. The powder was filtered, washed with 4 liters of methanol, and dried under a reduced pressure at 180° C. for 12 hours to give a polyamide powder. Table 6 shows the yield after polymerization, logarithmic viscosity, glass-transition temperature and 5% weight-loss temperature for the polyamide powder.

Preparation Examples 40 to 41

Polyamide powders were prepared as described in Preparation Example 37, using a diamine and a dicarboxylic dihalide shown in Table 6. Table 6 shows the diamine, dicarboxylic dihalide, an yield after polymerization, logarithmic viscosity, glass-transition temperature and 5% weight-loss temperature for each polyamide powder.

TABLE 6

| | Diamine | | Dihalide | | | Polymer's Properties | | | |
|---|---|---|---|---|---|---|---|---|---|
| Prep Ex. No. | Compound | Amt. (g) | Compound | Amt. (g) | DMAA (g) | Yield (g) | $\eta_{inh}$ (dl/g) | $T_g$ (° C.) | $Td_5$ (° C.) |
| 33 | H | 99.26 | Z | 82.82 | 546 | 98.2 | 0.41 | 188 | 469 |
| 34 | H | 99.26 | X | 39.18 | 415 | 98.8 | 0.43 | 181 | 471 |
| 35 | I | 78.66 | Y | 53.87 | 398 | 98.5 | 0.45 | 189 | 476 |
| 36 | L | 131.65 | Z | 82.82 | 643 | 97.5 | 0.40 | 191 | 466 |
| 37 | J | 39.33 | Z | 82.82 | 484 | 98.7 | 0.43 | 189 | 471 |
| | K | 39.33 | | | | | | | |
| 38 | L | 131.65 | W | 19.59 | 535 | 98.2 | 0.42 | 192 | 470 |
| | | | Y | 26.93 | | | | | |

TABLE 6-continued

| Prep Ex. No. | Diamine Compound | Amt. (g) | Dihalide Compound | Amt. (g) | DMAA (g) | Yield (g) | $\eta_{inh}$ (dl/g) | $T_g$ (° C.) | $Td_5$ (° C.) |
|---|---|---|---|---|---|---|---|---|---|
| 39 | H | 49.63 | X | 19.59 | 404 | 97.9 | 0.44 | 181 | 473 |
|    | I | 39.33 | U | 26.15 |     |      |      |     |     |
| 40 | H | 7.49  | X | 39.18 | 340 | 98.5 | 0.47 | 193 | 472 |
|    | A | 66.30 |   |       |     |      |      |     |     |
| 41 | H | 49.63 | X | 39.18 | 257 | 98.1 | 0.42 | 187 | 469 |
|    | A | 36.03 |   |       |     |      |      |     |     |

Dihalide: dicarboxylic dihalide
DMAA: N,N-dimethylacetamide
Benzoyl chloride used: 1.97 g Comparative Preparation Example 12

A polyamide powder was prepared as described in Preparation Example 31, using a diamine and a dicarboxylic dihalide in the amounts shown in Table 7. The physical properties for the polyamide powder are also shown in Table 7.

Comparative Preparation Example 13

A polyamide powder was prepared as described in Preparation Example 35, using a diamine and a dicarboxylic dihalide in the amounts shown in Table 7. The physical properties for the polyamide powder are also shown in Table 7.

Comparative Preparation Example 14

A polyamide powder was prepared as described in Preparation Example 37, using a diamine and a dicarboxylic dihalide in the amounts shown in Table 7. The physical properties for the polyamide powder are also shown in Table 7.

Evaluation Procedure for a Film

Each of the films prepared in Preparation Examples 1 to 37 and Comparative Preparation Examples 1 to 14 was evaluated by the procedure below.
  (1) Appearance: surface status of a film was visually observed and evaluated.
    ○: colorless and transparent, and good surface status without splits, cracks or rough surface
    X: having splits, cracks or rough surface
  (2) Total light transmittance (referred to as "transmittance"): determined according to ASTMD-1003 method
  (3) Birefringence: determined with an ellipsometer
  (4) Heat resistance: evaluated based on visual observation for a molding after placing it in a hot-air drier at 150° C. for 4 hours.
    ○: no staining, surface distortion or cracks of the molding
    X: having staining, surface distortion or cracks of the molding
    Δ: having intermediate conditions between these ○ and X.

(Films)

Examples 1 to 13

Each of the films prepared in Preparation Examples 1 to 13 was evaluated for its appearance, total light transmittance, birefringence and heat resistance as described above. The results are shown in Table 8.

Comparative Examples 1 to 6

Films prepared in Comparative Preparation Examples 1 to 6 were evaluated as described in Examples 1 to 13. The results are shown in Table 9.

TABLE 7

| Comp. Prep. Ex. No. | Diamine Compound | Amt. (g) | Dihalide Compound | Amt. (g) | DMAA (g) | Yield (g) | $\eta_{inh}$ (dl/g) | $T_g$ (° C.) | $Td_5$ (° C.) |
|---|---|---|---|---|---|---|---|---|---|
| 12 | M | 82.10 | X | 39.18 | 364 | 98.0 | 0.45 | 215 | 487 |
| 13 | M | 41.05 | W | 39.18 | 328 | 98.2 | 0.43 | 205 | 499 |
|    | G | 29.23 |   |       |     |      |      |     |     |
| 14 | M | 41.05 | W | 19.09 | 328 | 97.9 | 0.41 | 201 | 498 |
|    | G | 29.23 | X | 19.09 |     |      |      |     |     |

Dihalide: dicarboxylic dihalide
DMAA: N,N-dimethylacetamide
Benzoyl chloride used: 1.97 g

TABLE 8

| Ex. | Prep. Ex. | Appearance | Total light transmittance(%) | Birefringence(nm) | Heat resistance |
|---|---|---|---|---|---|
| 1 | 1 | ○ | 84 | 8  | ○ |
| 2 | 2 | ○ | 84 | 10 | ○ |
| 3 | 3 | ○ | 82 | 9  | ○ |
| 4 | 4 | ○ | 85 | 6  | ○ |
| 5 | 5 | ○ | 87 | 11 | ○ |
| 6 | 6 | ○ | 83 | 8  | ○ |
| 7 | 7 | ○ | 87 | 9  | ○ |
| 8 | 8 | ○ | 85 | 7  | ○ |

TABLE 8-continued

| Ex. | Prep. Ex. | Appearance | Total light transmittance(%) | Birefringence(nm) | Heat resistance |
|---|---|---|---|---|---|
| 9 | 9 | ◯ | 85 | 8 | ◯ |
| 10 | 10 | ◯ | 86 | 8 | Δ |
| 11 | 11 | ◯ | 81 | 9 | Δ |
| 12 | 12 | ◯ | 87 | 9 | Δ |
| 13 | 13 | ◯ | 84 | 8 | Δ |

TABLE 9

| Comp. Ex. | Comp. Prep. Ex. | Appearance | Total light transmittance(%) | Birefringence(nm) | Heat resistance |
|---|---|---|---|---|---|
| 1 | 1 | ◯ | 85 | 58 | ◯ |
| 2 | 2 | ◯ | 86 | 42 | ◯ |
| 3 | 3 | ◯ | 86 | 56 | ◯ |
| 4 | 4 | ◯ | 86 | 60 | ◯ |
| 5 | 5 | ◯ | 84 | 58 | ◯ |
| 6 | 6 | ◯ | 87 | 44 | ◯ |

As shown in Tables 8 to 9, an organic optical component from the polyamide resin of this invention essentially comprising a repetitive structural unit represented by general formula (1) has excellent transparency, heat resistance and mechanical strength, and has a lower birefringence than a conventional polyamide component.

Examples 14 to 29

Each of the films prepared in Preparation Examples 17 to 32 was evaluated for its appearance, total light transmittance, birefringence and heat resistance as described above. The results are shown in Table 10.

Comparative Examples 7 to 9

Films prepared in Comparative Preparation Examples 9 to 11 were evaluated as described in Examples 14 to 29. The results are shown in Table 11.

TABLE 10

| Ex. | Prep. Ex. | Appearance | Total light transmittance(%) | Birefringence(nm) | Heat resistance |
|---|---|---|---|---|---|
| 14 | 17 | ◯ | 90 | 7 | ◯ |
| 15 | 18 | ◯ | 88 | 8 | ◯ |
| 16 | 19 | ◯ | 87 | 6 | ◯ |
| 17 | 20 | ◯ | 89 | 7 | ◯ |
| 18 | 21 | ◯ | 86 | 8 | ◯ |
| 19 | 22 | ◯ | 88 | 8 | ◯ |
| 20 | 23 | ◯ | 87 | 8 | ◯ |
| 21 | 24 | ◯ | 86 | 7 | ◯ |
| 22 | 25 | ◯ | 92 | 6 | ◯ |
| 23 | 26 | ◯ | 89 | 6 | ◯ |
| 24 | 27 | ◯ | 87 | 7 | ◯ |
| 25 | 28 | ◯ | 87 | 7 | ◯ |
| 26 | 29 | ◯ | 90 | 8 | ◯ |
| 27 | 30 | ◯ | 88 | 6 | ◯ |
| 28 | 31 | ◯ | 88 | 7 | ◯ |
| 29 | 32 | ◯ | 86 | 7 | ◯ |

TABLE 11

| Comp. Ex. | Comp. Prep. Ex. | Appearance | Total light transmittance(%) | Birefringence(nm) | Heat resistance |
|---|---|---|---|---|---|
| 7 | 9 | ◯ | 82 | 57 | ◯ |
| 8 | 10 | ◯ | 83 | 56 | ◯ |
| 9 | 11 | ◯ | 84 | 58 | ◯ |

As shown in Tables 10 to 11, an organic optical component from the polyamide resin of this invention essentially comprising one or more repetitive structural units selected from those represented by general formula (1) has excellent transparency, heat resistance and mechanical strength, and has a lower birefringence than a conventional polyamide component.

Preparation and Evaluation of an Optical Disk

Examples 30 to 32

Each of the polyamide powders prepared in Examples 14 to 16 was formed into a strand with a melting extruder (melting temperature: 350° C.). After cooling, the strand was formed into pellets. Each pellet was dried at 150° C. for 4 hours, and then was subject to injection molding at 350° C. Specifically, a stamper with mirror surface was mounted on a mold and the material was formed into a disk-shape molding (substrate) with an outer diameter of 130 mm and a thickness of 1.2 mm.

The disk was punched to provide a doughnut disk with an inner diameter of 15 mm, and then aluminum was vacuum-deposited on one side of the disk to form a reflective layer with a thickness of 600 Å.

For the optical disk, a birefringence and a BER (bit error rate) were determined. The BER was determined based on an incidence of record-reading error, using a laser beam with a wavelength of 780 nm, a linear velocity of 2 m/sec and a power of 0.8 mW. The results are shown in Table 12.

Comparative Examples 10 and 11

Optical disks from the polyamide powders of Comparative Preparation Examples 7 and 8 were prepared and evaluated as described in Examples 28 to 30. The results are also shown in Table 12.

TABLE 12

| | Prep. Ex./ Comp. Prep. Ex. | Birefringence (And single pulse) (nm) | BER (bit error rate) |
|---|---|---|---|
| Ex. 30 | Prep. Ex. 14 | 7 | $8 \times 10^{-6}$ |
| Ex. 31 | Prep. Ex. 15 | 6 | $7 \times 10^{-6}$ |
| Ex. 32 | Prep. Ex. 16 | 7 | $8 \times 10^{-6}$ |
| Comp. Ex. 10 | Comp. Prep. Ex. 7 | 25 | $5 \times 10^{-4}$ |
| Comp. Ex. 11 | Comp. Prep. Ex. 8 | 26 | $7 \times 10^{-4}$ |

As shown in Table 12, an optical disk prepared from the polyamide of this invention is improved in a BER, compared with one from any of the polyamides of the comparative examples, because of reduction in a birefringence.

Examples 33 to 41

Each of the polyamide powders prepared in Examples 33 to 41 was formed into a strand with a melting extruder (melting temperature: 350° C.). After cooling, the strand was formed into pellets. Each pellet was dried at 150° C. for 4 hours, and then was subject to injection molding at 350° C. Specifically, a stamper with mirror surface was mounted on a mold and the material was formed into a disk-shape molding (substrate) with an outer diameter of 130 mm and a thickness of 1.2 mm.

The disk was punched to provide a doughnut disk with an inner diameter of 15 mm, and then aluminum was vacuum-deposited on one side of the disk to form a reflective layer with a thickness of 600 Å.

For the optical disk, a birefringence and a BER (bit error rate) were determined. The BER was determined based on an incidence of record-reading error, using a laser beam with a wavelength of 780 nm, a linear velocity of 2 m/sec and a power of 0.8 mW. The results are shown in Table 13.

Comparative Examples 12 to 14

Optical disks from the polyamide powders of Comparative Preparation Examples 12 to 14 were prepared and evaluated as described in Examples 33 to 41. The results are also shown in Table 13.

TABLE 13

| Ex./ Comp. Ex. | Prep. Ex./ Comp. Prep. Ex. | Birefringence (And single pulse) (nm) | BER (bit error rate) |
| --- | --- | --- | --- |
| Ex. 33 | Prep. Ex. 33 | 5 | $6 \times 10^{-6}$ |
| Ex. 34 | Prep. Ex. 34 | 6 | $7 \times 10^{-6}$ |
| Ex. 35 | Prep. Ex. 35 | 7 | $8 \times 10^{-6}$ |
| Ex. 36 | Prep. Ex. 36 | 4 | $6 \times 10^{-6}$ |
| Ex. 37 | Prep. Ex. 37 | 5 | $6 \times 10^{-6}$ |
| Ex. 38 | Prep. Ex. 38 | 6 | $7 \times 10^{-6}$ |
| Ex. 39 | Prep. Ex. 39 | 5 | $5 \times 10^{-6}$ |
| Ex. 40 | Prep. Ex. 40 | 6 | $6 \times 10^{-6}$ |
| Ex. 41 | Prep. Ex. 41 | 5 | $5 \times 10^{-6}$ |
| Comp. Ex. 12 | Comp. Prep. Ex. 12 | 24 | $6 \times 10^{-4}$ |
| Comp. Ex. 13 | Comp. Prep. Ex. 13 | 25 | $7 \times 10^{-4}$ |
| Comp. Ex. 14 | Comp. Prep. Ex. 14 | 23 | $7 \times 10^{-4}$ |

As shown in Table 13, an optical disk prepared from the polyamide of this invention is improved in a BER, compared with one from any of the polyamides of the comparative examples, because of reduction in a birefringence.

Preparation and Evaluation of a Magneto-optical Disk

Examples 42 to 44

Each of the polyamide powders prepared in Examples 14 to 16 was formed into a strand with a melting extruder (melting temperature: 350° C.). After cooling, the strand was formed into pellets. Each pellet was dried at 150° C. for 4 hours, and then was subject to injection molding at 350° C. Specifically, a stamper with mirror surface was mounted on a mold and the material was formed into a disk-shape molding (substrate) with an outer diameter of 130 mm and a thickness of 1.2 mm.

On the substrate was deposited a magneto-optical recording layer with a thickness of 1000 Å in a sputtering instrument (RF sputtering instrument; Nippon Shinku), using an alloy target of Tb 23.5, Fe 64.2 and Co 12.3 (atomic %). On the recording layer was deposited an inorganic-glass protective film with a thickness of 1000 Å using a sputtering instrument as described above. For the magneto-optical disk, a birefringence, a CN ratio, a BER (bit error rate) and a CN change rate were determined.

The CN ratio was determined under the conditions; a writing power: 7 mW, a reading power: 1 mW, a carrier frequency: 1 MHz, and a resolution band width: 30 KHz.

The CN change rate was determined as a percentage (%) of reduction in the CN ratio compared with the initial CN ratio after 30 days under the conditions; temperature: 60° C. and RH: 90%.

The results are shown in Table 14.

Comparative Examples 15 and 16

Magneto-optical disks from the polyamide powders of Comparative Preparation Examples 7 and 8 were prepared and evaluated as described in Examples 38 to 41. The results are also shown in Table 14.

TABLE 14

| Ex./ Comp. Ex. | Prep. Ex./ Comp. Prep. Ex. | Birefringence (And single pulse) (nm) | CN (dB) | BER (bit error rate) | CN retention (%) |
| --- | --- | --- | --- | --- | --- |
| Ex. 42 | Prep. Ex. 14 | 7 | 57 | $8 \times 10^{-6}$ | 95 |
| Ex. 43 | Prep. Ex. 15 | 7 | 55 | $6 \times 10^{-6}$ | 94 |
| Ex. 44 | Prep. Ex. 16 | 6 | 58 | $9 \times 10^{-6}$ | 92 |
| Comp. Ex. 15 | Comp. Prep. Ex. 7 | 25 | 44 | $3 \times 10^{-4}$ | 83 |
| Comp. Ex. 16 | Comp. Prep. Ex. 8 | 27 | 45 | $4 \times 10^{-4}$ | 82 |

As shown in Table 14, a magneto-optical disk prepared from the polyamide of this invention is improved for a CN ratio, a BER and CN retention, compared with one from any of the polyamides of the comparative examples, because of reduction in a birefringence.

Examples 45 to 53

Each of the polyamide powders prepared in Examples 33 to 41 was formed into a strand with a melting extruder (melting temperature: 350° C.). After cooling, the strand was formed into pellets. Each pellet was dried at 150° C. for 4 hours, and then was subject to injection molding at 350° C. Specifically, a stamper with mirror surface was mounted on a mold and the material was formed into a disk-shape molding with an outer diameter of 130 mm and a thickness of 1.2 mm.

On the substrate was deposited a magneto-optical recording layer with a thickness of 1000 Å in a sputtering instrument (RF sputtering instrument; Nippon Shinku), using an alloy target of Tb 23.5, Fe 64.2 and Co 12.3 (atomic %). On the recording layer was deposited an inorganic-glass protective film with a thickness of 1000 Å, using a sputtering instrument as described above. For the magneto-optical disk, a birefringence, a CN ratio, a BER (bit error rate) and a CN change rate were determined.

The CN ratio was determined under the conditions; a writing power: 7 mW, a reading power: 1 mW, a carrier frequency: 1 MHz, and a resolution band width: 30 KHz.

The CN change rate was determined as a percentage (%) of reduction in the CN ratio compared with the initial CN ratio after 30 days under the conditions; temperature: 60° C. and RH: 90%. The results are shown in Table 15.

Comparative Examples 17 to 19

Magneto-optical disks from the polyamide powders of Comparative Preparation Examples 12 to 14 were prepared and evaluated as described in Examples 41 to 47. The results are also shown in Table 15.

TABLE 15

| Ex./ Comp. Ex. | Prep. Ex./ Comp. Prep. Ex. | Birefringence (And single pulse) (nm) | CN (dB) | BER (bit error rate) | CN retention (%) |
|---|---|---|---|---|---|
| Ex. 45 | Prep. Ex. 33 | 6 | 59 | $7 \times 10^{-6}$ | 97 |
| Ex. 46 | Prep. Ex. 34 | 7 | 58 | $8 \times 10^{-6}$ | 97 |
| Ex. 47 | Prep. Ex. 35 | 8 | 58 | $9 \times 10^{-6}$ | 96 |
| Ex. 48 | Prep. Ex. 36 | 5 | 60 | $5 \times 10^{-6}$ | 98 |
| Ex. 49 | Prep. Ex. 37 | 7 | 59 | $7 \times 10^{-6}$ | 97 |
| Ex. 50 | Prep. Ex. 38 | 7 | 59 | $7 \times 10^{-6}$ | 96 |
| Ex. 51 | Prep. Ex. 39 | 6 | 58 | $6 \times 10^{-6}$ | 97 |
| Ex. 52 | Prep. Ex. 40 | 7 | 58 | $7 \times 10^{-6}$ | 97 |
| Ex. 53 | Prep. Ex. 41 | 6 | 59 | $6 \times 10^{-6}$ | 98 |
| Comp. Ex. 17 | Comp. Prep. Ex. 12 | 26 | 45 | $6 \times 10^{-4}$ | 84 |
| Comp. Ex. 18 | Comp. Prep. Ex. 13 | 29 | 44 | $6 \times 10^{-4}$ | 82 |
| Comp. Ex. 19 | Comp. Prep. Ex. 14 | 25 | 46 | $6 \times 10^{-4}$ | 85 |

As shown in Table 15, a magneto-optical disk prepared from the polyamide of this invention is improved for a CN ratio, a BER and CN retention, compared with one from any of the polyamides of the comparative examples, because of reduction in a birefringence.

(Polyimides)

Preparation processes for the polyimides used in Examples and Comparative Examples will be described, but this invention is not limited to these.

In the following preparation examples and comparative preparation examples, diamines and tetracarboxylic dianhydrides were as follows. In these preparation examples and comparative examples, "acid anhydride" means a tetracarboxylic dianhydride; "$\eta_{inh}$" means a logarithmic viscosity determined in a concentration of 0.5 dL/g in a mixture of p-chlorophenol/phenol=9/1 at 35° C.; "Tg" means a glass-transition temperature determined by DSC at a warming rate of 16° C./min; and "$Td_5$" means a 5% weight-loss temperature in the air determined by DTA-TG at a warming rate of 10° C./min.

Diamines (represented by the following symbols of A) to G) in the tables)

A): 1,3-bis(3-aminophenoxy)-4-trifluoromethylbenzene;

B): 1,3-bis(3-amino-4-isopropylphenoxy)-4-trifluoromethylbenzene;

C): 1,3-bis(3-amino-5-methoxyphenoxy)-4-trifluoromethylbenzene;

D): 1,3-bis(3-amino-4-benzylphenoxy)-4-trifluoromethylbenzene;

E): 1,3-bis[3-aminno-4-(2,3,4,5,6-pentafluorophenyl) phenoxy]-4-trifluoromethylbenzene;

F): 2,2-bis[4-(3-aminophenoxy)phenyl]propane;

G): 1,3-bis(3-aminophenoxy)benzene

Tetracarboxylic dianhydrides (acid anhydride): (represented by the following symbols of TT) to ZZ) in the tables)

TT): pyromellitic dianhydride;

UU): 3,3',4,4'-benzophenonetetracarboxylic dianhydride;

VV): 3,3',4,4'-biphenyltetracarboxylic dianhydride;

WW): 2,2-bis(3,4-dicarboxyphenyl)-1,1,1,3,3,3-hexafluoropropane dianhydride;

XX): 3,3',4,4'-diphenyl ether tetracarboxylic dianhydride;

YY): 3,3',4,4'-diphenyl sulfone tetracarboxylic dianhydride;

ZZ): 1,4-bis(3,4-dicarboxyphenoxy)benzene dianhydride.

Preparation Examples 42 to 56

In a vessel equipped with an agitator and a nitrogen inlet tube were charged and dissolved in an atmosphere of nitrogen, a diamine, a tetracarboxylic dianhydride (acid anhydride) and m-cresol in the amounts shown in Table 16 and also 0.70 g of phthalic anhydride, and then the mixture was heated to 200° C. The mixture was reacted at 200° C. for 4 hours. At the end of the reaction, the reaction mixture was poured into about 1 liter of methanol, to give a polyimide powder. The polyimide powder was washed with about 1 liter of methanol, dried at 50° C. for 12 hours and then at 180° C. for about 6 hours, under a reduced pressure and gentle nitrogen stream. Table 16 shows the yield, logarithmic viscosity, glass-transition temperature and 5% weight-loss temperature for each of the polyimides obtained.

TABLE 16

| | Diamine | | Dianhydride | | | Polymer | | | |
|---|---|---|---|---|---|---|---|---|---|
| Prep Ex. | Compound | Amount (g) | Compound | Amount (g) | CRS (g) | Yield (%) | $\eta_{inh}$ (dl/g) | Tg (° C.) | $Td_5$ (° C.) |
| 42 | A | 18.02 | TT | 10.36 | 144 | 95.4 | 0.43 | 229 | 538 |
| 43 | A | 18.02 | UU | 15.31 | 133 | 94.9 | 0.55 | 206 | 542 |
| 44 | A | 18.02 | VV | 113.98 | 128 | 96.3 | 0.75 | 209 | 553 |
| 45 | A | 18.02 | WW | 21.10 | 156 | 95.3 | 0.46 | 206 | 524 |
| 46 | A | 18.02 | XX | 14.74 | 131 | 95.9 | 0.46 | 196 | 547 |
| 47 | A | 18.02 | YY | 17.02 | 140 | 95.0 | 0.47 | 209 | 538 |
| 48 | A | 18.02 | WW | 10.66 | 145 | 96.1 | 0.48 | 202 | 537 |
| | | | XX | 7.45 | | | | | |
| 49 | B | 22.23 | TT | 10.36 | 130 | 95.8 | 0.44 | 220 | 540 |
| 50 | B | 22.23 | UU | 15.31 | 150 | 94.1 | 0.48 | 199 | 544 |
| 51 | C | 21.02 | TT | 10.36 | 126 | 95.2 | 0.40 | 222 | 538 |
| 52 | C | 21.02 | VV | 13.98 | 140 | 92.8 | 0.42 | 208 | 539 |
| 53 | D | 27.03 | YY | 17.02 | 176 | 95.5 | 0.44 | 200 | 533 |
| 54 | D | 27.03 | ZZ | 19.11 | 185 | 90.9 | 0.44 | 188 | 532 |
| 55 | E | 34.63 | XX | 14.74 | 197 | 95.0 | 0.41 | 190 | 542 |
| 56 | E | 34.63 | YY | 17.02 | 207 | 94.0 | 0.46 | 204 | 544 |

CRS: m-cresol

Comparative Preparation Examples 15 to 23

Polyimide powders were prepared as described in Preparation Examples 38 to 52, using a diamine, a tetracarboxylic dianhydride (acid anhydride), phthalic anhydride and m-cresol in the amounts shown in Table 17. Table 17 shows their physical properties.

TABLE 17

| Com Prep Ex. | Diamine | | Dianhydride | | CRS (g) | Polymer | | | |
|---|---|---|---|---|---|---|---|---|---|
| | Compound | Amount (g) | Compound | Amount (g) | | Yield (%) | $\eta_{inh}$ (dl/g) | Tg (° C.) | $Td_5$ (° C.) |
| 15 | F | 20.53 | TT | 10.36 | 124 | 95.1 | 0.47 | 236 | 521 |
| 16 | F | 20.53 | UU | 15.31 | 143 | 95.5 | 0.42 | 218 | 518 |
| 17 | G | 14.62 | TT | 10.36 | 100 | 95.2 | 0.44 | 226 | 550 |
| 18 | G | 14.62 | UU | 15.31 | 120 | 95.5 | 0.47 | 206 | 529 |
| 19 | G | 14.62 | VV | 13.98 | 114 | 96.9 | 0.49 | 207 | 549 |
| 20 | G | 14.62 | WW | 21.10 | 143 | 95.0 | 0.44 | 201 | 538 |
| 21 | G | 14.62 | XX | 14.74 | 117 | 94.5 | 0.44 | 194 | 539 |
| 22 | G | 14.62 | YY | 17.02 | 127 | 95.8 | 0.44 | 210 | 548 |
| 23 | G | 14.62 | ZZ | 19.11 | 135 | 95.3 | 0.48 | 190 | 552 |

CRS: m-cresol
Phthalic anhydride used: 0.70 g

Preparation Examples 57 to 71

Into a vessel equipped with an agitator and a nitrogen inlet tube were charged and dissolved a diamine and N,N-dimethylacetamide in the amounts shown in Table 18, and a tetracarboxylic dianhydride (acid anhydride) in the amount shown in Table 18 was added, avoiding temperature rise. The mixture was stirred at room temperature for about 30 hours in an atmosphere of nitrogen, to give a polyamic acid varnish. The polyamic acid varnish was cast on a glass plate, and it was deliquored into an imide by heating at 100° C. for 30 min, at 200° C. for 30 min and at 250° C. for 1 hour, to give a polyimide film. A logarithmic viscosity, glass-transition temperature and 5% weight-loss temperature for each of the films are shown in Table 18.

TABLE 18

| Prep Ex. No. | Diamine | | Dianhydride | | DMAA (g) | Polymer | | |
|---|---|---|---|---|---|---|---|---|
| | Compound | Amount (g) | Compound | Amount (g) | | $\eta_{inh}$ (dl/g) | Tg (° C.) | $Td_5$ (° C.) |
| 57 | A | 18.02 | TT | 10.91 | 116 | 0.84 | 232 | 528 |
| 58 | A | 18.02 | UU | 16.12 | 136 | 0.76 | 215 | 535 |
| 59 | A | 18.02 | VV | 114.72 | 131 | 0.99 | 213 | 540 |
| 60 | A | 18.02 | WW | 22.21 | 160 | 0.54 | 212 | 520 |
| 61 | A | 18.02 | XX | 15.52 | 134 | 0.84 | 202 | 541 |
| 62 | A | 18.02 | YY | 17.92 | 144 | 0.71 | 211 | 528 |
| 63 | A | 18.02 | WW | 11.22 | 147 | 0.69 | 209 | 525 |
| | | | XX | 7.84 | | | | |
| 64 | B | 22.23 | TT | 10.91 | 132 | 0.80 | 227 | 531 |
| 65 | B | 22.23 | UU | 16.12 | 153 | 0.92 | 203 | 539 |
| 66 | C | 21.02 | TT | 10.91 | 128 | 0.60 | 227 | 528 |
| 67 | C | 21.02 | VV | 14.72 | 143 | 0.71 | 213 | 530 |
| 68 | D | 27.03 | YY | 17.92 | 180 | 0.70 | 202 | 522 |
| 69 | D | 27.03 | ZZ | 20.12 | 189 | 0.82 | 191 | 520 |
| 70 | E | 34.63 | XX | 15.51 | 200 | 0.71 | 198 | 532 |
| 71 | E | 34.63 | YY | 17.92 | 211 | 0.84 | 208 | 533 |

DMAA: N,N-dimethylacetamide

Comparative Preparation Examples 24 to 32

Polyimide films were prepared as described in Preparation Examples 57 to 71, using a diamine, a tetracarboxylic dianhydride (acid anhydride) and N,N-dimethylacetamide in the amounts shown in Table 19. Table 19 also shows the physical properties.

TABLE 19

| Comp Prep Ex. No. | Diamine Compound | Amount (g) | Dianhydride Compound | Amount (g) | DMAA (g) | Polymer $\eta_{inh}$ (dl/g) | Tg (° C.) | $Td_5$ (° C.) |
|---|---|---|---|---|---|---|---|---|
| 24 | F | 20.53 | TT | 10.91 | 126 | 0.78 | 238 | 515 |
| 25 | F | 20.53 | UU | 16.12 | 146 | 0.81 | 222 | 510 |
| 26 | G | 14.62 | TT | 10.91 | 102 | 0.69 | 230 | 538 |
| 27 | G | 14.62 | UU | 16.12 | 123 | 0.82 | 209 | 515 |
| 28 | G | 14.62 | VV | 14.72 | 117 | 0.85 | 211 | 532 |
| 29 | G | 14.62 | WW | 22.21 | 147 | 0.75 | 206 | 529 |
| 30 | G | 14.62 | XX | 15.52 | 120 | 0.76 | 199 | 533 |
| 31 | G | 14.62 | YY | 17.92 | 131 | 0.84 | 215 | 536 |
| 32 | G | 14.62 | ZZ | 20.12 | 139 | 0.94 | 193 | 537 |

DMAA: N,N-dimethylacetamide (Films)

A polyimide powder obtained in each of Preparation Examples 42 to 56 and Comparative Preparation Examples 15 to 23 was subject to heat pressing at 350 to 400° C., to give a film. A polyamide varnish obtained in each of Preparation Examples 53 to 67 and Comparative Preparation Examples 24 to 32 were deliquored into an imide by heating at 100° C. for 30 min, at 200° C. for 30 min and at 250° C. for 1 hour in an atmosphere of nitrogen, to give a polyimide film. The film was evaluated as described above.

Examples 54 to 83

Films were formed as described above, using the polyimide powders and the polyamide varnishes prepared in Preparation Examples 42 to 71. Each of these films was evaluated for its appearance, total light transmittance, birefringence and heat resistance as described above. The results are shown in Tables 20 and 21.

Comparative Examples 20 to 27

Films were formed as described above, using the polyimide powder and the polyamide varnishes prepared in Comparative Preparation Examples 15 to 32. These films were evaluated as in Examples 54 to 83. The results are shown in Table 22.

TABLE 20

| Ex. | Prep. Ex. | Appearance | Total light transmittance(%) | Birefringence(nm) | Heat resistance |
|---|---|---|---|---|---|
| 54 | 42 | ◯ | 84 | 9 | ◯ |
| 55 | 43 | ◯ | 87 | 10 | ◯ |
| 56 | 44 | ◯ | 85 | 10 | ◯ |
| 57 | 45 | ◯ | 86 | 7 | ◯ |
| 58 | 46 | ◯ | 85 | 7 | Δ |
| 59 | 47 | ◯ | 85 | 8 | ◯ |
| 60 | 48 | ◯ | 84 | 9 | ◯ |
| 61 | 49 | ◯ | 84 | 9 | ◯ |
| 62 | 50 | ◯ | 87 | 7 | Δ |
| 63 | 51 | ◯ | 86 | 9 | ◯ |
| 64 | 52 | ◯ | 82 | 8 | ◯ |
| 65 | 53 | ◯ | 87 | 8 | ◯ |
| 66 | 54 | ◯ | 85 | 10 | Δ |
| 67 | 55 | ◯ | 86 | 12 | Δ |
| 68 | 56 | ◯ | 86 | 8 | ◯ |

TABLE 21

| Ex. | Prep. Ex. | Appearance | Total light transmittance(%) | Birefringence(nm) | Heat resistance |
|---|---|---|---|---|---|
| 69 | 57 | ◯ | 86 | 10 | ◯ |
| 70 | 58 | ◯ | 87 | 11 | ◯ |
| 71 | 59 | ◯ | 86 | 9 | ◯ |
| 72 | 60 | ◯ | 88 | 7 | Δ |
| 73 | 61 | ◯ | 85 | 8 | ◯ |
| 74 | 62 | ◯ | 87 | 9 | ◯ |
| 75 | 63 | ◯ | 86 | 9 | ◯ |
| 76 | 64 | ◯ | 85 | 10 | ◯ |
| 77 | 65 | ◯ | 88 | 7 | ◯ |
| 78 | 66 | ◯ | 89 | 8 | ◯ |
| 79 | 67 | ◯ | 85 | 7 | ◯ |
| 80 | 68 | ◯ | 89 | 8 | ◯ |
| 81 | 69 | ◯ | 87 | 9 | ◯ |
| 82 | 70 | ◯ | 85 | 11 | ◯ |
| 83 | 71 | ◯ | 86 | 10 | ◯ |

TABLE 22

| Comp. Ex. | Comp. Prep. Ex. | Appearance | Total light transmittance(%) | Birefringence(nm) | Heat resistance |
|---|---|---|---|---|---|
| 20 | 15 | ◯ | 87 | 48 | ◯ |
| 21 | 16 | ◯ | 87 | 52 | ◯ |
| 22 | 17 | ◯ | 85 | 46 | ◯ |
| 23 | 18 | ◯ | 88 | 49 | Δ |
| 24 | 19 | ◯ | 88 | 50 | ◯ |
| 25 | 20 | ◯ | 87 | 38 | Δ |
| 26 | 21 | ◯ | 85 | 56 | Δ |
| 27 | 22 | ◯ | 86 | 55 | ◯ |
| 28 | 23 | ◯ | 87 | 48 | Δ |
| 29 | 24 | ◯ | 88 | 52 | ◯ |
| 30 | 25 | ◯ | 85 | 53 | ◯ |
| 31 | 26 | ◯ | 85 | 47 | ◯ |
| 32 | 27 | ◯ | 83 | 44 | ◯ |
| 33 | 28 | ◯ | 88 | 49 | ◯ |
| 34 | 29 | ◯ | 86 | 35 | Δ |
| 35 | 30 | ◯ | 85 | 58 | Δ |
| 36 | 31 | ◯ | 86 | 55 | ◯ |
| 37 | 32 | ◯ | 87 | 54 | Δ |

As shown in Tables 20 to 22, an organic optical component from the polyimide of this invention represented by general formula (1) has excellent transparency, heat resistance and mechanical strength as well as a lower birefringence compared with a conventional polyimide.

Preparation and Evaluation of an Optical Disk

Examples 84 to 86

Each of the polyimide powders prepared in Examples 43, 45 and 46 was formed into a strand with a melting extruder (melting temperature: 400° C.). After cooling, the strand was formed into pellets. Each pellet was dried at 150° C. for 4 hours, and then was subject to injection molding at 380° C. Specifically, a stamper with mirror surface was mounted on a mold and the material was formed into a disk-shape molding (substrate) with an outer diameter of 130 mm and a thickness of 1.2 mm.

The disk was punched to provide a doughnut disk with an inner diameter of 15 mm, and then aluminum was vacuum-deposited on one side of the disk to form a reflective layer with a thickness of 600 Å. For the optical disk, a birefringence and a BER (bit error rate) were determined. The BER was determined based on an incidence of record-reading error, using a laser beam with a wavelength of 780 nm, a linear velocity of 2 m/sec and a power of 0.8 mW. The results are shown in Table 23.

Comparative Examples 38 to 40

Optical disks from the polyimide powders of Comparative Preparation Examples 15, 18 and 19 were prepared and evaluated as described in Examples 67 to 73. The results are also shown in Table 23.

TABLE 23

| | Prep. Ex./ Comp. Prep. Ex. | Birefringence (And single pulse) (nm) | BER (bit error rate) |
|---|---|---|---|
| Ex. 84 | Prep. Ex. 43 | 4 | $7 \times 10^{-6}$ |
| Ex. 85 | Prep. Ex. 45 | 5 | $9 \times 10^{-6}$ |
| Ex. 86 | Prep. Ex. 46 | 4 | $7 \times 10^{-6}$ |
| Comp. Ex. 38 | Comp. Prep. Ex. 15 | 18 | $4 \times 10^{-4}$ |
| Comp. Ex. 39 | Comp. Prep. Ex. 18 | 24 | $8 \times 10^{-4}$ |
| Comp. Ex. 40 | Comp. Prep. Ex. 19 | 23 | $7 \times 10^{-4}$ |

As shown in Table 23, an optical disk prepared from the polyimide of this invention is improved in a BER, compared with one from any of the polyimides of the comparative examples, because of reduction in a birefringence.

Preparation and Evaluation of a Magneto-optical Disk

Examples 87 to 89

Each of the polyimide powders prepared in Examples 43, 45 and 46 was formed into a strand with a melting extruder (melting temperature: 400° C.). After cooling, the strand was formed into pellets. Each pellet was dried at 150° C. for 4 hours, and then was subject to injection molding at 380° C. Specifically, a stamper with mirror surface was mounted on a mold and the material was formed into a disk-shape molding (substrate) with an outer diameter of 130 mm and a thickness of 1.2 mm.

On the substrate was deposited a magneto-optical recording layer with a thickness of 1000 Å in a sputtering instrument (RF sputtering instrument; Nippon Shinku), using an alloy target of Tb 23.5, Fe 64.2 and Co 12.3 (atomic %). On the recording layer was deposited an inorganic-glass protective film with a thickness of 1000 Å using a sputtering instrument as described above. For the magneto-optical disk, a birefringence, a CN ratio, a BER (bit error rate) and a CN change rate were determined.

The CN ratio was determined under the conditions; a writing power: 7 mW, a reading power: 1 mW, a carrier frequency: 1 MHz, and a resolution band width: 30 KHz.

The CN change rate was determined as a percentage (%) of reduction in the CN ratio compared with the initial CN ratio after 30 days under the conditions; temperature: 60° C. and RH: 90%.

The results are shown in Table 24.

Comparative Examples 41 and 43

Magneto-optical disks from the polyimide powders of Comparative Preparation Examples 15, 18 and 19 were prepared and evaluated as described in Examples 81 to 83. The results are also shown in Table 24.

TABLE 24

| Ex./ Comp. Ex. | Prep. Ex./ Comp. Prep. Ex. | Birefringence (And single pulse) (nm) | CN (dB) | BER (bit error rate) | CN retention (%) |
|---|---|---|---|---|---|
| Ex. 87 | Prep. Ex. 43 | 6 | 58 | $8 \times 10^{-6}$ | 92 |
| Ex. 88 | Prep. Ex. 45 | 6 | 56 | $9 \times 10^{-6}$ | 93 |
| Ex. 89 | Prep. Ex. 46 | 5 | 56 | $8 \times 10^{-6}$ | 94 |
| Comp. Ex. 41 | Comp. Prep. Ex. 15 | 20 | 47 | $6 \times 10^{-6}$ | 86 |
| Comp. Ex. 42 | Comp. Prep. Ex. 18 | 25 | 44 | $7 \times 10^{-4}$ | 83 |
| Comp. Ex. 43 | Comp. Prep. Ex. 19 | 22 | 43 | $9 \times 10^{-4}$ | 85 |

As shown in Table 24, a magneto-optical disk prepared from the polyimide of this invention is improved for a CN ratio, a BER and CN retention, compared with one from any of the polyimides of the comparative examples, because of reduction in a birefringence.

Preparation examples of the fluorine-containing polyamide of this invention as well as their physical properties and performance will be specifically described with examples comparative examples, but this invention is not limited to these.

In these examples, physical properties were determined as follows;

Logarithmic viscosity; determined at 35° C. after dissolving 0.50 g of a polyamide powder in 100 mL of hexamethylphosphoric triamide;

Glass transition temperature ($T_g$); determined with DSC (Shimazu DT-40 model, DSC 41M);

5% weight-loss temperature; determined in the air, with DTA-TG (Shimazu DT-40 model, DSC-40M);

Melt viscosity; determined with Shimazu Koka Flow Tester (CFT500A) with a load of 100 kg;

Melting initiation temperature; determined with Shimazu Koka Flow Tester (CFT500A) under the conditions; load: 100 kg, warming rate: 5° C./min;

Dielectric constant; determined according to ASTM D150-87;

Coefficient of moisture absorption; determined after leaving a material for 24 hours under the conditions: temperature: 23° C., humidity: 85%;

Synthesis Example 1

Into a four-necked flask equipped with a thermometer, a reflux condenser and an agitator were charged 150 g of N,N-dimethylimidazolidinone (DMI), 30 g of o-xylene, 37 g of 2,4-dichlorobenzotrifluoride (0.172 mol), 39.4 g of m-aminophenol (0.361 mol) and 25.5 g of potassium carbonate (0.185 mol), and the mixture was heated to 200° C. with stirring, which was then reacted at this temperature for 30 hours. At the end of the reaction, 1,3-bis($^3$- aminophenoxy)-4-trifluoromethylbenzene (APTFB) had a purity of 83% based on HPLC analysis. After the reaction, the mixture was cooled and filtered to remove inorganic salts. DMI was removed under a reduced pressure to give a residue which was dissolved in 100 g of isopropanol (IPA), and 200 g of 36% HCl was added to precipitate the desired product as a hydrochloride.

The hydrochloride of APTFB formed was suspended in 150 g of water and 200 g of 1,2-dichloroethane (EDC), the mixture was neutralized with 28% ammonium hydroxide aq., and separated. The EDC layer was washed and evaporated to give the desired APTFB as a dark reddish-brown viscous liquid. Yield: 35.6 g (57.4%)

Synthesis Example 2

Into a four-necked flask equipped with a thermometer, a reflux condenser and an agitator were charged 250 g of N,N-dimethylformamide(DMF), 25 g of toluene, 40 g of 3,5-dinitrobenzotrifluoride (0.169 mol), 48.3 g of m-nitrophenol (0.347 mol) and 28 g of potassium carbonate (0.203 mol), and the mixture was heated to 150° C. with stirring, which was then reacted at this temperature for 25 hours. At the end of the reaction, 1,3-bis(3-nitrophenoxy)-5-trifluoromethylbenzene had a purity of 80% based on HPLC analysis.

After the reaction, the mixture was cooled to 90° C. and filtered to remove inorganic salts. To the filtrate was added 190 mL of water, and the mixture was cooled to room temperature to crystallize the desired product. The crystals were filtered, recrystallized from methyl cellosolve to give 1,3-bis(3-nitrophenoxy)-5-trifluoromethylbenzene as a pale yellow solid (Melting point: 117.6 to 118.5° C.; Yield: 54.9% (77%)).

Into a reducing device equipped with a thermometer, a reflux condenser and an agitator were charged 55 g of 1,3-bis(3-nitrophenoxy)-5-trifluoromethylbenzene (0.131 mol), 150 g of methyl cellosolve and 5 g of 5%-Pd/C (50% of water content), and the mixture was reacted at 70 to 80° C. for 4 hours in an atmosphere of hydrogen. At the end of the reaction, the catalyst was filtered out and the filtrate was heated to 90° C., to which 140 g of water was added. The mixture was cooled to room temperature to crystallize the desired product, which was filtered and dried under a reduced pressure to give 1,3-bis(3-aminophenoxy)-5-trifluoromethylbenzene as a white solid; Melting point: 98.0 to 98.6° C., Yield: 41 g (87%).

Synthesis Example 3

Into a four-necked flask equipped with a thermometer, a reflux condenser and an agitator were charged 500 mL of DMF, 50 mL of toluene, 80 g of 3,5-dinitrobenzotrifluoride (0.339 mol), 18.7 g of resorcinol (0.169 mol) and 28.1 g of potassium carbonate (0.203 mol), and the mixture was heated to 110° C. with stirring, which was aged at 110° C. for 5 hours. At the end of the reaction, the mixture was cooled to room temperature, and filtered to remove inorganic salts. The filtrate was condensed to give the desired 1,3-bis(3-nitro-5-trifluoromethylphenoxy)benzene; Yield: 72 g (87%).

Into a reducing device equipped with a thermometer, a reflux condenser and an agitator were charged 72 g of 1,3-bis(3-nitro-5-trifluoromethylphenoxy)benzene (0.147 mol), 500 mL of isopropyl alcohol and 7.2 g of 5%-Pd/C (50% of water content), and the mixture was reacted at 50° C. for 5 hours in an atmosphere of hydrogen. At the end of the reaction, the catalyst was filtered out, the filtrate was condensed under a reduced pressure and the residue was dissolved in 200 g of isopropanol and 400 g of 36% HCl was added to the solution to precipitate the desired hydrochloride. The hydrochloride was suspended in 150 g of water and 200g of 1,2-dichloroethane (EDC), the mixture was neutralized with 28% ammonium hydroxide aq. and separated, and the EDC layer was washed with water and evaporated to give 1,3-bis(3-amino-5-trifluoromethylphenoxy)benzene as a brown viscous liquid; Yield: 33.8 g (53.7%).

Synthesis Example 4

Into a four-necked flask equipped with a thermometer, a reflux condenser and an agitator were charged 250 mL of DMF, 50 mL of toluene, 50 g of 3,5-dinitrobenzotrifluoride (0.212 mol), 11.7 g of hydroquinone (0.106 mol) and 17.6 g of potassium carbonate (0.127 mol), and the mixture was heated to 120° C. with stirring, which was aged at 120° C. for 8 hours. At the end of the reaction, the mixture was cooled to 80° C. and filtered to remove inorganic salts. To the filtrate was added 180 mL of water, and the mixture was cooled to room temperature to crystallize the desired product. The crystals were filtered and recrystallied from isopropyl alcohol to give the desired 1,4-bis(3-nitro-5-trifluoromethylphenoxy)benzene; Melting point: 162.8 to 163.3° C., Yield: 36.5 g (70.5%).

Into a reducing device equipped with a thermometer, a reflux condenser and an agitator were charged 36.5 g of 1,4-bis(3-nitro-5-trifluoromethylphenoxy)benzene (0.0747 mol), 250 mL of N,N-dimethylformamide and 1.8 g of Pd-alumina, and the mixture was reacted at 50° C. for 6 hours in an atmosphere of hydrogen. At the end of the reaction, the catalyst was filtered out, the filtrate was condensed under a reduced pressure to give 1,4-bis(3-amino-5-trifluoromethylphenoxy)benzene as white crystals; Melting point: 157.4 to 159.0° C., Yield: 29.6 g (92.5%).

Synthesis Example 5

Into a reducing device equipped with a thermometer, a reflux condenser and an agitator were charged 290 g of N,N-dimethylformamide, 36.9 g of 3,5-dinitrobenzotrifluoride (0.156 mol), 60 g of 3-amino-5-trifluoromethylphenol (0.329 mol) and 33.1 g of potassium carbonate (0.239 mol), and the mixture was heated to 145° C. with stirring, which was then reacted at 145° C. for 14 hours. At the end of the reaction, the desired product had a purity of 63% based on HPLC analysis.

After the reaction, the mixture was cooled and filtered to remove inorganic salts. To the filtrate was added 400 g of water and the organic layer was separated. To the organic layer was added 400 g of toluene, the solution was washed with water and 2% NaOH aq., and toluene was evaporated. The residue was purified by column chromatography to give the desired 1,3-bis(3-amino-5-trifluoromethylphenoxy)-5-trifluoromethylbenzene as a pale yellow solid; Yield: 32 g (41.3%), Melting point: 82 to 84° C.

Example 90

In a vessel equipped with an agitator and a nitrogen inlet tube were added and dissolved 36.03 g of the diamine prepared in Synthesis Example 1 (0.10 mol) and 500 g of N-methyl-2-pyrrolidone, and then 24.29 g of triethylamine (0.24 mol). The mixture was cooled to 5° C. With more vigorous stirring, 20.30 g of terephthalic chloride (0.10 mol) was added to the mixture, and then it was stirred at room temperature for 3 hours. The resulting viscous polymer solution was cast on a glass plate, and was heated at 150° C.

for 1 hour and at 250° C. for 2 hours, to give a colorless and transparent polyamide film, whose physical properties are shown below.

Logarithmic viscosity (dL/g): 0.81
Glass-transition temperature (° C.): 180
5% weight-loss temperature (° C.): 481
Dielectric constant; 60 Hz: 3.28
    3 kHz: 3.25
    1 MHz: 3.22
Coefficient of moisture absorption (%): 0.55

Example 91

A colorless and transparent polyamide film was prepared as described in Example 90, using 36.03 g of the diamine prepared in Synthesis Example 2 (0.10 mol), 500 g of N-methyl-2-pyrrolidone, 24.29 g of triethylamine (0.24 mol) and 20.30 g of terephthalic chloride (0.10 mol). The physical properties for the polyamide powder obtained are shown below.

Logarithmic viscosity (dL/g): 0.98
Glass-transition temperature (° C.): 182
5% weight-loss temperature (° C.): 483
Dielectric constant; 60 Hz: 3.29
    3 kHz: 3.25
    1 MHz: 3.23
Coefficient of moisture absorption (%): 0.52

Example 92

A colorless and transparent polyamide film was prepared as described in Example 90, using 342.83 g of the diamine prepared in Synthesis Example 3 (0.10 mol), 500 g of N-methyl-2-pyrrolidone, 24.29 g of triethylamine (0.24 mol) and 20.30 g of terephthalic chloride (0.10 mol). The physical properties for the polyamide powder obtained are shown below.

Logarithmic viscosity (dL/g): 1.2
Glass-transition temperature (° C.): 175
5% weight-loss temperature (° C.): 479
Dielectric constant; 60 Hz: 3.20
    3 kHz: 3.18
    1 MHz: 3.15
Coefficient of moisture absorption (%): 0.48

Example 93

A colorless and transparent polyamide film was prepared as described in Example 90, using 342.83 g of the diamine prepared in Synthesis Example 4 (0.10 mol), 500 g of N-methyl-2-pyrrolidone, 24.29 g of triethylamine (0.24 mol) and 20.30 g of terephthalic chloride (0.10 mol). The physical properties for the polyamide powder obtained are shown below.

Logarithmic viscosity (dL/g): 1.2
Glass-transition temperature (° C.): 188
5% weight-loss temperature (° C.): 484
Dielectric constant; 60 Hz: 3.20
    3 kHz: 3.16
    1 MHz: 3.11
Coefficient of moisture absorption (%): 0.45

Example 94

A colorless and transparent polyamide film was prepared as described in Example 90, using 396.33 g of the diamine prepared in Synthesis Example 5 (0.10 mol), 500 g of N-methyl-2-pyrrolidone, 24.29 g of triethylamine (0.24 mol) and 20.30 g of terephthalic chloride (0.10 mol). The physical properties for the polyamide powder obtained are shown below.

Logarithmic viscosity (dL/g): 0.66
Glass-transition temperature (° C.): 177
5% weight-loss temperature (° C.): 480
Dielectric constant; 60 Hz: 2.99
    3 kHz: 2.95
    1 MHz: 2.94
Coefficient of moisture absorption (%): 0.42

Comparative Example 44

A colorless and transparent polyamide film was prepared as described in Example 84, using 29.23 g of 1,3-bis(3-aminophenoxy)benzene (0.10 mol), 500 g of N-methyl-2-pyrrolidone, 24.29 g of triethylamine (0.24 mol) and 20.30 g of terephthalic chloride (0.10 mol). The physical properties for the polyamide powder obtained are shown below.

Logarithmic viscosity (dL/g): 1.5
Glass-transition temperature (° C.): 188
5% weight-loss temperature (° C.): 496
Dielectric constant; 60 Hz: 3.50
    3 kHz: 3.48
    1 MHz: 3.44
Coefficient of moisture absorption (%): 0.78

Comparative Example 45

A colorless and transparent polyamide film was prepared as described in Example 84, using 29.23 g of 1,4-bis(3-aminophenoxy)benzene (0.10 mol), 500 g of N-methyl-2-pyrrolidone, 24.29 g of triethylamine (0.24 mol) and 20.30 g of terephthalic chloride (0.10 mol). The physical properties for the polyamide powder obtained are shown below.

Logarithmic viscosity (dL/g): 1.6
Glass-transition temperature (° C.): 195
5% weight-loss temperature (° C.): 499
Dielectric constant; 60 Hz: 3.50
    3 kHz: 3.47
    1 MHz: 3.44
Coefficient of moisture absorption (%): 0.80

Comparing the results from Examples 84 to 88 with those from Comparative Examples 44 and 45, the polyamide of this invention has a lower dielectric constant and a lower coefficient of moisture absorption than one in either of Comparative Examples.

Example 95

In a vessel equipped with an agitator and a nitrogen inlet tube were added and dissolved 36.03 g of the diamine prepared in Synthesis Example 1 (0.10 mol) and 500 g of N-methyl-2-pyrrolidone, and then 13.94 g of propylene oxide (0.24 mol). The mixture was cooled to 5° C. With more vigorous stirring, 20.10 g of terephthalic chloride (0.099 mol) was added to the mixture, and then it was stirred at room temperature for 2 hours. Then, 0.2811 g of benzoyl chloride (0.0020 mol) was added and the mixture was stirred at room temperature for 3 hours. The resulting viscous polymer solution was poured into a vigorously stirred methanol to precipitate a white powder. The white powder was filtered, washed with methanol and dried at 180° C. for 12 hours under a reduced pressure, to give a polyamide powder. Its physical properties are shown below.

Logarithmic viscosity (dL/g): 0.60
Glass-transition temperature (° C.): 180
5% weight-loss temperature (° C.): 482
Melting initiation temperature (° C.): 255
Melt viscosity (poise) at 330° C.: 12900

An elemental analysis for the polyamide film indicated the following results.

|  | C | H | N | F |
|---|---|---|---|---|
| Calculated (%): | 76.06 | 4.01 | 6.57 | 13.37 |
| Observed (%): | 76.03 | 4.02 | 6.60 | 13.35 |

Example 96

A polyamide powder was prepared as described in Example 95 using 3603 g of the diamine prepared in Synthesis Example 1 (10 mol), 50 kg of N-methyl-2-pyrrolidone, 1394 g of propylene oxide (24 mol), 1969 g of terephthalic chloride (9.7 mol) and 84.34 g of benzoyl chloride (0.60 mol). The physical properties for the polyamide powder obtained are shown below.

Logarithmic viscosity (dL/g): 0.42
Glass-transition temperature (° C.): 180
5% weight-loss temperature (° C.): 483
Melting initiation temperature (° C.): 250
Melt viscosity (poise) at 330° C.: 4980

Example 97

The polyamide powder prepared in Example 96 was dissolved in N-methyl-2-pyrrolidone, cast on a glass plate and then heated at 150° C. for 1 hour and at 250° C. for 2 hours to give a colorless and transparent polyamide film.

The polyamide film showed a tensile strength of 1070 Kg/cm$^2$ and a tensile elongation of 3.1% as determined according to ASTM D-882.

Example 98

A colorless and transparent polyamide film was formed from the polyamide powder prepared in Example 96 by extrusion molding.

The polyamide film showed a tensile strength of 1080 Kg/cm$^2$ and a tensile elongation of 3.3% as determined according to ASTM D-882.

Example 99

A polyamide powder was prepared as described in Example 95 using 3603 g of the diamine prepared in Synthesis Example 2 (10 mol), 50 kg of N-methyl-2-pyrrolidone, 1394 g of propylene oxide (24 mol), 1969 g of terephthalic chloride (9.7 mol) and 84.34 g of benzoyl chloride (0.60 mol). The physical properties for the polyamide powder obtained are shown below.

Logarithmic viscosity (dL/g): 0.54
Glass-transition temperature (° C.): 190
5% weight-loss temperature (° C.): 486
Melting initiation temperature (° C.): 260
Melt viscosity (poise) at 330° C.: 7000

Example 100

The polyamide powder prepared in Example 99 was dissolved in N-methyl-2-pyrrolidone, cast on a glass plate and then heated at 150° C. for 1 hour and at 250° C. for 2 hours to give a colorless and transparent polyamide film.

The polyamide film showed a tensile strength of 1140 Kg/cm$^2$ and a tensile elongation of 3.8% as determined according to ASTM D-882.

Example 101

A polyamide powder was prepared as described in Example 95 using 3603 g of the diamine prepared in Synthesis Example 1 (10 mol), 50 kg of N-methyl-2-pyrrolidone, 1394 g of propylene oxide (24 mol), 1969 g of isophthalic chloride (9.7 mol) and 84.34 g of benzoyl chloride (0.60 mol). The physical properties for the polyamide powder obtained are shown below.

Logarithmic viscosity (dL/g): 0.44
Glass-transition temperature (° C.): 178
5% weight-loss temperature (° C.): 484
Melting initiation temperature (° C.): 255
Melt viscosity (poise) at 330° C.: 3550

Example 102

A colorless and transparent polyamide film was formed from the polyamide powder prepared in Example 100 by extrusion molding.

The polyamide film showed a tensile strength of 1090 Kg/cm$^2$ and a tensile elongation of 3.1% as determined according to ASTM D-882.

As shown above, this invention can provide an organic optical component from a polyamide or its copolymer or a polyimide with excellent transparency, heat resistance and mechanical strength as well as a low birefringence.

This invention can provide a novel aromatic polyamide with a low permitivity and excellent transparency, processability and thermal stability, besides excellent heat resistance inherent in an aromatic polyamide. It may be, therefore, a considerably important material for many applications such as an electric or electronic component, a car component, a component for a precision instrument, a component for a medical device and a base material for a spacecraft, and thus may be industrially quite useful.

What is claimed is:

1. A fluorine-containing polyamide with a logarithmic viscosity of 0.01 to 3.00 dL/g determined at 35° C. by dissolving 0.5 gram of the polyamide in hexamethyl phosphoric triamide comprising a repetitive unit represented by general formula (4) formed by condensation polymerization at least one of diamines represented by general formula (2) with at least one of dicarboxylic derivatives represented by general formula (3);

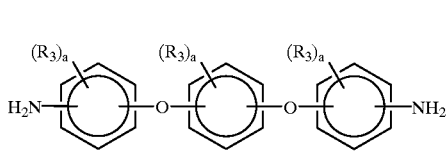

(2)

where a is the same or is different from each other, and is an integer of 0 to 4 whose total number is at least one; $R_3$ is the same or is different from each other, and is a monovalent group represented by $C_kF_{2k+1}$; and k is an integer of 0 to 6;

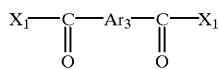
(3)

wherein $x_1$ is a halogen atom, hydroxy, methoxy or ethoxy, and $Ar_3$ is at least one group selected from the group consisting of a fused polycyclic aromatic group and a bivalent group represented by formula (o);

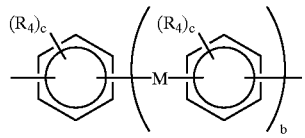
(o)

wherein M is a direct bond or a bivalent group selected from the group consisting of —O—, —S—, $SO_2$—, —CO—, $CH_2$—, —$C(CH_3)_2$— and —$C(CF_3)_2$— and when appearing two or more times in the structural formula, M is the same or is different from each other; $R_4$ is a monovalent group selected from the group consisting of an alkyl, a perfluoroalkyl and an alkoxy having 1 to 6 carbons, a halogen atom and phenyl, and when appearing two or more times in the structural formula, $R_4$ is the same or is different from each other; b is an integer of 0 to 2; and c is an integer of 0 to 4 and when appearing two or more times in the structural formula, c is the same or is different from each other;

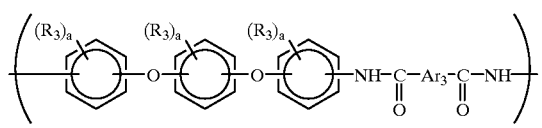
(4)

wherein $R_3$, a and $Ar_3$ are as defined above.

2. A fluorine-containing polyamide as claimed in claim 1 whose polymer end is protected by conducting the said condensation polymerization in the presence of an aromatic monocarboxylic acid derivative represented by general formula (5) and/or an aromatic monoamine represented by general formula (6) in a ratio of 0.001 to 1.00 mol both including per 1 mol of the diamine and/or the dicarboxylic acid, respectively;

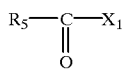
(5)

wherein $R_5$ is a monovalent group selected from the group consisting of a monocyclic aromatic group, a fused polycyclic aromatic group and a non-fused polycyclic aromatic group having 6 to 15 carbons in which aromatic groups are linked directly or via a crosslinking group; and $X_1$ is as defined above;

$$R_5—NH_2 \quad (6)$$

wherein $R_5$ is as defined above.

* * * * *